United States Patent
Tsutsui et al.

(10) Patent No.: US 7,372,375 B2
(45) Date of Patent: *May 13, 2008

(54) SIGNAL REPRODUCING METHOD AND DEVICE, SIGNAL RECORDING METHOD AND DEVICE, AND CODE SEQUENCE GENERATING METHOD AND DEVICE

(75) Inventors: Kyoya Tsutsui, Kanagawa (JP); Naoya Haneda, Tokyo (JP); Kenzo Akagiri, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/803,363

(22) Filed: May 14, 2007

(65) Prior Publication Data

US 2007/0216552 A1    Sep. 20, 2007

Related U.S. Application Data

(63) Continuation of application No. 10/384,137, filed on Mar. 7, 2003, now Pat. No. 7,218,251.

(30) Foreign Application Priority Data

| Mar. 12, 2002 | (JP) | ............................. 2002-067481 |
| Apr. 9, 2002 | (JP) | ............................. 2002-107083 |
| Apr. 17, 2002 | (JP) | ............................. 2002-114784 |

(51) Int. Cl.
*H03M 7/00* (2006.01)

(52) U.S. Cl. .................. 341/50; 341/173; 714/758

(58) Field of Classification Search .................. 341/50, 341/173; 714/758; 380/46; 375/240.23; 704/230

See application file for complete search history.

(56) References Cited

U.S. PATENT DOCUMENTS

| 5,351,131 | A | 9/1994 | Nishino et al. |
| 5,852,469 | A | 12/1998 | Nagai et al. |
| 6,353,807 | B1 | 3/2002 | Tsutsui et al. |
| 6,480,123 | B2 | 11/2002 | Tsutsui et al. |
| 6,501,801 | B2 | 12/2002 | Chujoh et al. |
| 2003/0090971 | A1 | 5/2003 | Gushima et al. |
| 2003/0135798 | A1 | 7/2003 | Katayama et al. |

FOREIGN PATENT DOCUMENTS

| JP | 10-135944 | 5/1998 |
| JP | 2001-103047 | 4/2001 |
| JP | 2003-127530 | 5/2003 |
| WO | WO 94/28633 | 12/1994 |

OTHER PUBLICATIONS

Crochiere et al., "Digital Coding of Speech in Sub-Bands", Bell Syst. Tech., J., Bol. 55, No. 8, 1974, pp. 233-236.

Rothwieler, Joseph H., "Polyphase Quadrature Filters -A New Subband Coding Technique", ICAPSSP 83, Boston, 1983 IEEE, pp. 1280-1283, no month.

(Continued)

*Primary Examiner*—Jean B Jeanglaude
(74) *Attorney, Agent, or Firm*—Robert J. Depke; Rockey, Depke & Lyons, LLC.

(57) ABSTRACT

It is intended to remove a risk of illegal high quality restoration while enabling trial viewing of contents such as music, to make it possible to reproduce contents with high quality by acquiring a relatively small amount of data, and to make it possible to implement hardware at a lower cost. To generate trial listening data containing dummy data, a pseudo random number R is generated first. A remainder r of R divided by 128 is calculated. The remainder r is coded and incorporated into high sound quality restoration data. A bandwidth limitation region of trial listening data is replaced by dummy data starting from its rth bit. As a result, the head position of the dummy data in the trial listening data varies frame by frame, whereby the safety of the trial listening data can be increased.

33 Claims, 48 Drawing Sheets

OTHER PUBLICATIONS

Princen et al., "Subband/Transform Coding Using Filter Bank Design Based on Time Domain Aliasing Cancellation", ICASSP 1987, IEEE, pp. 2161-2164, no month.

Zelinski et al., "Adaptive Transform Coding of Speech Signals", IEEE Transactions on Acoustics Speech, and Signal Processing, vol. ASSP-25, No. 4, Aug. 1997.

Michael A. Krasner, "The Critical Band Coder—Digital Encoding of Speech Signals Based on the Perceptual Requirements of the Auditory System", ICASSP 1980 IEEE, pp. 327-331, no month.

ISO/IEC 11172-3 (1993(E), 1993) Coding of Moving Pictures and Associated Audio for Digital Storage Media at Up to About 1.5 MBITS/s, no month.

Huffman, David A., "A Method for the Construction of Minimum-Redundacy Codes", Proceedings of the I.R.E., vol. 40, pp. 1098-1100, Sep. 1952.

Federal Information Processing Standards Publication 46, Specification for the Data Encryption Standard, Jan. 15, 1977.

SIGNAL REPRODUCING METHOD AND DEVICE, SIGNAL RECORDING METHOD AND DEVICE, AND CODE SEQUENCE GENERATING METHOD AND DEVICE

CROSS REFERENCE TO RELATED APPLICATIONS

The subject matter of application Ser. No. 10/384,137 is incorporated herein by reference. The present application is a continuation of U.S. application Ser. No. 10/384,137, filed Mar. 7, 2003, now U.S. Pat. No. 7,218,251, which claims priority to Japanese Patent Application No. JP2002-067481 filed Mar. 12, 2002, Japanese Patent Application No. JP2002-107083, filed Apr. 9, 2002, and Japanese Patent Application No. JP2002-114784, filed Apr. 17, 2002. The present application claims priority to these previously filed applications.

BACKGROUND OF THE INVENTION

1. Field of the Invention

The present invention relates to a signal reproducing method and device, a signal recording method and device, and a code sequence generating method and device. For example, the invention relates to a signal reproducing method and device, a signal recording method and device, and a code sequence generating method and device for coding a signal so as to enable trial viewing and, if a trial viewer decides to buy an item concerned, enabling high-quality reproduction and recording by adding data having a small amount of information.

2. Description of the Related Art

Because of the spread of communication network technologies such as the Internet, the improvement of information compression technologies, the increase in the degree of integration (integration density) of information recording media, and other factors, a marketing form is now available in which digital contents formed by various kinds of multimedia data such as data of audio, a still image, a moving image, a movie consisting of audio and a moving image are delivered to viewers over communication networks with charge.

For example, stores that sell package media such as CDs (compact discs) and MDs (mini-disks)(trademark), that is, recording media on which digital contents are recorded in advance can sell not only package media but also digital contents themselves by installing there an information terminal such as what is called an MMK (multimedia KIOSK) in which a large number of digital contents as typified by music data are stored.

A user inserts a recording medium he brought such as an MD into the MMK, selects the title of a digital content he wants to buy by referring to a menu picture or the like, and pays for a requested price of the content. The payment method may be input of cash, use of digital money, or electronic payment using a credit card or a prepaid card. The MMK records, by performing prescribed processing, the selected digital content data on the recording medium the user inserted.

A marketer of digital contents can deliver digital contents to users over the Internet, for example, as well as sell digital contents to users using MMKs as described above.

It has become possible to distribute contents more effectively by employing the above-described method of marketing not only package media on which contents are recorded in advance but also digital contents themselves.

JP-A-2001-103047, JP-A-2001-325460, etc. disclose techniques that enable distribution of digital contents while protecting its copyright. These techniques make it possible to deliver a digital content in such a manner that portions other than a portion for trial listening are encrypted and allow only a user who has bought a corresponding decoding key to listen to all the content. One known encryption method is such that an encrypted bit string is obtained by EXCLUSIVE-ORing PCM (pulse code modulation) digital audio data to be delivered with a 0/1 random number series generated by giving an initial value of a random number series as a key signal for the bit string of the PCM data. Digital contents that have been encrypted in this manner are distributed to users in a manner that they are recorded on recording media by using MMKs or the like and delivered over networks. A user who has acquired encrypted digital content data can listens to only a non-encrypted, trial-allowed portion unless he gets a key. The user receives only noise if he reproduces an encrypted portion without decoding it.

As described above, the encryption method is known in which a bit string obtained by EXCLUSIVE-ORing the bit string of a PCM acoustic signal with a 0/1 random number series generated by giving initial values of a random number series as a key signal for the bit string of the PCM acoustic signal is transmitted or recorded on a recording medium. This method makes it possible to allow only a person who has acquired the key signal to reproduce the acoustic signal correctly and to cause a person who has not acquired the key signal to be able to reproduce only noise. Naturally, it is possible to use, as an encryption method, a more complex method such as what is called DES (data encryption standard). The content of the DES is disclosed in Federal Information Processing Standards Publication 46, Specifications for the DATA ENCRYPTION STANDARD, Jan. 15, 1977.

Incidentally, methods for broadcasting an audio signal after compressing it or recording an audio signal on a recording medium are spread and magneto-optical discs capable of recording a coded audio, speech, or like signal are used widely.

Various methods for high-efficiency coding of audio data are known, examples of which are subband coding (SBC) in which an audio signal on the time axis is coded by dividing it into a plurality of frequency bands without dividing it into blocks and blocked frequency band division coding (what is called transform coding) in which a signal on the time axis is spectrum-converted into a signal on the frequency axis which is then divided into a plurality of frequency bands and coded on a band-by-band basis. Another method is available in which a signal is subjected to subband coding and a resulting signal in each band is spectrum-converted into a signal on the frequency axis and coded in each spectrum conversion band.

Among filters used in the above methods is a QMF (quadrature mirror filter), which is disclosed in R. E. Crochiere: "Digital Coding of Speech in Subbands," Bell Syst. Tech. J., Vol. 55, No. 8, 1974. Joseph H. Rothweiler: "Polyphase Quadrature Filters—A New Subband Coding Technique," ICASSP 83, Boston, for example, discloses a filter division technique using filters having the same bandwidth.

An example of the above-mentioned spectrum conversion is a method in which an input audio signal is blocked into unit frames of a predetermined duration and is subjected to discrete Fourier transform (DFT), discrete cosine transform (DCT), modified DCT transform (MDCT), or the like on a unit frame basis. The details of MDCT are described in J. P. Princen, A. B. Bradley (Univ. of Surrey Royal Melbourne Inst. of Tech.), et al., "Subband/Transform Coding Using Filter Band Designs Based on Time Domain Aliasing Cancellation," ICASSP 1987.

Where the above-mentioned DFT or DCT is used as a method for spectrum-converting a waveform signal, if transform is performed for each time block including M samples, M independent real number data are obtained for each block. To reduce distortion due to connection between adjoining time blocks, adjoining blocks are usually overlapped with each other by N/2 samples; each block has N overlap samples (N/2 samples on each side). Therefore, in DFT or DCT, on average, M independent real number data are quantized and coded for M+N samples.

In contrast, where the above-mentioned MDCT is used as a spectrum conversion method, if transform is performed for each time block including M samples, M independent real number data are obtained from 2M samples because each block is overlapped with each of the two adjacent blocks by M/2 samples (M samples in total). Therefore, in MDCT, on average, M independent real number data are quantized and coded for M samples.

In a decoding device, a waveform signal can be reconstructed by combining together waveform components, while interfering with each other, obtained by inverse-converting individual blocks of a code sequence that was generated by using MDCT.

In general, the frequency resolution of a spectrum is increased and energy is concentrated in a particular spectrum component by elongating the transform time block. By performing transform using MDCT in which transform is performed for a long block that is overlapped with each of the adjacent blocks by a half of its length and the number of resulting spectrum signals is not greater than the number of original time-domain samples, coding can be made more efficient than in the case of using DFT or DCT. Inter-block distortion of a waveform signal can be reduced by giving a sufficiently long overlap to adjoining blocks.

Bands where quantization noise occurs can be controlled by quantizing a signal that has been divided into bands by filtering or spectrum conversion in the above-described manner, and more efficient coding can be performed for the human auditory sense by utilizing such features as a masking effect. Even more efficient coding can be performed by, for example, normalizing a signal component of each band by a maximum value of its absolute values before performing quantization.

In quantizing each of frequency components obtained by frequency band division, the frequency division widths may be determined by, for example, taking into consideration the properties of the human auditory sense. That is, an audio signal may be divided into a plurality of bands (e.g., 25 bands) in such a manner that the bandwidth becomes greater as the frequency increases (the highest frequency band is generally called a critical band).

Where band division is performed so as to produce a wide critical band, data in respective bands may be coded in such a manner that prescribed numbers of bits may be assigned to the respective bands or the numbers of bits to be allocated to the respective bands may be determined adaptively.

For example, when coefficient data obtained by MDCT are coded with bit allocation, the numbers of bits to be allocated and to be coded to MDCT coefficient data in respective bands that are obtained by block-by-block MDCT are determined adaptively. For example, the following two bit allocation methods are known.

R. Zelinski, P. Noll, et. al.: "Adaptive Transform Coding of Speech Signals," IEEE, Transactions of Acoustics, Speech, and Signal Processing, Vol. ASSP-25, No. 4, August 1977 describes a method in which bit allocation is performed on the basis of the signal magnitude in each band. This method can produce a flat quantization noise spectrum and minimize the noise energy. However, since the masking effect is not utilized when the auditory sense is taken into consideration, this method is not an optimum one in terms of reducing noise that can be heard actually by the human ear.

M. A. Kransner (Massachusetts Institute of Technology): "The Critical Band Coder Digital Encoding of the Perceptual Requirements of the Auditory System," ICASSP 1980 describes a method in which fixed bit allocation is performed by obtaining signal-to-noise ratios necessary for respective bands by utilizing auditory masking. However, because of the fixed bit allocation, characteristic values are not very good even in the case where a characteristic is measured with input of a sine wave.

To solve the above problems, a high-efficiency coding device has been proposed in which all bits that can be used for bit allocation are divided into bits for a fixed bit allocation pattern that is predetermined for each small block and bits for bit allocation depending on the signal size of each block and the division ratio is determined depending on a signal relating to an input signal in such a manner that the bits for a fixed bit allocation pattern is given a larger proportion as that signal has a smoother spectrum.

Where the energy is concentrated in a particular spectrum component as in the case of sine wave input, this method can greatly increase the total signal-to-noise ratio because a large number of bits can be allocated to a block including the particular spectrum component. In general, the human auditory sense is very sensitive to a signal having a steep spectrum component. Therefore, increasing the signal-to-noise ratio by such a method is effective in improving not only measured characteristic values but also the quality of sound actually heard by a person.

Other various bit allocation methods have been proposed. Sophisticated models of the auditory sense and improvement in the ability of coding devices have made it possible to not only obtain better measured characteristic values but also perform higher-efficiency coding for the human auditory sense. In these methods, in general, bit allocation reference values (real numbers) that realize a calculated signal-to-noise-characteristic as faithfully as possible are determined and integers as their approximations are determined and set as the numbers of bits to be allocated.

Japanese Patent Application No. 152865/1993 or WO 94/28633 of the present inventors describes a method in which tone components that are particularly important in terms of the auditory sense, that is, components whose energy is concentrated in the neighborhood of a particular frequency, are separated from generated spectrum signals and coded separately from the other spectrum components. This method makes it possible to code an audio signal or the like effectively at a high compression ratio while causing almost no deterioration for the human auditory sense.

In generating an actual code sequence, quantization accuracy information and normalization coefficient information are coded with a prescribed number of bits in each band where normalization and quantization are performed and then normalized and quantized spectrum signals are coded. ISO/IEC 11172-3 (1993(E), 1993) describes a high-efficiency coding method in which the number of bits for representing quantization accuracy information is set so as to vary from one band to another depending on a band. More specifically, according to this standard, the number of bits for representing quantization accuracy information decreases as the band becomes higher in frequency.

A method is known in which quantization accuracy information is determined based on normalization coefficient information, for example, in a decoding device instead of coding quantization accuracy information directly. However, in this method, the relationship between normalization coefficient information and quantization accuracy information is determined at the time of establishment of a standard, and hence it is impossible to introduce, in the future, a control that employs quantization accuracy that is based on a more advanced auditory model. Further, where compression ratios in a certain range are to be realized, it is necessary to set a relationship between normalization coefficient information and quantization accuracy information for each compression ratio.

A method for performing coding efficiently using variable-length codes that is disclosed in D. A. Huffman: "A Method for Construction of Minimum Redundancy Codes," Proc. I.R.E., Vol. 40, p. 1,098, 1952, for example, is known as a method for coding quantized spectrum signals more efficiently.

It is also possible to distribute a signal that has been coded by any of the above-described methods by encrypting it in the same manner as in the case of a PCM signal. Where this scrambling method is employed, a person who has not acquired a key signal cannot reproduce an original signal. Another method is known in which a PCM signal is converted into a random signal and then coded for compression instead of encrypting a coded bit sequence. However, where this scrambling method is employed, a person who has not acquired a key signal can reproduce only noise.

The marketing of contents data can be promoted by distributing trial listening data of the contents data. Examples of trial listening data are data that are reproduced with lower sound quality than original data and data that enables reproduction of part (e.g., a climax portion) of original data. If a user likes reproduced trial listening data, he attempts to buy a decryption key to enable reproduction of the original sound or to buy a new recording medium on which the original audio data are recorded.

However, with the above scrambling methods, none of the data cannot be reproduced or all the data are reproduced as noise. Therefore, the above scrambling methods cannot be used for the purpose of distribution, for trial listening, of a recording medium on which sound is recorded with relatively low quality. Even if data that have been scrambled by any of the above methods are distributed to a user, he cannot recognize an outline of the entire data.

In the conventional methods, in encrypting a signal that has been subjected to high-efficiency coding, it is usually very difficult for common reproducing devices to produce a meaningful code sequence while not lowering the compression efficiency. That is, where a code sequence generated by high-efficiency coding is scrambled in the above described manner, only noise is generated if the code sequence is reproduced without descrambling it. If a scrambled code sequence does not comply with the standard of original high-efficiency codes, reproduction processing may not be performed at all.

Conversely, where high-efficiency coding is performed after a PCM signal is scrambled, such coding becomes irreversible if the amount of information is reduced by utilizing the properties of the auditory sense. Therefore, even if such high-efficiency codes are decoded, a scrambled PCM signal cannot be reproduced correctly. That is, it is very difficult to descramble such a signal correctly.

Therefore, conventionally, a method that allows correct descrambling though lowers the compression efficiency is employed.

In view of the above problems, the present inventors proposed, in JP-A-10-135944, an audio coding method in which data obtained by encrypting only codes corresponding to high-frequency bands among codes obtained by converting music data, for example, into spectrum data are distributed as trial listening data so that even a user not having a key can decode and reproduce a non-encrypted, narrow-band signal. In this method, high-frequency-side codes are encrypted, high-frequency-side bit allocation information is replaced by dummy data, and true high-frequency-side bit allocation information is recorded at such positions that a reproduction decoder does not read (i.e., disregards) information during reproduction processing.

This method allows a user to have trial listening data distributed, reproduce those data, buy a chargeable key for decoding trial listening data he likes into original data, and enjoy desired music or the like with high sound quality by reproducing it correctly in all bands.

According to the technique disclosed in JP-A-10-135944, a user not having a key can decode only a narrow-band signal of data that are distributed free of charge. However, the safety relies on only the encryption. Therefore, if the encryption is cracked, a user can reproduce music with high sound quality without paying a charge. The distributor of music data (contents provider) cannot collect a legitimate charge.

SUMMARY OF THE INVENTION

The present invention has been made in view of the above circumstances, and an object of the invention is therefore to provide a signal reproducing method and device, a signal recording method and device, and a code sequence generating method and device which make it possible to eliminate a possibility of encryption cracking without encrypting part of a signal while enabling trial viewing, to enable high-quality signal reproduction merely by acquiring a relatively small amount of additional data for a signal that is supplied for trial viewing, and to increase the safety of trial viewing data by making difficult the act itself of obtaining information on the additional data.

Another object of the invention is to make it possible to generate and distribute trial listening data that enable low-sound-quality reproduction of contents data, to restore original data from such trial listening data, and to provide very safe trial listening data from which it is difficult to reproduce original data illegally.

According to a first aspect of the invention, trial viewing data are generated by replacing, with dummy data, frame by frame, part of a code sequence obtained by coding a signal in units of a frame, and the position of the dummy data is varied. Information indicating the dummy data position is incorporated into high quality restoration data.

The present assignee proposed a technique in which data (trial viewing data) obtained by replacing part of a code sequence with dummy data are distributed to enable trial viewing and users are allowed to freely reproduce sound and video of a narrow band and relatively low quality. If a trial viewer has decided to buy the item because he likes its contents, he can receive correct data (high quality restoration data) to replace the dummy data and enjoy its reproduction with high quality. In this technique, a music signal is converted into spectrum coefficients for each block having a prescribed length, the spectrum coefficients are divided into tone components and the other components, and the tone components are normalized and re-quantized individually and the other components are normalized and re-quantized for each prescribed band. When spectrum signals obtained by the re-quantization are coded from the low-frequency side by using variable-length codes, normalization coefficients of parts of the tone components and the other components whose frequencies are higher than a prescribed frequency are replaced by dummy data and a low-frequency-side portion of part of the variable-length-coded spectrum components whose frequencies are higher than the prescribed frequency is also replaced by dummy data. Reproduction of a wide-band music signal is enabled by acquiring an additional data sequence to be used for dummy data replacement and combining it with dummy-data-inclusive trial listening data that are generated in the above manner. In this technique, an important factor for increasing the safety is the length over which a low-frequency-side portion of part of the variable-length-coded spectrum components whose frequencies are higher than the prescribed frequency is replaced by dummy data. Where a spectrum code sequence of N bits is replaced by dummy data, it is possible to produce $2^N$ kinds of code sequences. Therefore, the safety, that is, the ability of preventing restoration of correct data from trial listening data, can be increased by increasing N. However, increasing N leads to an increase in the amount of high quality restoration data, which means that more time is needed to download high-quality data when a trial listener has decided to buy those data.

In view of the above, according to the first aspect of the invention, the position from which a variable-length code sequence of the above kind is replaced by dummy data is made variable and information indicating that position is incorporated in high quality restoration data. This makes it possible to provide a large number of kinds of data to be checked in inferring high-quality data from trial viewing data even with a relatively small N value. The safety of the trial viewing data can be increased while the size of high quality restoration data is kept relatively small.

The first aspect of the invention provides a signal reproducing method and device for reproducing a code sequence obtained by coding a signal in prescribed units (e.g., in units of a frame) in which a first code sequence obtained by replacing part of the code sequence with dummy data is received, if a second code sequence containing information necessary for dummy data replacement is received, at least part of the dummy data of the first code sequence are replaced by true data by using the second code sequence, and the first code sequence or a resulting code sequence is decoded. The position of the dummy data in the first code sequence is variable in the prescribed units.

The first aspect of the invention also provides a signal recording method and device for recording, on a recording medium, a code sequence obtained by coding a signal in units of a frame in which a first code sequence obtained by replacing part of the code sequence with dummy data is received, and if a second code sequence containing information necessary for dummy data replacement is received, at least part of the dummy data of the first code sequence are replaced by true data by using the second code sequence. The position of the dummy data in the first code sequence is variable. In other words, a replacement position of the dummy data can be controlled or changed in each of the prescribed units. It is noted that a head of the replacement position of the dummy data, length of the dummy data or the like can be controlled or changed in each of the prescribed units.

The first aspect of the invention further provides a code sequence generating method and device in which a code sequence of a prescribed format is generated by coding an input signal, a first code sequence is generated by replacing part of the code sequence of the prescribed format with dummy data, and a second code sequence is generated by extracting the part of code sequence of the prescribed format corresponding to the dummy data. The position of the dummy data in the first code sequence is variable.

The code sequence may be generated by coding an input signal in such a manner that the input signal is spectrum-converted and divided into bands, and a code sequence having a prescribed format is generated that contains quantization accuracy information, normalization coefficient information, and spectrum coefficient information in each band, and the dummy data may include dummy data that correspond to at least part of the spectrum coefficient information. The spectrum coefficient information may be variable-length codes, and after converted into variable-length codes the dummy data of the first code sequence are not longer than coded data of original data.

According to a second aspect of the invention, a pseudo-code sequence such as a pseudo random number sequence is buried in an empty region of trial viewing data obtained by replacing part of a code sequence with dummy data.

The present assignee proposed a technique in which data (trial viewing data) obtained by replacing part of a code sequence with dummy data are distributed to enable trial viewing and users are allowed to freely reproduce sound and video of a narrow band and relatively low quality. If a trial viewer has decided to buy the item because he likes its contents, he can receive correct data (high quality restoration data) to replace the dummy data and enjoy its reproduction with high quality. In this technique, a music signal is converted into spectrum coefficients for each block having a prescribed length, the spectrum coefficients are divided into tone components and the other components, and the tone components are normalized and re-quantized individually and the other components are normalized and re-quantized for each prescribed band. When spectrum signals obtained by the re-quantization are coded from the low-frequency side by using variable-length codes, normalization coefficients of parts of the tone components and the other components whose frequencies are higher than a prescribed frequency are replaced by dummy data and a low-frequency-side portion of part of the variable-length-coded spectrum components whose frequencies are higher than the prescribed frequency is also replaced by dummy data. Reproduction of a wide-band music signal is enabled by acquiring an additional data sequence to be used for dummy data replacement and combining it with dummy-data-inclusive trial listening data that are generated in the above manner. In this technique, an important factor for increasing the safety is that a low-frequency-side portion of part of the variable-length-coded spectrum components whose frequencies are higher than the prescribed frequency is replaced by dummy data. In this manner, reproduction of a wide-band music signal is enabled by acquiring an additional data sequence to be used for dummy data replacement and combining it with dummy-data-inclusive trial listening data that are generated in the above manner.

However, in the case of a fixed bit rate, the same number of bits are allocated to each frame and, if residual bits occur as a result of coding, usually bits having a fixed value "0"

or "1" are arranged in the region of the residual bits. However, when someone attempts to increase the bandwidth of trial listening data illegally by inferring a variable-length code sequence of the trial listening data, this method may allow him to use, as a criterion for judging whether an inferred code sequence is a correct one, whether the inferred code sequence is close, in length, to the correct one.

In view of the above, according to the second aspect of the invention, 0s and 1s are arranged randomly in the residual bit portion of each frame. As a result, when someone attempts to increase the bandwidth of trial listening data illegally, it is difficult for him to judge whether an inferred code sequence is a correct one. Therefore, increasing the bandwidth of trial listening data illegally can be prevented and hence the safety of the trial listening data is increased.

The second aspect of the invention provides a signal reproducing method and device for reproducing a code sequence obtained by coding a signal in prescribed units in which a first code sequence obtained by replacing part of the code sequence with dummy data is received, if a second code sequence containing information necessary for dummy data replacement is received, at least part of the dummy data of the first code sequence are replaced by true data by using the second code sequence, and the first code sequence or a resulting code sequence is decoded. A pseudo-code sequence such as a pseudo random number sequence is buried in an empty region of the first code sequence.

The second aspect of the invention also provides a signal recording method and device for recording a code sequence obtained by coding a signal in prescribed units in which a first code sequence obtained by replacing part of the code sequence with dummy data is received, and if a second code sequence containing information necessary for dummy data replacement is received, at least part of the dummy data of the first code sequence are replaced by true data by using the second code sequence. A pseudo-code sequence such as a pseudo random number sequence is buried in an empty region of the first code sequence.

The second aspect of the invention further provides a code sequence generating method and device in which a code sequence is generated by coding a signal in prescribed units, a first code sequence is generated by replacing part of the code sequence with dummy data, and a second code sequence containing information necessary for dummy data replacement is generated. A pseudo-code sequence such as a pseudo random number sequence is buried in an empty region of the first code sequence.

The code sequence may be generated by coding an input signal in such a manner that the input signal is spectrum-converted and divided into bands, and a code sequence having a prescribed format is generated that contains quantization accuracy information, normalization coefficient information, and spectrum coefficient information in each band, and the dummy data may include dummy data that correspond to at least part of the spectrum coefficient information. In this case, the empty region in the first code sequence may be a region following the spectrum coefficient information. The spectrum coefficient information may be variable-length codes, and after converted into variable-length codes the dummy data of the first code sequence are not longer than coded data of original data.

The code sequence may include variable-length codes and at least part of the dummy data may correspond to variable-length codes. The first code sequence may have a fixed length.

A data converting method according to a third aspect of the invention comprises a calculating step of calculating a data length of third data that are part of second data, a data converting step of converting a first data sequence into a second data sequence by replacing, with the second data, first data having the same data length as the second data, and a generating step of generating a third data sequence that is necessary for restoring the first data sequence from the second data sequence generated by the data converting step. The calculating step calculates a different data length every third data. The third data sequence generated by the generating step contains the data lengths calculated by the calculating step and the first data that are replaced by the second data by the data converting step.

The first data sequence may consist of a plurality of frames, at least two of the frames may contain at least one piece of first data, and the data length of the third data may vary from one frame containing corresponding first data to another.

The third data sequence generated by the generating step may further contain position information indicating a start position of the third data that are contained in the second data sequence.

The data converting step may convert the first data sequence to the second data sequence by replacing, with the second data, at least one of plural pieces of first data contained in the first data sequence so that the reproduction quality is lower when the second data sequence is reproduced than when the first data sequence is reproduced.

The data converting method may further comprise a coding step of coding input data, and the data converting step may convert coded data, produced by the coding step, as the first data sequence into the second data sequence.

The first data may contain variable-length codes.

The first data may contain normalization coefficient information of the coding processing of the coding step.

The first data may contain quantization accuracy information of the coding processing of the coding step.

The first data may contain the number of quantization units of the coding processing of the coding step.

The data converting method may further comprise a conversion-into-frequency-components step for converting the input data into frequency components, and a dividing step of dividing the frequency components into a first signal consisting of tone components and a second signal excluding the first signal. The coding step may perform different kinds of coding processing on the first signal and the second signal.

The data converting method may further comprise a conversion-into-frequency-components step for converting input data into frequency components, and a coding step of coding data of the frequency components. The data converting step may convert coded data, produced by the coding step, as the first data sequence into the second data sequence. The first data may contain spectrum coefficient information of the coding processing of coding the frequency components produced by the conversion-into-frequency-components step.

The second data may be data obtained by replacing at least part of the first data with random data.

The first data may be data having prescribed numerical values, and the second data may be data obtained by minimizing the numerical values of the first data.

The data converting method may further comprise a coding step of coding input data, and the data converting step may convert coded data, produced by the coding step, as the first data sequence into the second data sequence. The second data may be such as to be shorter in data length than the first data when the first data and the second data are decoded.

A data converting device according to the third aspect of the invention comprises calculating means for calculating a data length of third data that are part of second data, data converting means for converting a first data sequence into a second data sequence by replacing, with the second data, first data having the same data length as the second data, and generating means for generating a third data sequence that is necessary for restoring the first data sequence from the second data sequence generated by the data converting means. The calculating means calculates a different data length every third data. The third data sequence generated by the generating means contains the data lengths calculated by the calculating means and the first data that are replaced by the second data by the data converting means.

A program that is recorded on a first recording medium according to the third aspect of the invention comprises a calculating step of calculating a data length of third data that are part of second data, a data converting step of converting a first data sequence into a second data sequence by replacing, with the second data, first data having the same data length as the second data, and a generating step of generating a third data sequence that is necessary for restoring the first data sequence from the second data sequence generated by the data converting step. The calculating step calculates a different data length every third data. The third data sequence generated by the generating step contains the data lengths calculated by the calculating step and the first data that are replaced by the second data by the data converting step.

A first program according to the third aspect of the invention comprises a calculating step of calculating a data length of third data that are part of second data, a data converting step of converting a first data sequence into a second data sequence by replacing, with the second data, first data having the same data length as the second data, and a generating step of generating a third data sequence that is necessary for restoring the first data sequence from the second data sequence generated by the data converting step. The calculating step calculates a different data length every third data. The third data sequence generated by the generating step contains the data lengths calculated by the calculating step and the first data that are replaced by the second data by the data converting step.

A data restoring method according to the third aspect of the invention comprises an acquisition control step of controlling acquisition of a third data sequence containing information necessary for restoring a second data sequence from a first data sequence, and a restoring step of restoring the first data sequence on the basis of the third data sequence the acquisition of which is controlled by the acquisition control step. The third data sequence contains plural pieces of first data necessary for restoring the first data sequence and information indicating data lengths of plural pieces of third data that are parts of the respective pieces of second data. The restoring step restores the first data sequence by replacing the plural pieces of second data contained in the second data sequence with the plural pieces of first data contained in the third data sequence. The plural pieces of third data have different data lengths.

The first data sequence may consist of a plurality of frames, at least two of the frames may contain at least one piece of first data, and the data length of the third data may vary frame by frame.

The first data sequence may be coded data sequence, and the first data may contain variable-length codes.

The third data sequence the acquisition of which is controlled by the acquisition control step may further contain position information indicating a start position of the first data to replace the second data.

The data restoring method may further comprise a recording control step of controlling recording, on a prescribed recording medium, of the first data sequence restored by the restoring step.

The data restoring method may further comprise a decoding step of decoding the first data sequence restored by the restoring step.

The data restoring method may further comprise a reproduction control step of controlling reproduction of the first data sequence decoded by the decoding step.

The first data sequence may be coded data sequence, and the first data may contain normalization coefficient information.

The first data sequence may be coded data sequence, and the first data may contain quantization accuracy information.

The first data sequence may be a coded data sequence, and the first data may contain the number of quantization units.

The first data sequence may be a data sequence obtained through conversion into frequency components and coding, and the first data may contain spectrum coefficient information.

The first data may be data having prescribed numerical values, and the second data may be data obtained by minimizing numerical values of the first data.

The second data may be data obtained by replacing at least part of the first data with random data.

The second data may be such as to be shorter in data length than the first data when the first data and the second data are decoded by the decoding step.

The restoring step may restore the first data sequence by replacing, with the first data contained in the third data sequence, the second data contained in the second data sequence so that the reproduction quality is higher when the first data sequence is reproduced than when the second data sequence is reproduced.

A data restoring device according to the third aspect of the invention comprises acquiring means for acquiring a third data sequence containing information necessary for restoring a second data sequence from a first data sequence, and restoring means for restoring the first data sequence on the basis of the third data sequence acquired by the acquiring means. The third data sequence contains plural pieces of first data necessary for restoring the first data sequence and information indicating data lengths of plural pieces of third data that are parts of the respective pieces of second data. The restoring means restores the first data sequence by replacing the plural pieces of second data contained in the second data sequence with the plural pieces of first data contained in the third data sequence. The plural pieces of third data have different data lengths.

A program that is recorded on a second recording medium according to the third aspect of the invention comprises an acquisition control step of controlling acquisition of a third data sequence containing information necessary for restoring a second data sequence from a first data sequence, and a restoring step of restoring the first data sequence on the basis of the third data sequence the acquisition of which is controlled by the acquisition control step. The third data sequence contains plural pieces of first data necessary for restoring the first data sequence and information indicating data lengths of plural pieces of third data that are parts of the respective pieces of second data. The restoring step restores the first data sequence by replacing the plural pieces of second data contained in the second data sequence with the plural pieces of first data contained in the third data sequence. The plural pieces of third data have different data lengths.

A second program according to the third aspect of the invention comprises an acquisition control step of controlling acquisition of a third data sequence containing information necessary for restoring a second data sequence from a first data sequence, and a restoring step of restoring the first data sequence on the basis of the third data sequence the acquisition of which is controlled by the acquisition control step. The third data sequence contains plural pieces of first data necessary for restoring the first data sequence and information indicating data lengths of plural pieces of third data that are parts of the respective pieces of second data. The restoring step restores the first data sequence by replacing the plural pieces of second data contained in the second data sequence with the plural pieces of first data contained in the third data sequence. The plural pieces of third data have different data lengths.

A first data format according to the third aspect of the invention includes a plurality of frames that are set so as to provide lower reproduction quality than corresponding portions of contents data do. The plurality of frames contain variable-length codes, part of the variable-length codes are replaced by dummy data, and the data length of part of the dummy data varies frame by frame.

A second data format according to the third aspect of the invention includes plural pieces of first data to replace plural pieces of second data contained in trial listening data, respectively, and fourth data indicating data lengths of the plural pieces of third data that are parts of the plural pieces of second data, respectively.

In the data converting method, the data converting device, and the first program according to the third aspect of the invention, data lengths of third data that are parts of second data are calculated, a first data sequence is converted into a second data sequence by replacing first data with the second data, and a third data sequence necessary for restoring the first data sequence from the second data sequence thus generated is generated. Data lengths that are different for the plural pieces of third data are calculated. The generated third data sequence contain the calculated data lengths and the first data that have been replaced by the second data.

In the data restoring method, the data restoring device, and the second program according to the third aspect of the invention, a third data sequence containing information necessary for restoring a second data sequence from a first data sequence is acquired, and the first data sequence is restored on the basis of the acquired third data sequence. The third data sequence contains plural pieces of first data necessary for restoring the first data sequence and information indicating data lengths of plural pieces of third data that are parts of the respective pieces of second data. The first data sequence is restored by replacing the plural pieces of second data contained in the second data sequence with the plural pieces of first data contained in the third data sequence. The plural pieces of third data have different data lengths.

In the invention, it is preferable to employ, for example, as a format to be used in coding an input signal, a format in which at least portions relating to contents data (e.g., spectrum coefficients or pixel value) and coding parameters necessary for decoding (e.g., quantization accuracy information and normalization coefficient information) are multiplexed with each other on a code sequence. It is possible to further multiplex meta-information relating to contents attributions etc., copyright management information, encryption information, etc. with the above information on the code sequence.

DESCRIPTION OF THE PREFERRED EMBODIMENTS

First Embodiment

Before description of a first embodiment, an optical disc recording and reproducing apparatus as a general compressed data recording and reproducing apparatus to be used for the description of the first embodiment will be described with reference to drawings.

Figure 1:
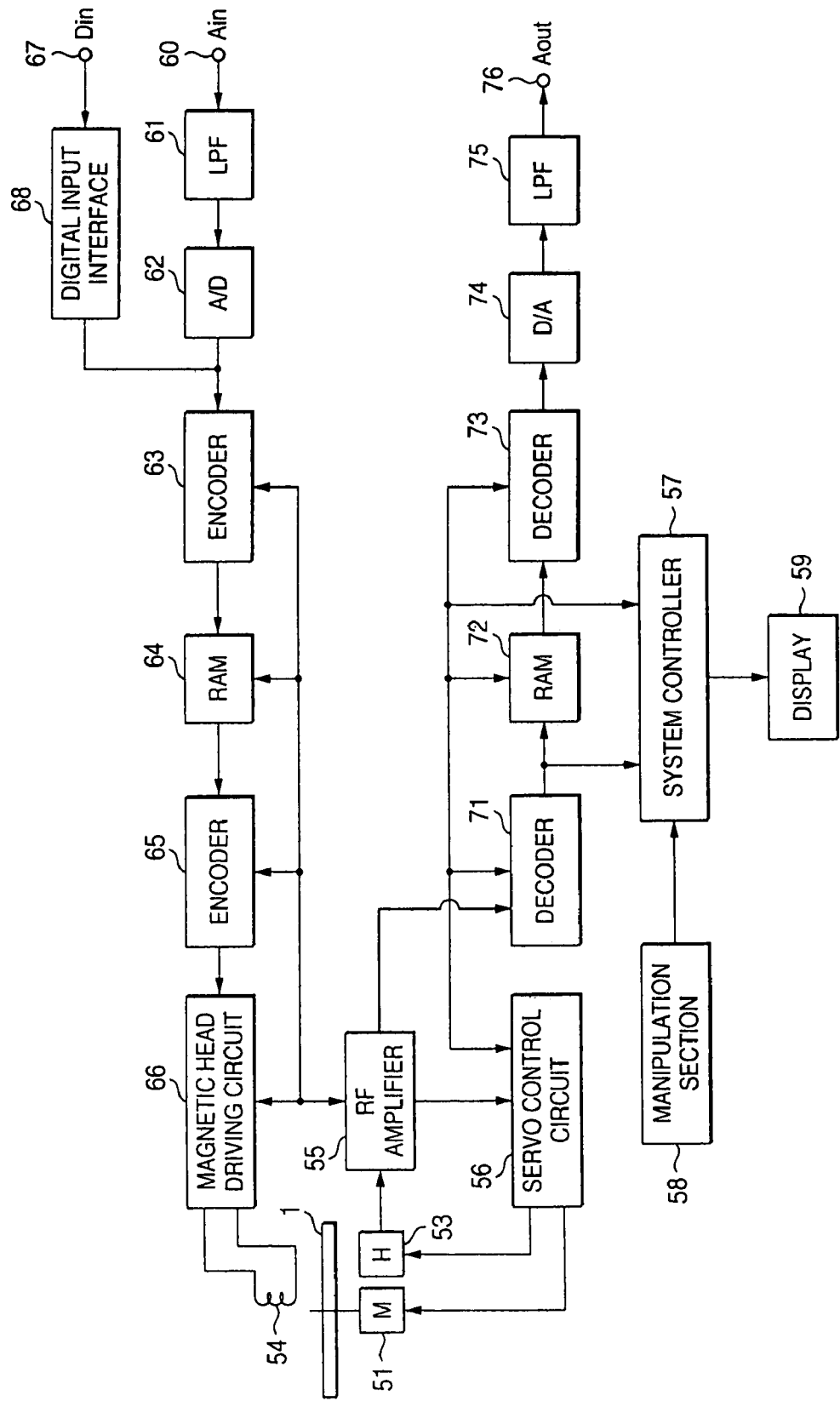
FIG. 1 is a block diagram showing the general configuration of an optical disc recording and reproducing apparatus to be used for the description of a first embodiment of the present invention.

FIG. 1 is a block diagram of an exemplary optical disc recording and reproducing apparatus. In the apparatus of FIG. 1, a magneto-optical disc 1 that is rotationally driven by a spindle motor 51 is used as a recording medium. To record data on the magneto-optical disc 1, a modulated magnetic field corresponding to recording data is applied to the disc 1 by a magnetic head 54 in a state that laser light is applied to the disc 1 by an optical head 53, whereby data are recorded along the recording track of the magneto-optical disc 1 by what is called magnetic-field-modulated recording. To reproduce recorded data, the recording track of the magneto-optical disc 1 is traced by laser light that is emitted from the optical head 53 (magneto-optical reproduction).

For example, the optical head 53 is composed of optical parts including a laser light source such as a laser diode, a collimator lens, an object lens, a polarizing beam splitter, and a cylindrical lens, a photodetector having a light receiving portion of a prescribed pattern, and other components. The optical head 53 is opposed to the magnetic head 54 with the magneto-optical disc 1 interposed in between. To record data on the magneto-optical disc 1, the magnetic head 54 is driven by a recording-system head driving circuit 66 (described later) so as to apply a modulated magnetic field corresponding to recording data to the disc 1 and laser light is applied to a target track of the disc 1 by the optical disc 53, whereby thermo-magnetic recording is performed by the magnetic field modulation method. The optical head 53 detects reflection light of laser light applied to a target track, and thereby detects a focusing error and a tracking error by, for example, what is called an astigmatic method and a push-pull method, respectively. To reproduce data from the magnet-optical disc 1, the optical head 53 generates a reproduction signal by detecting a difference between polarization angles (Kerr rotation angles) of reflection laser light beams coming from a target track while detecting a focusing error and a tracking error.

An output of the optical head 53 is supplied to an RF circuit 55. The RF circuit 55 extracts the focusing error and the tracking error from the output of the optical head 53 and supplies those signals to a servo control circuit 56. Further, the RF circuit 55 binarizes a reproduction signal and supplies a resulting signal to a reproduction-system decoder 71 described later.

For example, the servo control circuit 56 is composed of a focusing servo control circuit, a tracking servo control circuit, a spindle motor servo control circuit, a sled servo control circuit, etc. The focusing servo control, circuit performs a focusing control on the optical system of the optical head 53 so as to make the focusing error zero. The tracking servo control circuit performs a tracking control on the optical system of the optical head 53 so as to make the tracking error zero. The spindle motor servo control circuit controls the spindle motor 51 so as to rotate the magnet-optical disc 1 at a prescribed rotation speed (e.g., at a constant linear velocity). The sled servo control circuit moves the optical head 53 and the magnetic head 54 to a target track position on the magneto-optical disc 1 that is specified by a system controller 57. The servo control circuit 56, which performs the above various control operations, sends, to the system controller 57, information indicating operation states of the individual components that are controlled by the servo control circuit 56.

A key input manipulation section 58 and a display section 59 are connected to the system controller 57. The system controller 57 controls the recording system and the reproduction system on the basis of manipulation input information coming from the key input manipulation section 58. Further, the system controller 57 manages a recording position or a reproducing position on the recording track being traced by the optical head 53 and the magnetic head 54 on the basis of sector-by-sector address information that is reproduced from the recording track of the magneto-optical disc 1 as a header time, sub-code Q data, etc. Still further, the system controller 57 performs a control for displaying a reproduction time on the display section 59 on the basis of a data compression ratio of this compressed data recording and reproducing apparatus and information indicating the reproducing position on the recording track.

In the reproduction time display, actual time information is calculated by multiplying sector-by-sector address information (absolute time information) that is reproduced from the recording track of the magneto-optical disc 1 as a header time, what is called sub-code Q data, etc. by the reciprocal of the data compression ratio (for example, it is equal to 4 if the data compression ratio is 1/4), and is displayed on the display section 59. Also in recording, if absolute time information is recorded in advance on the recording track of the magneto-optical disc 1 (i.e., the disc 1 is preformatted), a present position can be displayed in the form of an actual recording time by reading preformatted absolute time information and multiplying it by the reciprocal of the data compression ratio.

In the recording system of the optical disc recording and reproducing apparatus of FIG. 1, an analog audio input signal $A_{IN}$ that is input from an input terminal 60 is supplied to an A/D converter 62 via a low-pass filter 61. The A/D converter 62 quantizes the analog audio input signal $A_{IN}$. A digital audio signal that is output from the A/D converter 62 is supplied to an ATC (adaptive transform coding) encoder 63. A digital audio input signal $D_{IN}$ that is input from an input terminal 67 is supplied to the ATC encoder 63 via a digital input interface circuit 68. The ATC encoder 63 performs bit compression (data compression) corresponding to a prescribed data compression ratio on the digital audio PCM data having a prescribed transfer rate that has been obtained by quantizing the input signal $A_{IN}$ with the A/D converter 62. Compressed data (ATC data) that are output from the ATC encoder 63 are supplied to a memory (RAM) 64. If the data compression ratio is equal to 1/8, for example, the data transfer rate at this point is reduced to 1/8 (9.375 sectors/sec) of a data transfer rate (75 sectors/sec) of what is called a CD-DA format, which is the format of the standard digital audio CD.

Data writing and reading on the memory (RAM) 64 are controlled by the system controller 57. The memory 64 serves as a buffer memory for temporarily storing ATC data that are supplied from the ATC encoder 63 and for allowing their recording on the disc 1 when necessary. That is, where the data compression ratio is equal to 1/8, for example, the data transfer rate of compressed audio data that are supplied form the ATC encoder 63 is reduced to 1/8 (9.375 sectors/sec) of the data transfer rate (75 sectors/sec) of the standard CD-DA format, which is the format of the standard digital audio CD. Such compressed data are written to the memory 64 consecutively. As described above, for such compressed data (ATC data), it is sufficient to perform recording on one sector for each set of eight sectors. However, since performing recording every eight sectors is almost impossible in practice, sector-continuous recording (described below) is performed.

This type of recording is performed in a burst-like manner at the same data transfer rate (75 sectors/sec) as in the standard CD-DA format in units of a cluster consisting of a prescribed number of sectors (e.g., 32 sectors plus several sectors) with insertion of halt periods. That is, ATC audio data (recording data) having the data compression ratio 1/8 that were written to the memory 64 consecutively at the low transfer rate of 9.375 (75/8) sectors/sec corresponding to the above-mentioned bit compression rate are read from the memory 64 in a burst-like manner at a transfer rate of 75 sectors/sec. Although the transfer rate, including recording halt periods, of data that are read from the memory 64 and will be recorded in the disc 1 is as low as 9.375 sectors/sec, the instantaneous data transfer rate during each burst-like recording operation is equal to the standard value of 75 sectors/sec. Therefore, if the disc rotation speed (constant linear velocity) is the same as in the standard CD-DA format, recording is performed at the same recording density with the same recording pattern as in the standard CD-DA format.

ATC audio data (recording data) that are read from the memory 64 in a burst-like manner at the (instantaneous) transfer rate of 75 sectors/sec are supplied to an encoder 65. In a data sequence that is supplied from the memory 64 to the encoder 65, the unit of one continuous recording operation is a cluster consisting of a plurality of sectors (e.g., 32 sectors) plus several sectors for cluster connection that are provided before and after the cluster, respectively. Each set of sectors for cluster connection is set longer than an interleave length of the encoder 65 so as not to affect data of other clusters even if interleaving is performed.

The encoder 65 performs error correction coding processing (addition of a parity bit and interleaving) and EFM coding processing on recording data that are supplied from the memory 64 in a burst-like manner. Resulting recording data are supplied to the magnetic head driving circuit 66.

The magnetic head driving circuit 66, to which the magnetic head 54 is connected, drives the magnetic head 54 so that the magnetic head 54 applies a modulated magnetic field corresponding to the recording data to the magneto-optical disc 1.

The system controller 57 performs the above-described memory control on the memory 64, and controls recording positions so that recording data that are read from the memory 64 in a burst-like manner under the above memory control are recorded continuously on the recording track of the magneto-optical disc 1. The recording position control is performed in such a manner that the system controller 57 manages recording positions of recording data that are read from the memory 64 in a burst-like manner and supplies the servo control circuit 56 with a control signal that specifies recording positions on the recording tracks of the magneto-optical disc 1.

Next, the reproduction system of the optical disc recording and reproducing apparatus of FIG. 1 will be described. This reproduction system is to reproduce recording data that were recorded continuously on the recording track of the magneto-optical disc 1 by the above-described recording system. The reproduction system is provided with a decoder 71 that is supplied, after being binarized by the RF circuit 55, with a reproduction output obtained by tracing the recording track of the magneto-optical disc 1 with laser light that is emitted from the optical head 53. The reproduction system can read not only the magneto-optical disc but also optical discs dedicated to reproduction of the same kind as the CD (compact disc) and what is called the CD-R optical disc.

The decoder 71, which corresponds to the encoder 65 of the recording system, performs such processing as error correction decoding processing and EFM decoding processing on a reproduction output as binarized by the RF circuit 55, and reproduces ATC audio data having the data compression ratio 1/8 at a transfer rate of 75 sectors/sec which is higher than the regular transfer rate. The reproduction data produced by the decoder 71 are supplied to a memory (RAM) 72.

Data writing and reading on the memory (RAM) 72 are controlled by the system controller 57. Reproduction data that are supplied from the decoder 71 at the transfer rate of 75 sectors/sec are written to the memory 72 in a burst-like manner at the same transfer rate of 75 sectors/sec. Reproduction data that were written to the memory 72 in a burst-like manner at the transfer rate of 75 sectors/sec are read from it consecutively at a transfer rate of 9.375 sectors/sec which corresponds to the data compression ratio 1/8.

The system controller 57 performs a memory control for writing reproduction data to the memory 72 at the transfer rate of 75 sectors/sec and reading the reproduction data from the memory 72 consecutively at the transfer rate of 9.375 sectors/sec. In addition to performing the above memory control on the memory 72, the system controller 57 controls reproduction positions so that reproduction data to be written to the memory 72 in a burst-like manner under the above memory control are reproduced continuously from the recording track of the magneto-optical disc 1. The reproduction position control is performed in such a manner that the system controller 57 manages reproduction positions of reproduction data to be written to the memory 72 in a burst-like manner and supplies the servo control circuit 56 with a control signal that specifies reproduction positions on the recording track of the magneto-optical disc (or optical disc) 1.

ATC audio data (reproduction data) that are read from the memory 72 consecutively at a transfer rate of 9.375 sectors/sec are supplied to an ATC decoder 73. The ATC decoder 73, which corresponds to the ATC encoder 63 of the recording system, reproduces digital audio data of 16 bits by expanding (bit expansion) ATC data by a factor of 8. The digital audio data produced by the ATC decoder 73 are supplied to a D/A converter 74.

The D/A converter 74 converts the digital audio data that are supplied from the ATC decoder 73 into an analog signal, that is, an analog audio output signal $A_{OUT}$, which is output from an output terminal 76 via a low-pass filter 75.

Next, high-efficiency compression coding to be performed on a signal will be described. That is, a technique of performing high-efficiency coding on an input digital signal such as an audio PCM signal using the techniques of subband coding (SBC), adaptive transform coding (ATC), and adaptive bit allocation will be described with reference to FIG. 2 and following figures.

Figure 2:
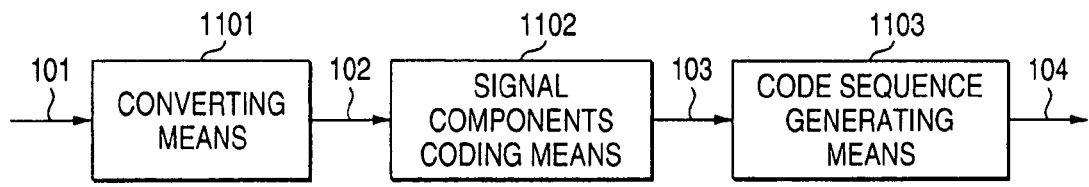
FIG. 2 is a block diagram showing the general configuration of an exemplary coding device to be used for the description of the first embodiment of the invention.

FIG. 2 is a block diagram showing a specific example of a coding device for coding an acoustic waveform signal that will be used for the description of the this embodiment. In this example, an input waveform signal 101 is converted into a signal frequency component signal 102 by a converting means 1101. Each component is coded by a signal components coding means 1102, and a code sequence generating means 1103 generates a code sequence 104.

Figure 3:
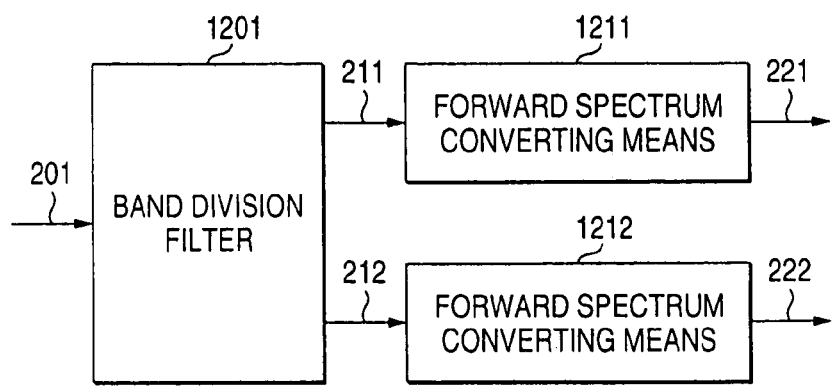
FIG. 3 is a block diagram showing a specific example of a converting means of the coding device of FIG. 2.

FIG. 3 shows a specific example of the converting means 1101 shown in FIG. 2. Signals in two respective bands produced by a band division filter 1201 are converted into spectrum signal components 221 and 222 by forward spectrum converting means 1211 and 1212 such as MDCT elements, respectively, in the respective bands. The signal 201 in FIG. 3 corresponds to the signal 101 in FIG. 2, and the signals 221 and 222 in FIG. 3 correspond to the signal 102 in FIG. 2. In the converting means of FIG. 3, the bandwidth of the signals 211 and 212 is made 1/2 of that of the signal 201, that is, the signal 201 is decimated at a ratio of 1/2. Converting means other than the one shown in FIG. 3 are conceivable. For example, an input signal may be converted into spectrum signals directly by an MDCT element. DFT (discrete Fourier transform) elements or DCT (discrete cosine transform) elements may be used rather than MDCT elements. Although it is possible to divide a signal into subband components by what is called a band division filter, it is convenient to employ the method of converting a signal into frequency components by the spectrum conversion which can produce a lot of frequency components with a relatively small amount of calculation.

Figure 4:
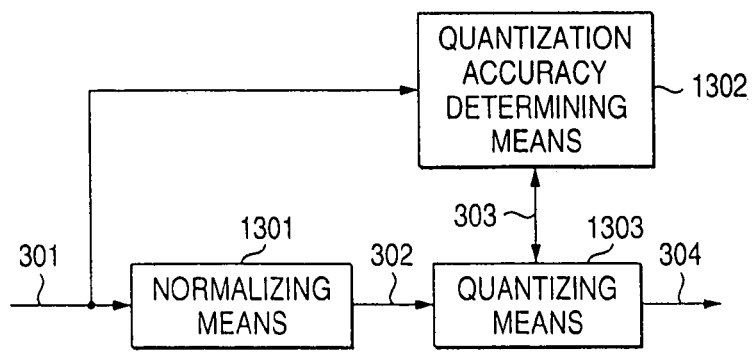
FIG. 4 is a block diagram showing a specific example of a signal components coding means of the coding device of FIG. 2.

FIG. 4 shows a specific example of the signal components coding means 1102 shown in FIG. 2. An input signal 301 is normalized in each band by a normalizing means 1301 into a signal 302, which is quantized by a quantizing means 1303 on the basis of quantization accuracy information 303 that is calculated by a quantization accuracy determining means 1302, whereby a signal 304 is output. The signal 301 in FIG. 4 corresponds to the signal 102 in FIG. 2. The signal 304 in FIG. 4 corresponds to the signal 103 in FIG. 2 and includes not only quantized signal components but also normalization coefficient information and the quantization accuracy information.

Figure 5:
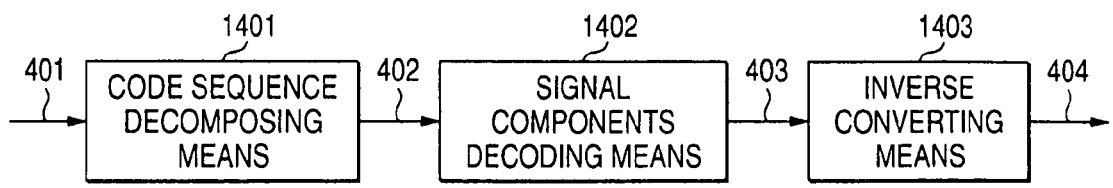
FIG. 5 is a block diagram showing the general configuration of an exemplary decoding device to be used for the description of the first embodiment of the invention.

FIG. 5 is a block diagram showing a specific example of a decoding device for producing an acoustic signal on the basis of a code sequence that is generated by the coding device of FIG. 2. In this specific example, codes 402 of each signal component are extracted from a code sequence 401 by a code sequence decomposing means 1401. Each signal component 403 is restored from the codes 402 by a signal components decoding means 1402, and an acoustic waveform signal 404 is produced by an inverse converting means 1403.

Figure 6:
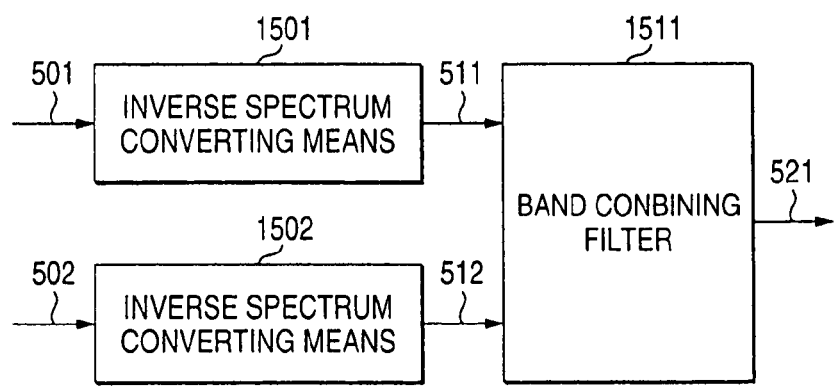
FIG. 6 is a block diagram showing a specific example of an inverse converting means 1403 of the decoding device of FIG. 5.

FIG. 6 shows a specific example of the inverse converting means 1403 shown in FIG. 5, which corresponds to the specific example (see FIG. 3) of the converting means 1101. Signals 511 and 512 in respective bands produced by respective inverse spectrum converting means 1501 and 1502 are combined by a band combining filter 1511. Signals 501 and 502 in FIG. 6 correspond to the signal 403 in FIG. 5, and a signal 521 in FIG. 6 corresponds to the signal 404 in FIG. 5.

Figure 7:
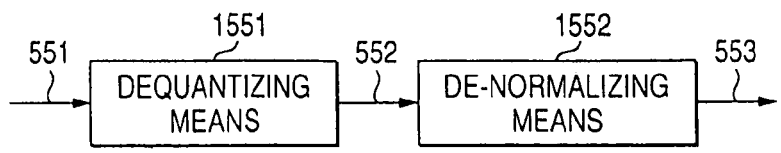
FIG. 7 is a block diagram showing a specific example of a signal components decoding means of the decoding device of FIG. 5.

FIG. 7 shows a specific example of the signal components decoding means 1402 shown in FIG. 5. A signal 551 in FIG. 7 corresponds to the signal 402 in FIG. 5, and a signal 553 in FIG. 7 corresponds to the signal 403 in FIG. 5. The spectrum signal 551 is dequantized by the dequantizing means 1551 into a signal 552, which is de-normalized by a de-normalizing means 1552, whereby a signal 553 is produced.

Figure 8:
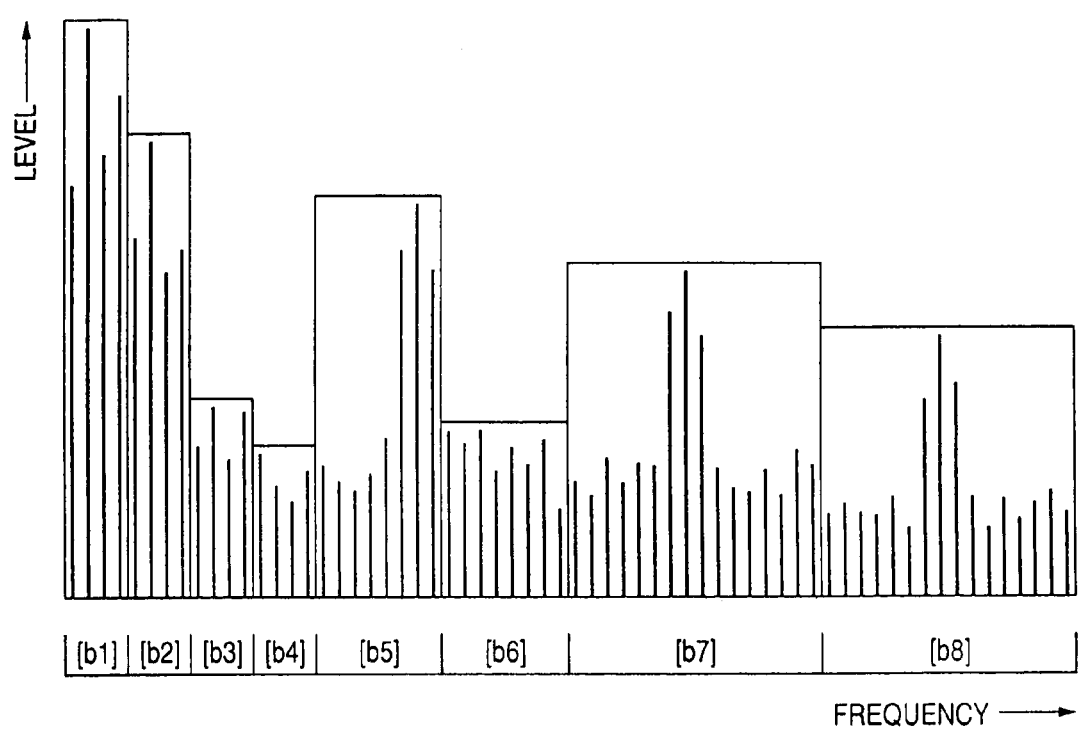
FIG. 8 illustrates a coding method to be used for the description of the first embodiment of the invention.

FIG. 8 illustrates a conventional coding method that is used in the coding device of FIG. 2. In the example of FIG. 8, spectrum signals are ones obtained by the converting means of FIG. 3. In FIG. 8, the levels of the absolute values of spectrum signals obtained by an MDCT element are shown in dB. Each prescribed time block of an input signal is converted into, for example, 64 spectrum signals, which are normalized and quantized in such a manner as to be grouped into coding units in eight bands b1 to b8. Varying the quantization accuracy from one coding unit to another depending on the manner of distribution of the frequency components enables coding that can minimize deterioration in sound quality and hence is efficient for the auditory sense.

Figure 9:
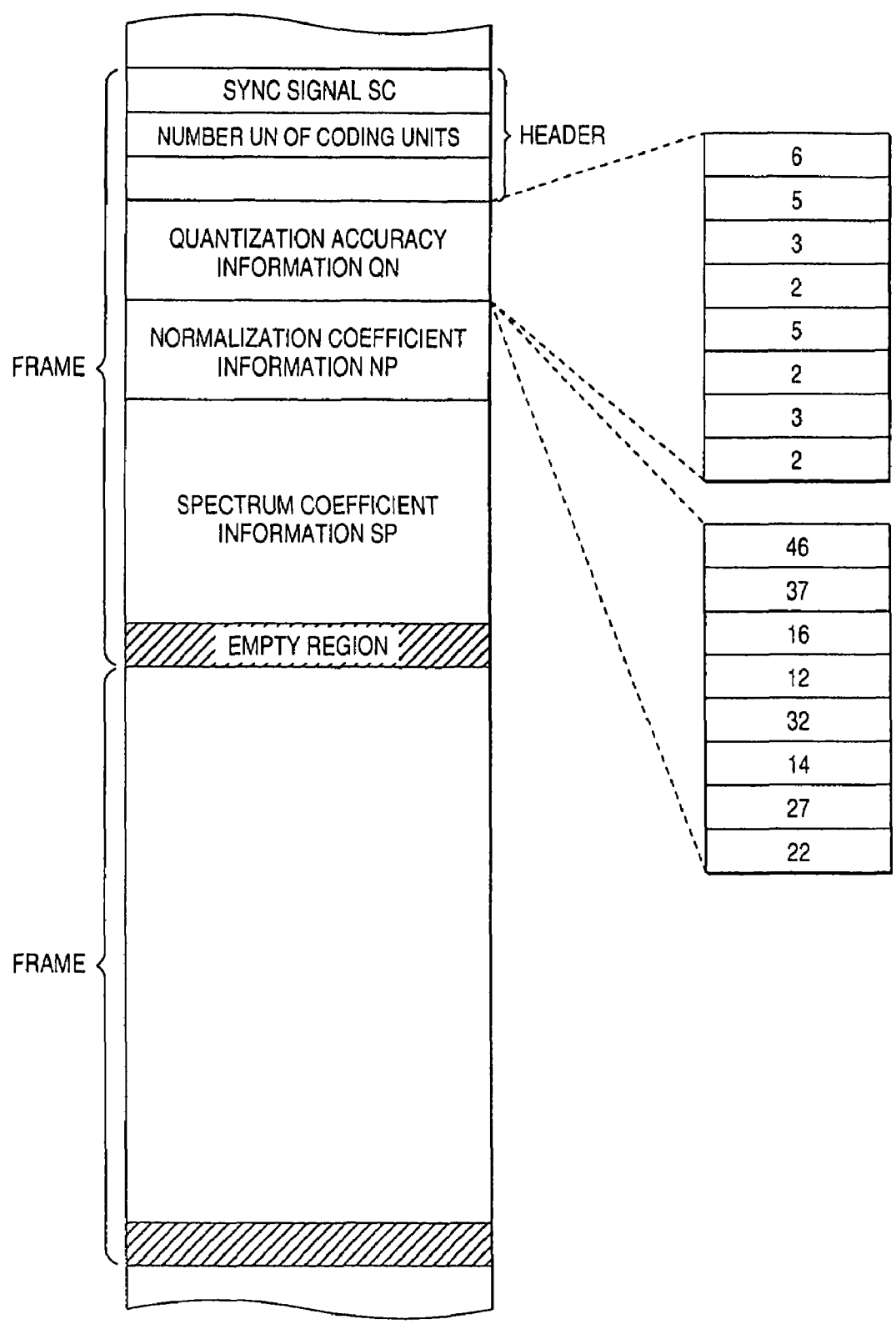
FIG. 9 illustrates an exemplary code sequence that is obtained by the coding method of FIG. 8.

FIG. 9 shows a specific example illustrating how a signal that has been coded in the above-described manner is recorded in a recording medium. In this specific example, a fixed-length header contains a sync signal SC and the number UN of coding units is recorded at the head of each frame. Pieces of quantization accuracy information QN are recorded after the header in the number UN of coding units, and pieces of normalization coefficient information NP are recorded thereafter in the number UN of coding units. Normalized and quantized spectrum coefficient information SP is recorded thereafter. Where the frame length is fixed, an empty region may be formed after the spectrum coefficient information SP. The example of FIG. 9 corresponds to a case that the spectrum signals of FIG. 8 are normalized and quantized. As shown in FIG. 8, the pieces of quantization accuracy information QN are such that 6 bits are allocated to the lowest-frequency coding unit and 2 bits are allocated to the highest-frequency coding unit. The pieces of normalization coefficient information NP are such that a value "46" is allocated to the lowest-frequency coding unit and a value "22" is allocated to the highest-frequency coding unit. For example, the pieces of normalization coefficient information NP are values that are in proportion to dB values.

It is possible to obtain higher coding efficiency than in the above-described method. For example, the coding efficiency can be increased by allocating relatively short code lengths to quantized spectrum signals that occur at high frequencies and allocating relatively long code lengths to quantized spectrum signals that occur at low frequencies. Further, employing a greater conversion block length makes the amount of sub-information such as the quantization accuracy information and the normalization coefficient information relatively small. Since the frequency resolution is increased, the quantization accuracy can be adjusted more finely on the frequency axis, which leads to increase in coding efficiency.

The specification and the drawings of Japanese patent Application No. 152865/1993 or WO 94/28633 of the present inventors describe a method in which tone components that are particularly important in terms of the auditory sense, that is, signal components whose energy is concentrated in the neighborhood of a particular frequency, are separated from generated spectrum signals and coded separately from the other spectrum components. This method makes it possible to code an audio signal or the like efficiently at a high compression ratio while causing almost no deterioration for the human auditory sense.

Figure 10:
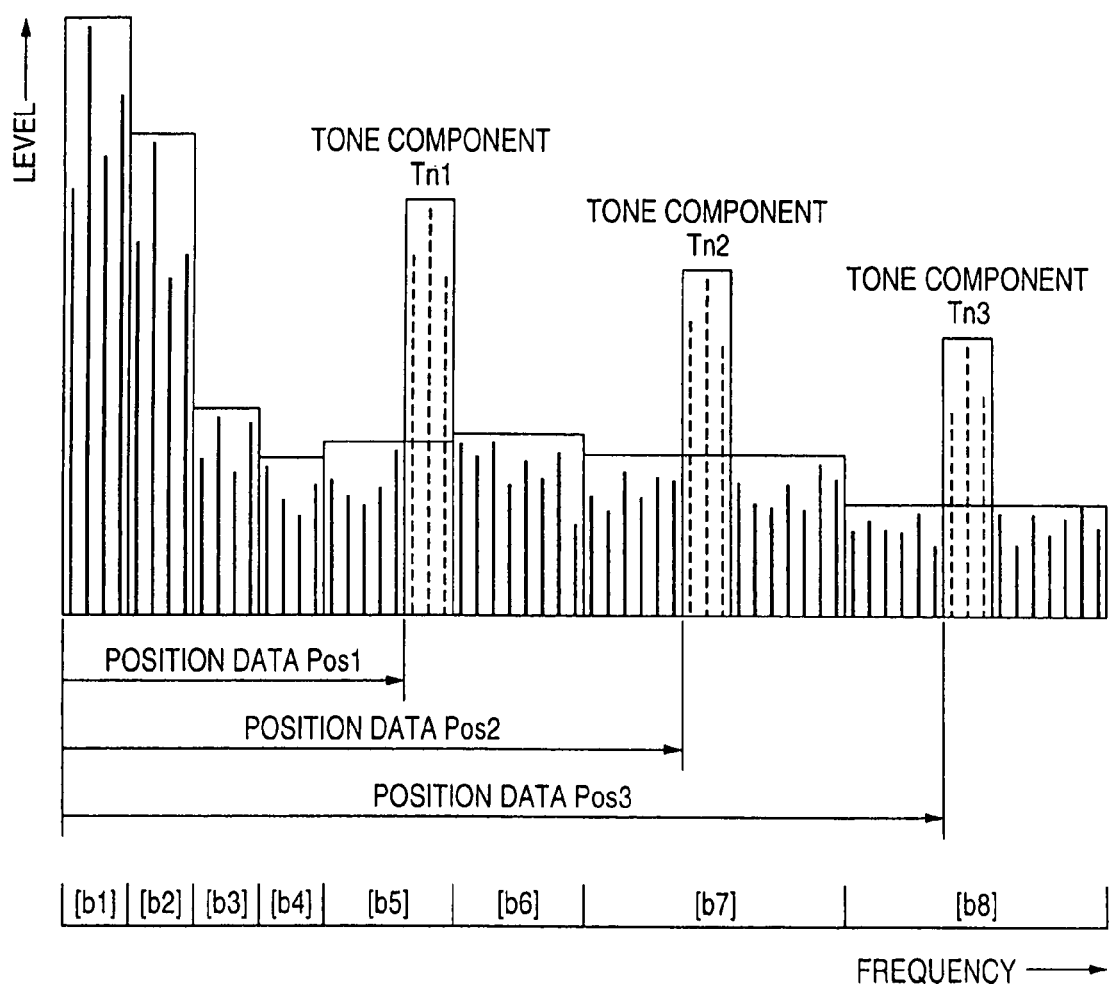
FIG. 10 illustrates another exemplary coding method to be used for the description of the first embodiment of the invention.

FIG. 10 illustrates a coding method that uses the above method, and shows how coding is performed by separating tone components having particularly high levels, for example, tone components Tn1 to Tn3, from spectrum signals. Although pieces of position information, for example, position data Pos1 to Pos3, are necessary for the respective tone components Tn1 to Tn3, the spectrum signals that remain after the tone components Tn1 to Tn3 have been removed can be quantized with a small number of bits. Therefore, particularly efficient coding is enabled if this method is used for a signal in which energy is concentrated in particular spectrum signals.

Figure 11:
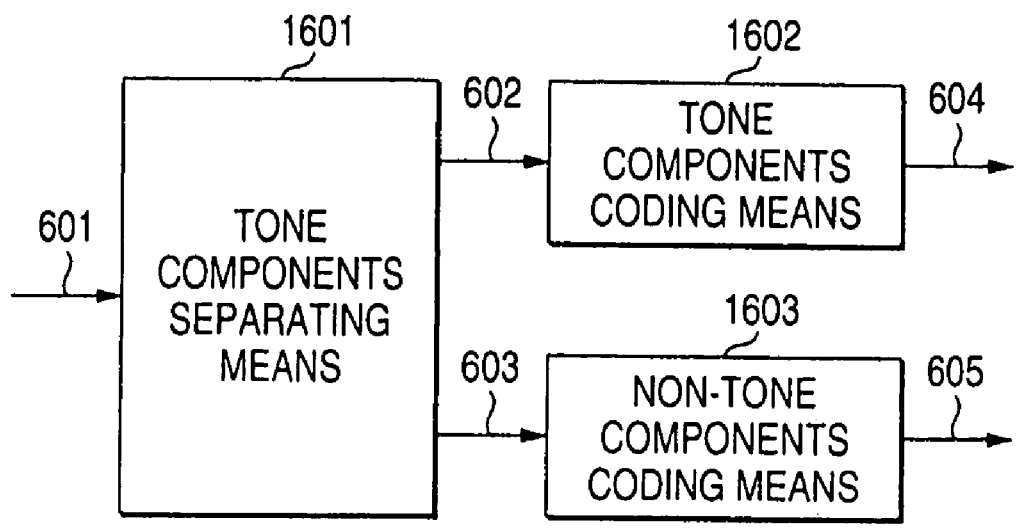
FIG. 11 is a block diagram showing an exemplary signal components coding means to be used for implementing the coding method of FIG. 10.

FIG. 11 shows a configuration of the signal components coding means 1102 shown in FIG. 2 that is employed in the case where tone components are separated and coded in the above-described manner. An output signal 102 (i.e., a signal 601 in FIG. 11) of the converting means 1101 in FIG. 2 is separated by a tone components separating means 1601 into tone components (signal 602) and non-tone components (signal 603), which are coded by a tone components coding means 1602 and a non-tone components coding means 1603, respectively, whereby signals 604 and 605 are produced. Each of the tone components coding means 1602 and the non-tone components coding means 1603 has the same configuration as the signal components coding means of FIG. 4. However, the tone components coding means 1602 also codes pieces of position information of the tone components.

Figure 12:
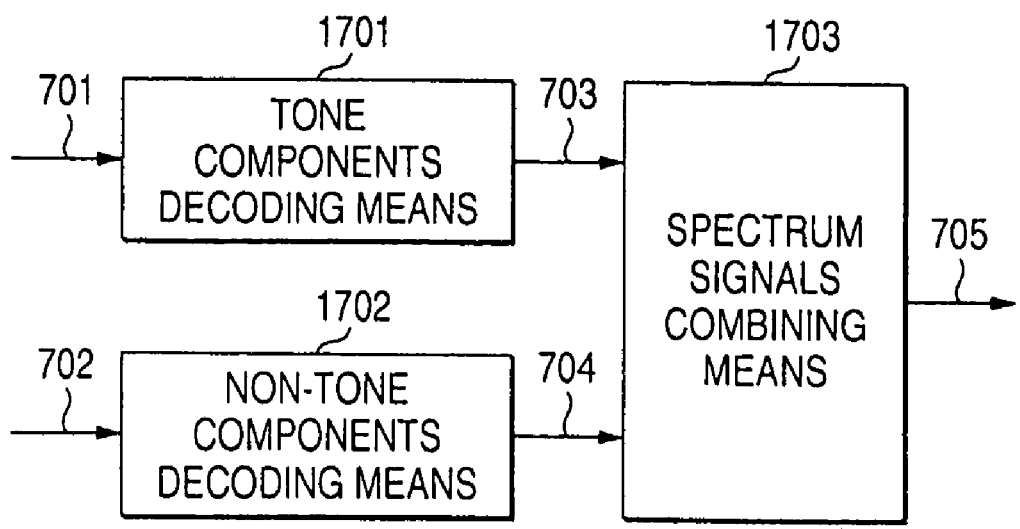
FIG. 12 is a block diagram showing an exemplary signal components decoding means of a decoding device for decoding a code sequence that is obtained by the coding method of FIG. 10.

FIG. 12 shows a configuration of the signal components decoding means 1402 shown in FIG. 5 that is employed in the case of decoding a code sequence obtained by separating and coding tone components in the above-described manner. A signal 701 in FIG. 12 corresponds to the signal 604 in FIG. 11, and a signal 702 in FIG. 12 corresponds to the signal 605 in FIG. 11. The signal 701 is decoded by a tone components decoding means 1701 into a signal 703, which is supplied to a spectrum signals combining means 1703. The signal 702 is decoded by a non-tone components decoding means 1702 into a signal 704, which is also supplied to the spectrum signals combining means 1703. The spectrum signals combining means 1703 combines together the tone components (signal 703) and the non-tone components (signal 704) and thereby produces a signal 705.

Figure 13:
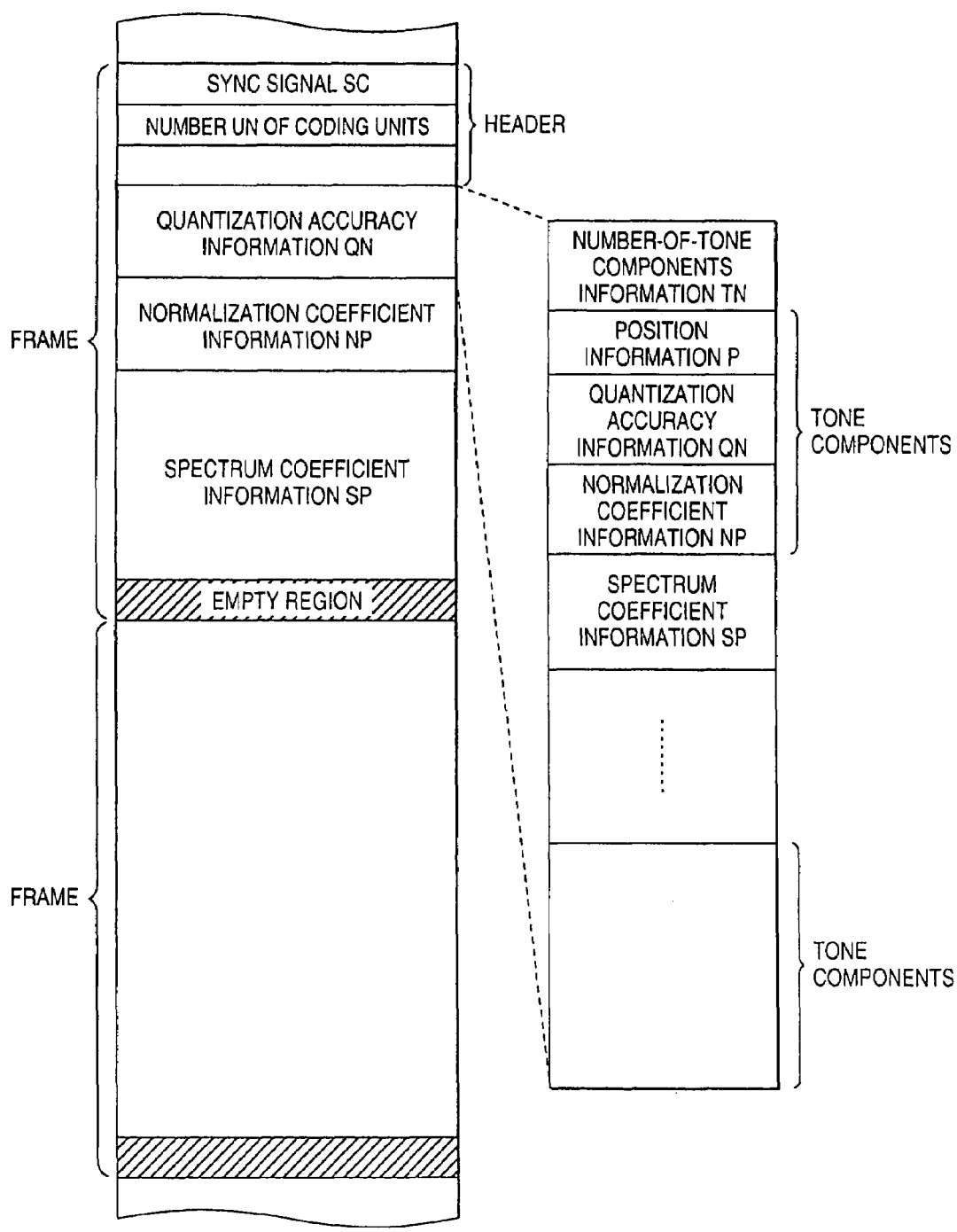
FIG. 13 shows an exemplary code sequence obtained by the coding method of FIG. 10.

FIG. 13 shows a specific example illustrating how a signal that has been coded in the above-described manner is recorded on a recording medium. In this specific example, tone components are separated and coded and a resulting code sequence is recorded between a header and quantization accuracy information QN. Of the tone components sequence, number-of-tone-components information TN is recorded first and data of the respective tone components are recorded thereafter. The data of the tone components are position information P, quantization accuracy information QN, normalization coefficient information NP, and spectrum coefficient information SP. This specific example has the following additional features. The frequency resolution is increased by setting the conversion block length that is used in the conversion into spectrum signals two times greater than in the specific example of FIG. 9. And variable-length codes are introduced. As a result, a code sequence of an acoustic signal that is two times longer than in the specific example of FIG. 9 is recorded in a frame of the same number of bytes.

The techniques preceding the first embodiment of the invention have been described above. When applied to audio, for example, the first embodiment of the invention is intended to allow a user to freely listen to a relatively low quality audio signal as trial listening, to allow a user to listen to a relatively high quality audio signal by, for example, buying a relatively small amount of additional data, and to bury random data in empty regions of a trial audio signal if necessary.

Figure 14:
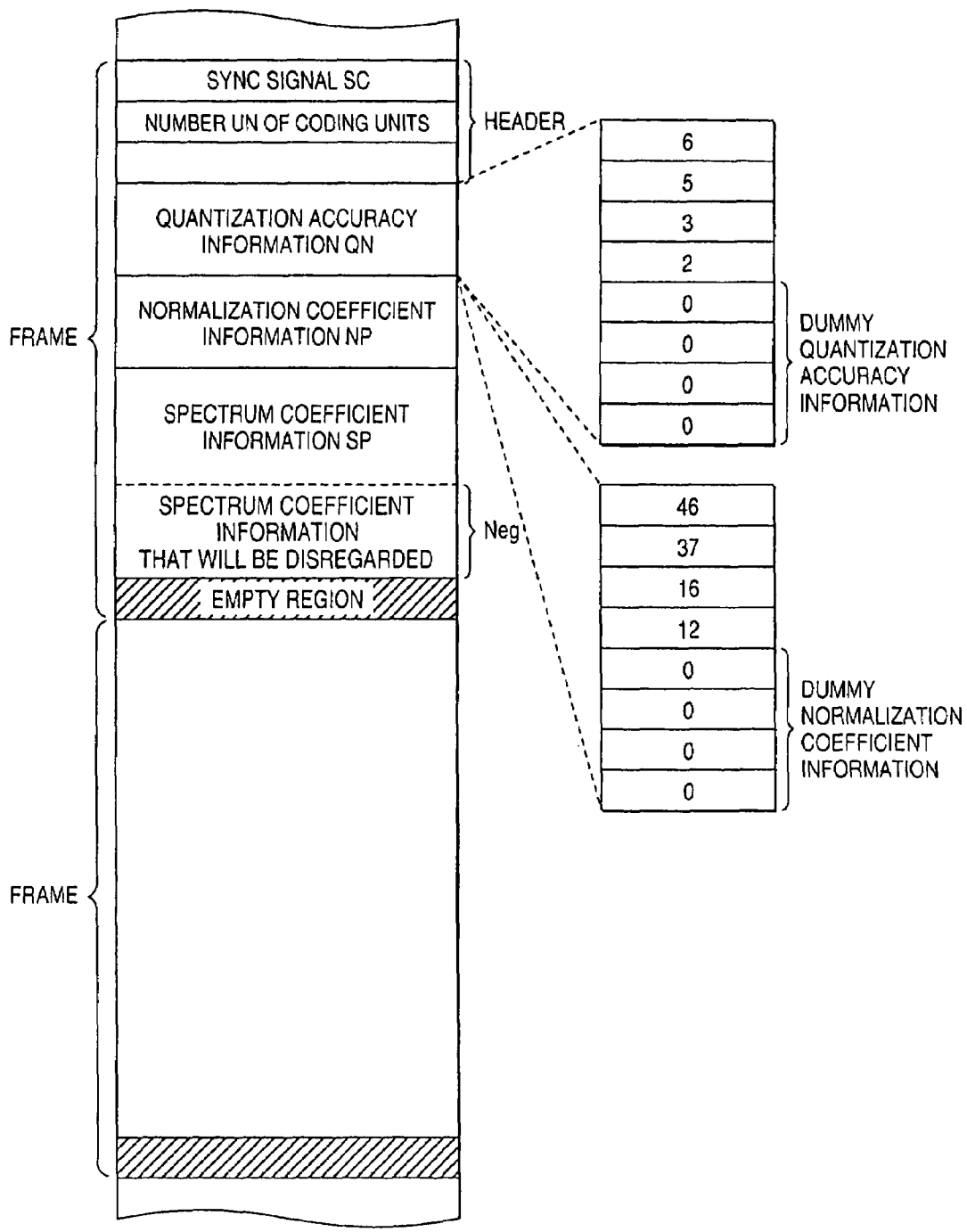
FIG. 14 shows an exemplary code sequence obtained by a coding method according to the first embodiment of the invention.
Figure 15:
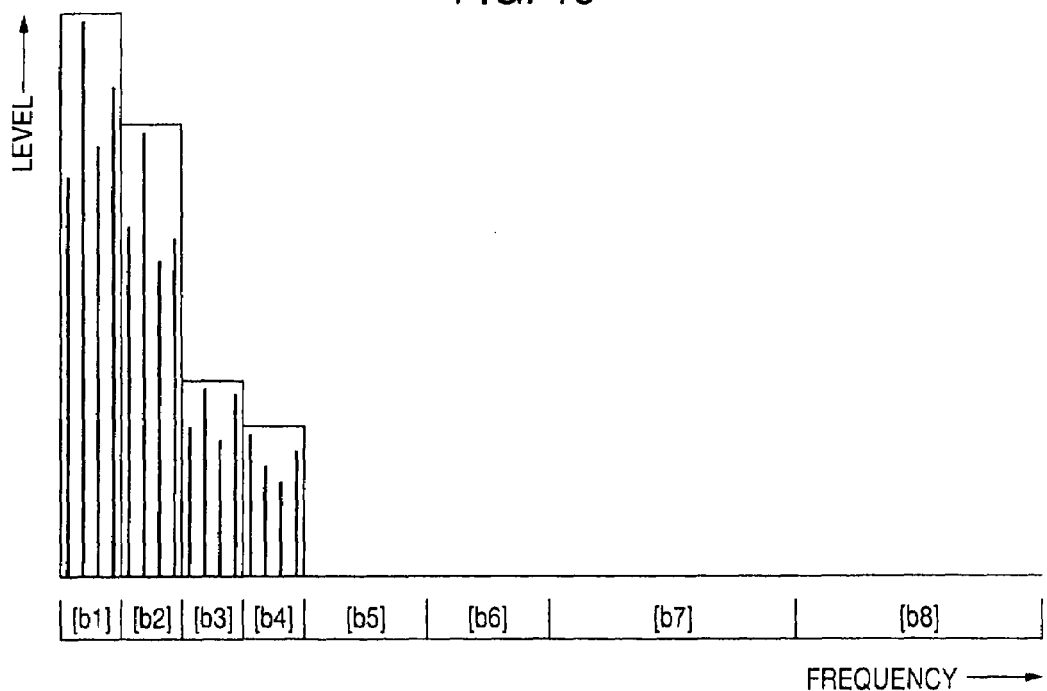
FIG. 15 shows an exemplary spectrum of a reproduction signal that is obtained by reproducing the code sequence of FIG. 14.

More specifically, in the first embodiment of the invention, as shown in FIG. 14, in contrast to the case of FIG. 9, data indicating that no bit is allocated to each of the four high-frequency-side coding units are coded as dummy quantization accuracy data in the quantization accuracy information QN and normalization coefficient information 0 (minimum data) for each of the four high-frequency-side coding units is coded as dummy normalization coefficient data in the normalization coefficient information NP. In this specific example, it is assumed that normalization coefficients have values that are in proportion to dB values. Since the pieces of high-frequency-side quantization accuracy information are made 0 in this manner, part of the spectrum coefficient information SP indicated by symbol "Neg" in FIG. 14 is disregarded actually. When this code sequence is reproduced by an ordinary reproducing device, narrow-band data having a spectrum shown in FIG. 15 are reproduced. This code sequence can be used as data for trial listening. Coding the dummy data as part of the normalization coefficient information NP makes it more difficult to perform high-quality reproduction illegally by inferring the quantization accuracy information QN.

The safety can further be increased by writing dummy data in the part of the spectrum coefficient information SP that is disregarded. As described later, this is more effective particularly in the case where the spectrum coefficient information SP is coded by using variable-length codes, because in this case merely replacing part of the spectrum coefficient information SP with dummy data disables correct reading of data that are higher in frequency than that range.

Further, in this embodiment, the head position of the dummy data in the spectrum coefficient information is varied frame by frame, whereby inference of the trial listening data (mentioned above) is made more difficult and the safety of the trial listening data is thereby increased.

Figure 16:
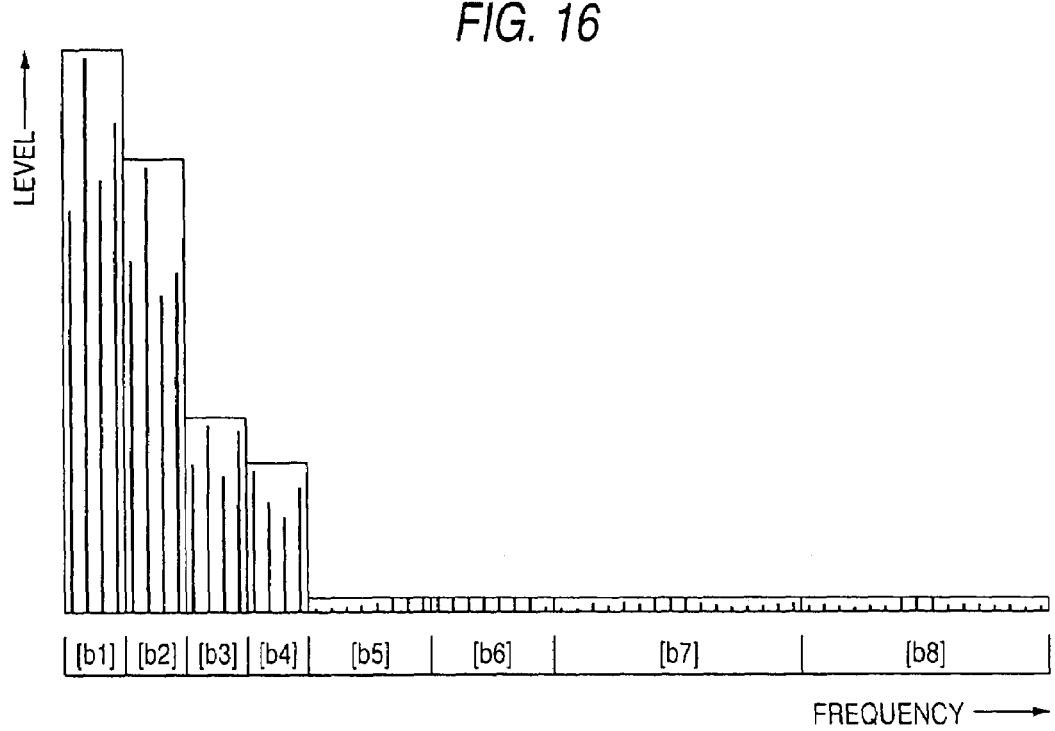
FIG. 16 shows an exemplary spectrum of a reproduction signal that is obtained by reproducing a code sequence obtained by another version of the coding method according to the first embodiment of the invention.

Although in the above example both of part of the quantization accuracy information QN and part of the normalization coefficient information NP are replaced by dummy data, only one of those may be replaced by dummy data. Where only part of the quantization accuracy information QN is replaced by dummy data (data indicating allocation of 0 bit), the narrow-band data having the spectrum show in FIG. 15 are reproduced. Where only part of the normalization coefficient information NP is replaced by dummy data having a value 0, reproduced data have a spectrum as shown in FIG. 16. Although the high-frequency-side spectrum is not equal to 0 in a strict sense, it can substantially be regarded as 0 in terms of audibility. In the first embodiment of the invention, the term "narrow-band signal" is used as covering this case.

Which of the quantization accuracy information QN and the normalization coefficient information NP is partially replaced by dummy data influences the risk that true values are inferred and high-quality reproduction is enabled. Replacing both of the quantization accuracy information QN and the normalization coefficient information NP with dummy data partially is safest because there are no data to be used for inferring the true values. Where only the quantization accuracy information QN is partially replaced by dummy data, the risk is relatively high because the quantization accuracy information QN may be inferred on the basis of the normalization coefficient information NP if, for example, an original bit allocation algorithm is such that the quantization accuracy information QN is calculated on the basis of normalization coefficients. In contrast, the risk is lower in the case where only the normalization coefficient information NP is partially replaced by dummy data than in the case where only the quantization accuracy information QN is done so. It is also possible to selectively replace part of the quantization accuracy information QN or part of the normalization coefficient information NP with dummy data depending on the band.

As another example, part of the spectrum coefficient information SP may be replaced by dummy data "0." A middle-range spectrum is particularly important in terms of sound quality. Therefore, the replacement scheme may be such that middle-range spectrum coefficient information is replaced by dummy data "0" and the quantization accuracy information QN and the normalization coefficient information NP are partially replaced by dummy data in a middle/high frequency range. The dummy data may not necessarily be "0"; for example, arbitrary codes may be used that are shorter than codes representing true values when they are used in variable-length coding. In this case, a band in which dummy quantization accuracy information and dummy normalization coefficient information is set so as to cover a band in which part of the spectrum coefficient information SP is replaced by dummy data so that narrow-band reproduction is performed correctly. In particular, where variable-length codes are used for coding the spectrum coefficient information SP, loss of part of middle-range information entirely disables decoding of data that are higher in frequency than that range.

In any case, inferring relatively large data relating to the contents of a signal is more difficult than decoding a relatively short key that is used in ordinary encryption; the risk of infringement of the copyright of a song concerned, for example, is lowered. Even if dummy data of a certain song are inferred, there is no fear that the damage expands to other songs, which is in contrast to a case that a decoding method of an encryption algorithm is uncovered. The above-described method is safer also in this respect than a case of performing particular encryption.

Figure 17:
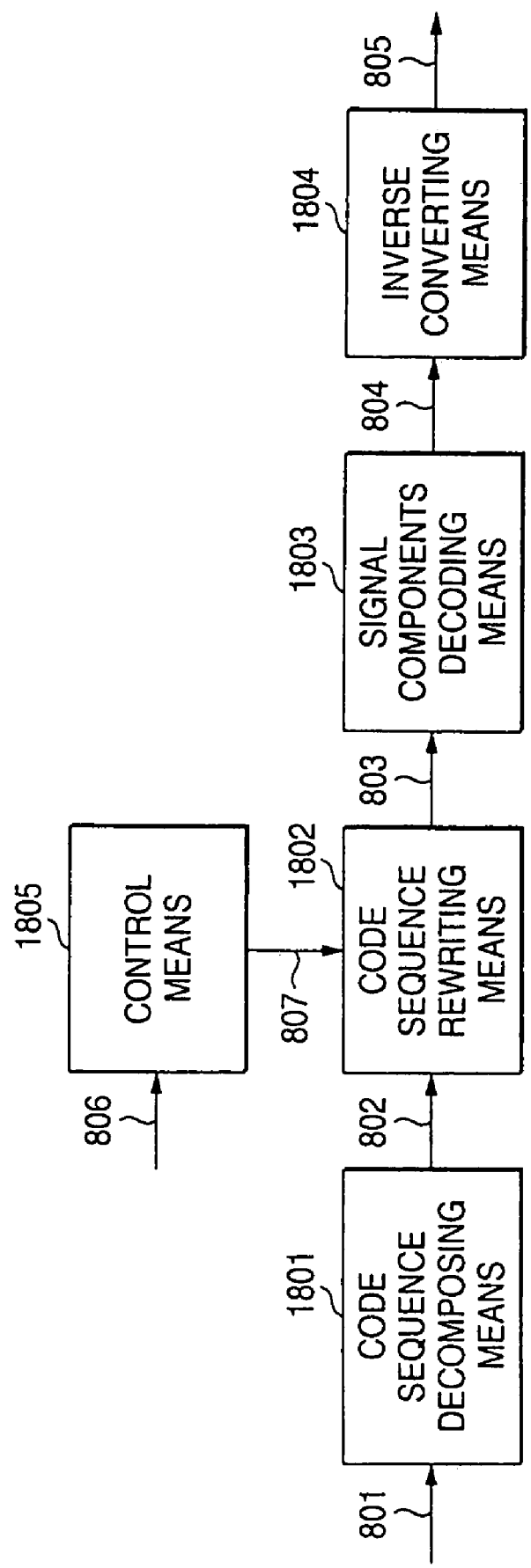
FIG. 17 shows the general configuration of a reproducing device corresponding to the coding method according to the first embodiment of the invention.

FIG. 17 is a block diagram showing an exemplary reproducing device according to the first embodiment of the invention, which is an improved version of the conventional decoding device of FIG. 5.

In FIG. 17, an input signal 801 is a code sequence (first code sequence) in which dummy data are used partially. More specifically, quantization accuracy information and normalization coefficient information are partially replaced by dummy data in the entire band or in a high-frequency range.

The signal 801, which is a high-efficiency-coded signal in which dummy data are buried, is received via prescribed public lines (e.g., ISDN (Integrated Services Digital Network), a satellite channel, or analog lines), for example, and input to a code sequence decomposing means 1801. The contents of the code sequence are decomposed by the code sequence decomposing means 1801, and a resulting signal 802 is supplied to a code sequence rewriting means 1802. The code sequence rewriting means 1802 receives, via a control means 1805, as a signal 807, true quantization accuracy information, normalizing coefficient information, and middle-range spectrum coefficient information 806 that are a second code sequence for replacing portions corresponding to the dummy data, and replaces dummy quantization accuracy information, normalizing coefficient information, and middle-range spectrum coefficient information of the signal 802 with the true ones 806. A resulting signal 803 is supplied to a signal components decoding means 1803. The signal components decoding means 1803 decodes the signal 803 into spectrum data 804. An inverse converting means 1804 converts the spectrum data 804 into time-series data 805 and thereby reproduces an audio signal.

In the configuration of FIG. 17, in a purchase mode, the true quantization accuracy information and/or normalizing coefficient information and middle-range spectrum coefficient information 806 to replace the dummy data are input to the control means 1805 via the same public lines as the signal 801 is done. The control means 1805 replaces the dummy data buried in the high-efficiency-coded signal 801 that is input to the code sequence rewriting means 1802 with the true quantization accuracy information and/or normalizing coefficient information and middle-range spectrum coefficient information 806. A resulting rewritten high-efficiency-coded signal 803 is input to the signal components decoding means 1803.

As a result, a user can listen to low-sound-quality music containing dummy data in a trial listening mode, and can listen to high sound-quality music after following a prescribed purchase procedure (charging processing, authentication processing, etc.).

In the above specific example, all the dummy data are replaced by the second code sequence. However, the invention is not limited to such a case. Reproduction may be performed in such a manner that at least part of the dummy data are replaced by partial code sequences of the second code sequence. In this case, for example, the quality of trial listening (or viewing; sound quality, image quality, etc.) can be changed arbitrarily by arbitrarily changing the percentage of partial code sequences in the second code sequence.

In the above-described reproducing device, the high-efficiency-coded signal 801 containing dummy data and the true quantization accuracy information and/or normalizing coefficient information and middle-range spectrum coefficient information 806 (the second code sequence or partial code sequences thereof) to replace the dummy data are acquired from a server via the same public lines. Alternatively, they may be acquired separately in such a manner that, for example, the high-efficiency-coded signal 801 that contains dummy data and is large in the amount of data is acquired via a satellite channel having a high transmission rate and the true quantization accuracy information and/or normalizing coefficient information and middle-range spectrum coefficient information 806 that is small in the amount of data are acquired via lines having a relatively low transmission rate such as telephone lines or ISDN. As a further alternative, the signal 801 may be supplied being recorded on a large-capacity recording medium such as a CD-ROM or a DVD (digital versatile disc)-ROM. It is understood that the above configurations can increase the security.

Incidentally, tone components and non-tone components were described in connection with FIG. 13. To generate a high-efficiency-coded signal, dummy data may be buried in only the quantization accuracy information and/or the normalization coefficient information of only the tone components, only the non-tone components, or both of the tone components and the non-tone components.

Figure 18:
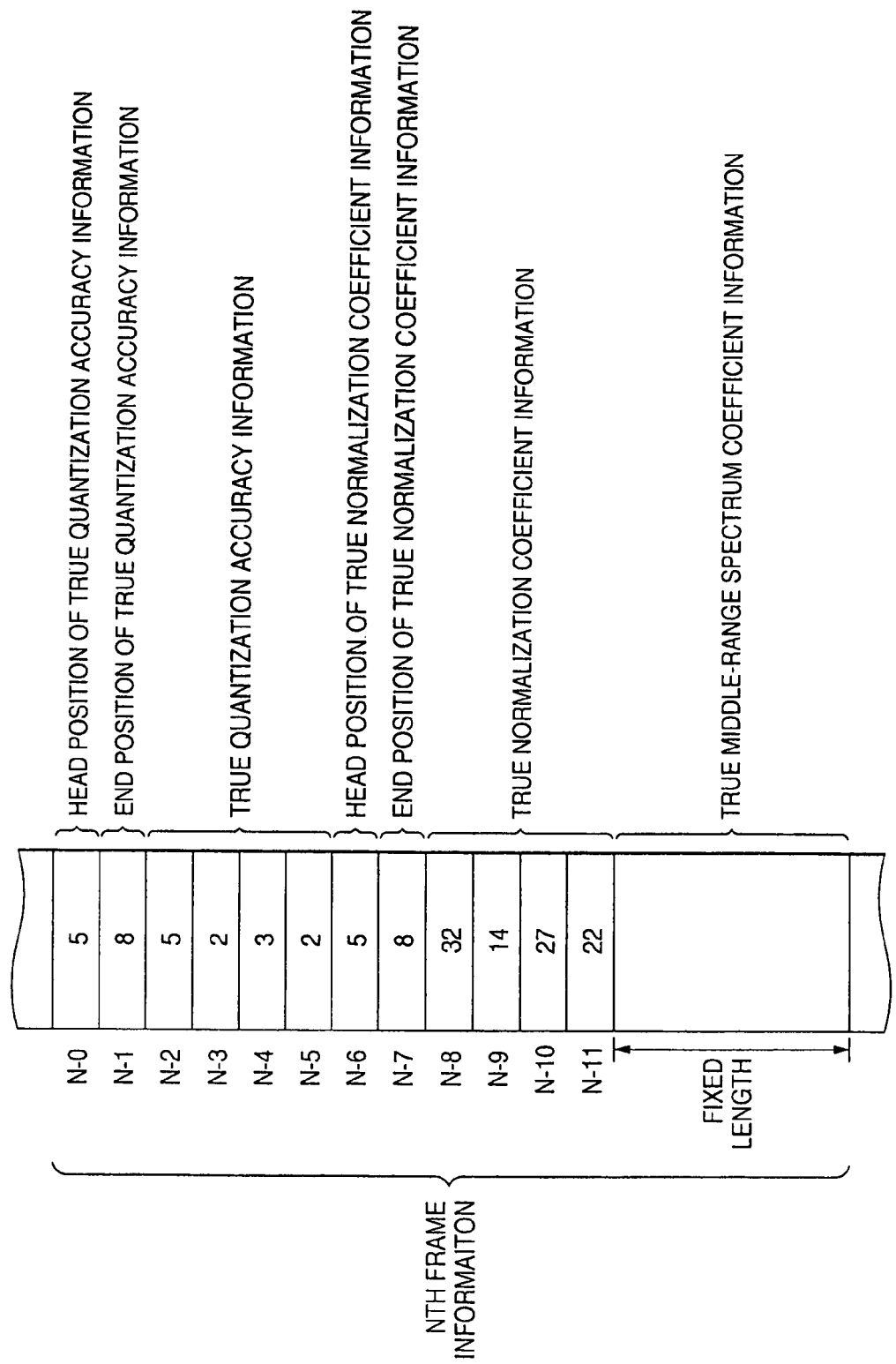
FIG. 18 shows exemplary information to replace dummy data in a code sequence obtained by the coding method according to the first embodiment of the invention.

FIG. 18 shows a specific example of a format of the true information (second code sequence) of the signal 807 that is supplied from the control means 1805 of FIG. 17. This true information is to change the Nth frame information shown in FIG. 14 to the information shown in FIG. 9. If this change is made, the reproduction sound having the spectrum of FIG. 15 of the code sequence containing dummy data is changed to that having the spectrum of FIG. 8. It is assumed here that middle-range spectrum coefficient information to be replaced by dummy data has a fixed length and the replacement by dummy data starts from the head code sequence where the bandwidth limitation starts. However, the invention is not limited to such a case. Naturally, depending on the application, middle-range spectrum coefficient information to be replaced by dummy data may be variable in length and may start at a position distant from the head where the bandwidth limitation starts.

Figure 19:
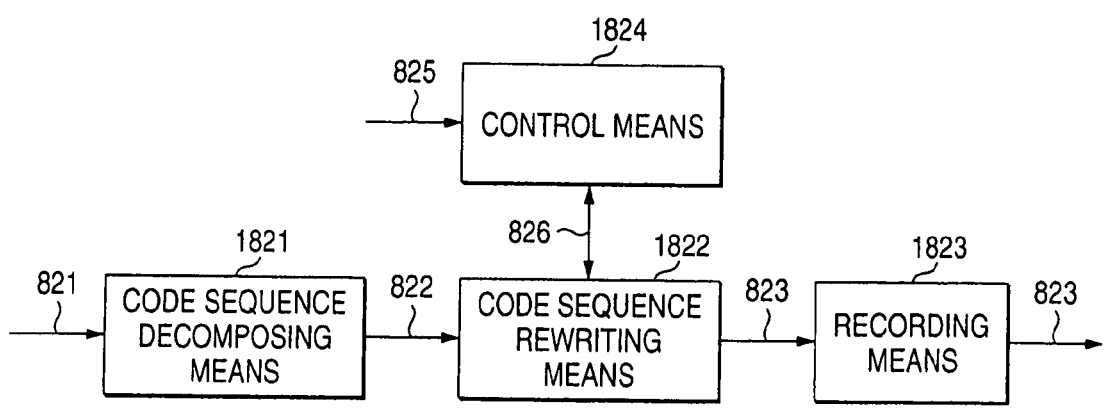
FIG. 19 is a block diagram showing the general configuration of a recording device according to the first embodiment of the invention.

FIG. 19 is a block diagram of an exemplary recording device according to the first embodiment of the invention. In FIG. 19, an input signal 821 is a first code sequence containing partially dummy data. It is assumed that high-frequency-side quantization accuracy information, normalization coefficient information and middle-range spectrum information are replaced by the dummy data. The contents of the first code sequence are decomposed by a code sequence decomposing means 1821, and a resulting signal 822 is supplied to a code sequence rewriting means 1822. The code sequence rewriting means 1822 receives, via a control means 1824, as a signal 826, true quantization accuracy information, normalizing coefficient information, and middle-range spectrum coefficient information 825 that are a second code sequence, and replaces dummy quantization accuracy information, normalizing coefficient information, and middle-range spectrum coefficient information of the signal 822 with the true ones 825. A resulting signal 823 is supplied to a recording means 1823. The recording means 1823 records the signal 823 on a recording medium. The recording medium on which the code sequence of the signal 824 is to be recorded may be one on which the code sequence of the signal 821 was recorded originally.

In the recording device of FIG. 19, as in the example of FIG. 17, recording may be performed in such a manner that at least part of the dummy data are replaced by partial code sequences of the second code sequence instead of replacing all the dummy data by the second code sequence. In this case, for example, the quality of trial listening (or viewing; sound quality, image quality, etc.) can be changed arbitrarily by arbitrarily changing the percentage of partial code sequences in the second code sequence. In this case, even in a trial listening mode, partial code sequences of the second code sequence are input to the control means 1824 as the signal 825 and supplied to the code sequence rewriting means 1822 as the signal 826. Therefore, it is appropriate to replace part of the dummy data that are buried in the first code sequence coming from the code sequence decomposing means 1821 with the partial code sequences of the second code sequence and to supply a resulting signal to the recording means 1823.

The reproducing device and the recording device according to the first embodiment of the invention have been described above. It is possible to further increase the safety by encrypting high-frequency-side spectrum coefficient information in advance. To this end, the code sequence rewriting means 1802 or 1822 in FIG. 17 or 19 for replacing dummy data not only receives true normalization coefficient information via the control means 1805 or 1824 and replaces dummy data, but also decodes high-frequency-side data using a decoding key that is acquired also via the control means 1805 or 1824. Reproduction or recording is performed in this manner.

Figure 20:
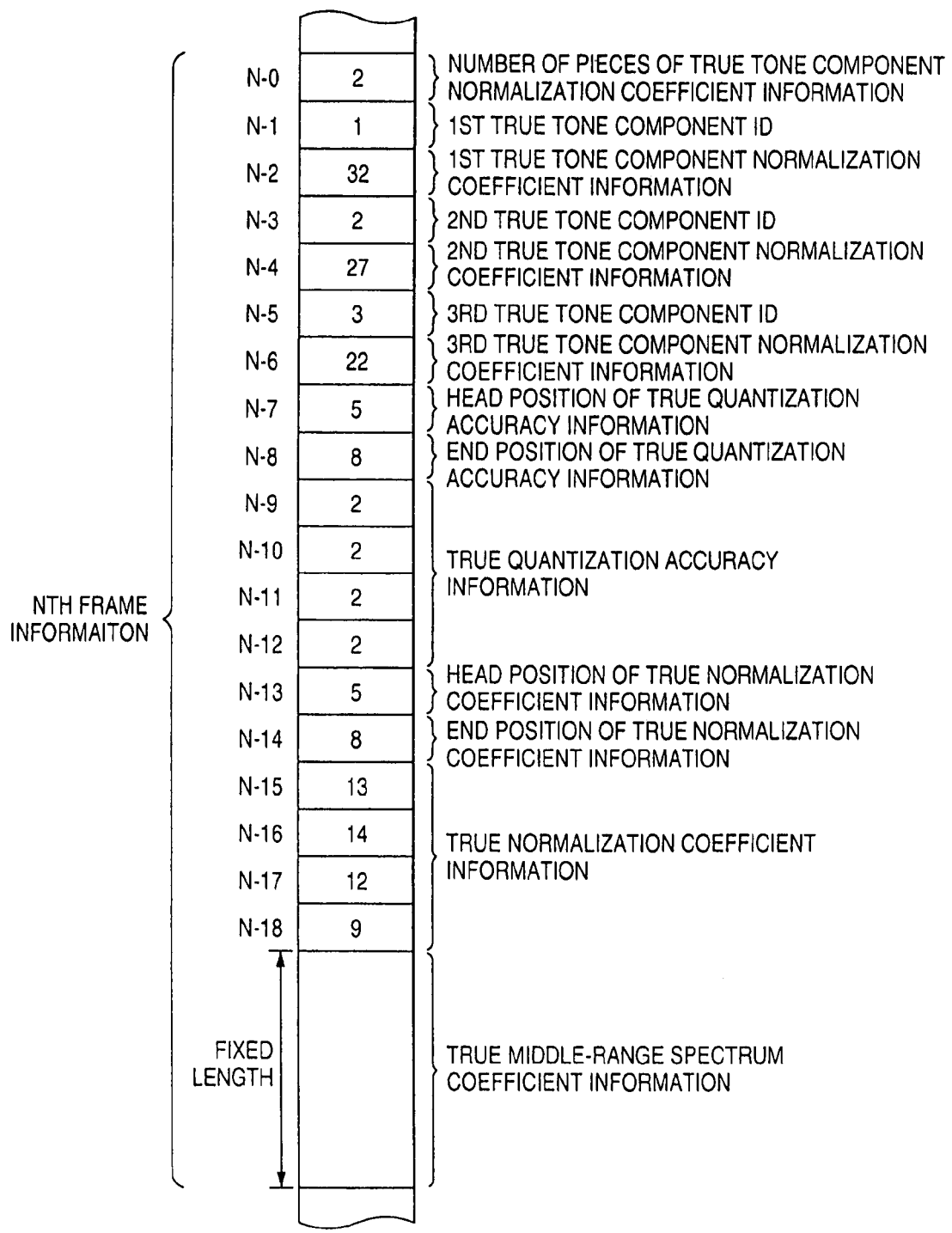
FIG. 20 shows exemplary information to replace dummy data in a code sequence obtained by the coding method according to the first embodiment of the invention.

FIG. 20 shows a specific example of a format of information to replace dummy data in the case where tone components are separated as shown in FIG. 10 and coding is performed as shown in FIG. 13. If the dummy data are replaced by this information, the reproduction sound having the spectrum of FIG. 15 of the code sequence containing dummy data is changed to that having the spectrum of FIG. 10. It is assumed here that middle-range spectrum coefficient information to be replaced by dummy data has a fixed length and the replacement by dummy data starts from the head code sequence where the bandwidth limitation starts. However, the invention is not limited to such a case. Naturally, depending on the application, middle-range spectrum coefficient information to be replaced by dummy data may be variable in length and may start at a position distant from the head where the bandwidth limitation starts.

Figure 21:
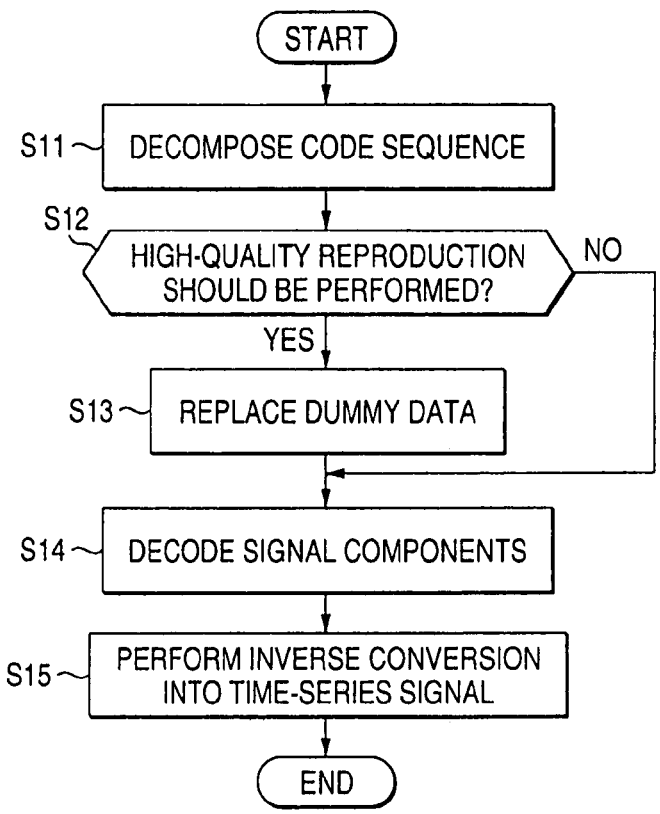
FIG. 21 is a flowchart showing a reproducing method according to the first embodiment of the invention.

FIG. 21 is a flowchart of an exemplary process that is employed when reproduction is performed by using software in a reproducing method according to the first embodiment of the invention. First, at step S11, a code sequence (first code sequence) containing dummy data is decomposed. Whether to perform high-quality reproduction is judged at step S12. If high-quality reproduction should be performed, dummy data in the first code sequence are replaced by true data (second code sequence) for restoring a large bandwidth at step S13 and the process goes to step S14. Otherwise, the process directly goes to step S14. At step S14, signal components are decoded. At step S15, inverse conversion into a time-series signal is performed, whereby sound is reproduced.

Figure 22:
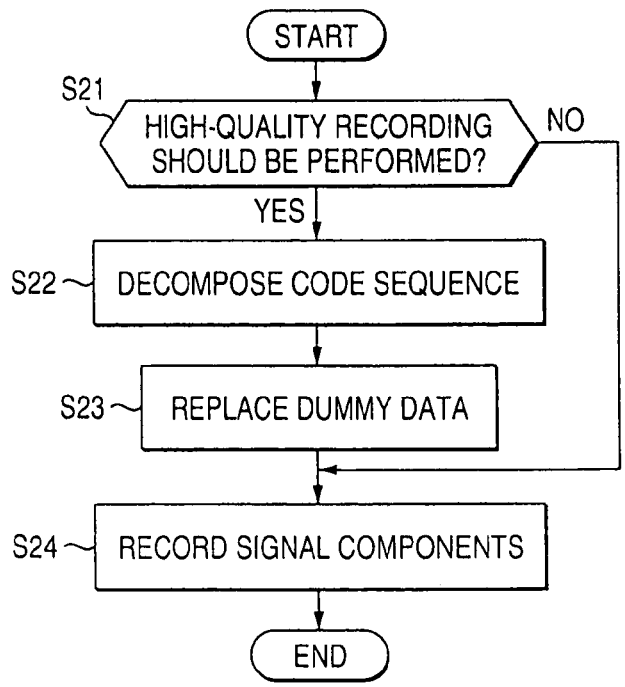
FIG. 22 is a flowchart showing a recording method according to the first embodiment of the invention.

FIG. 22 is a flowchart of an exemplary process that is employed when recording is performed by using software in a recording method according to the first embodiment of the invention. First, whether to perform high-quality recording is judged at step S21. If high-quality recording should be performed, a code sequence (first code sequence) containing dummy data is decomposed at step S22. Dummy data in the first code sequence are replaced by true data (second code sequence) for restoring a large bandwidth at step S23 and the process goes to step S24, where recording is performed. Otherwise, the process directly goes from step S21 to step S24.

Figure 23:
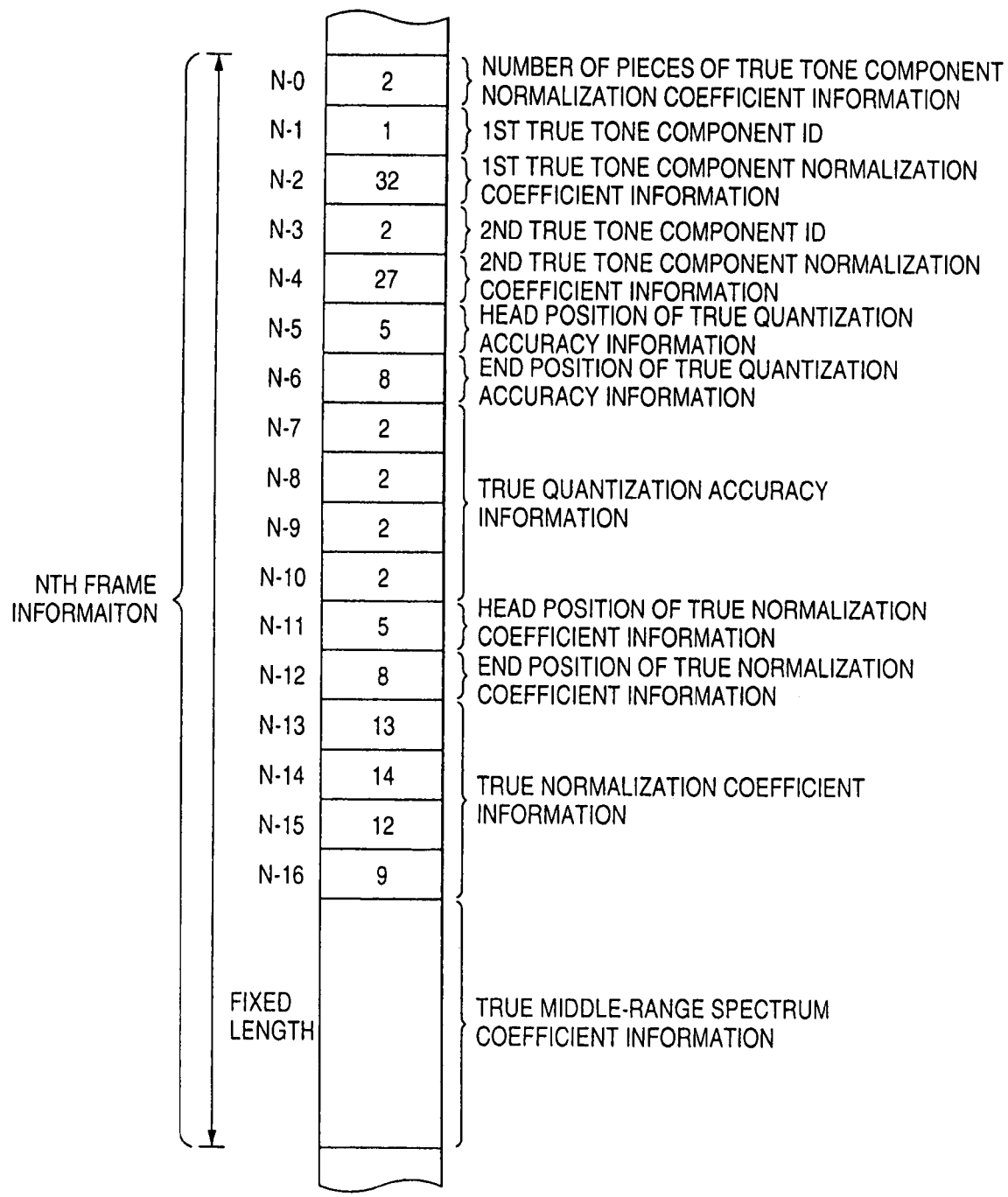
FIG. 23 shows an exemplary information to replace dummy data in a code sequence obtained by another coding method according to the first embodiment of the invention.

Incidentally, in the example of FIG. 20, the true middle-range spectrum coefficient information has a fixed length. However, in the first embodiment of the invention, as shown in FIG. 23, the entire true data for one frame may have a fixed length. To this end, for example, the data amount of the middle-range spectrum coefficient information is varied in accordance with the data amount of pieces of true tone component normalization coefficient information that varies in number frame by frame. If the length of the entire true data for one frame is set to 16 bytes, for example, in the case where the true data are encrypted by DES, two DES blocks correspond to one frame; it is appropriate to perform DES block processing two times for processing of one frame. The control is simplified because synchronization is achieved. FIG. 23 shows one-frame codes that are obtained when the true information is encrypted in the above manner. The length of the entire frame is fixed and the data amount of the middle-range spectrum coefficient information that is located at the end is variable.

In the above coding method, since the data amount of the middle-range spectrum coefficient information is variable, the safety is lowered at portions where the amount of dummy data is small. However, since a lot of frames exist that are continuous with each other, there are frames in which the amount of dummy data is large. A sufficient level of safety can be secured as a whole. The size of the true data of each frame need not always be fixed. For example, where DES is used, if the data amount (in bytes) is an integer multiple of 8, a relatively simple control is enabled (though less simple than in the case where the data amount is completely fixed) by recording, at the head of the true data, a multiplication factor indicating the data amount (a multiple of 8 bytes) and performing DES decoding that number of times.

Figure 24:
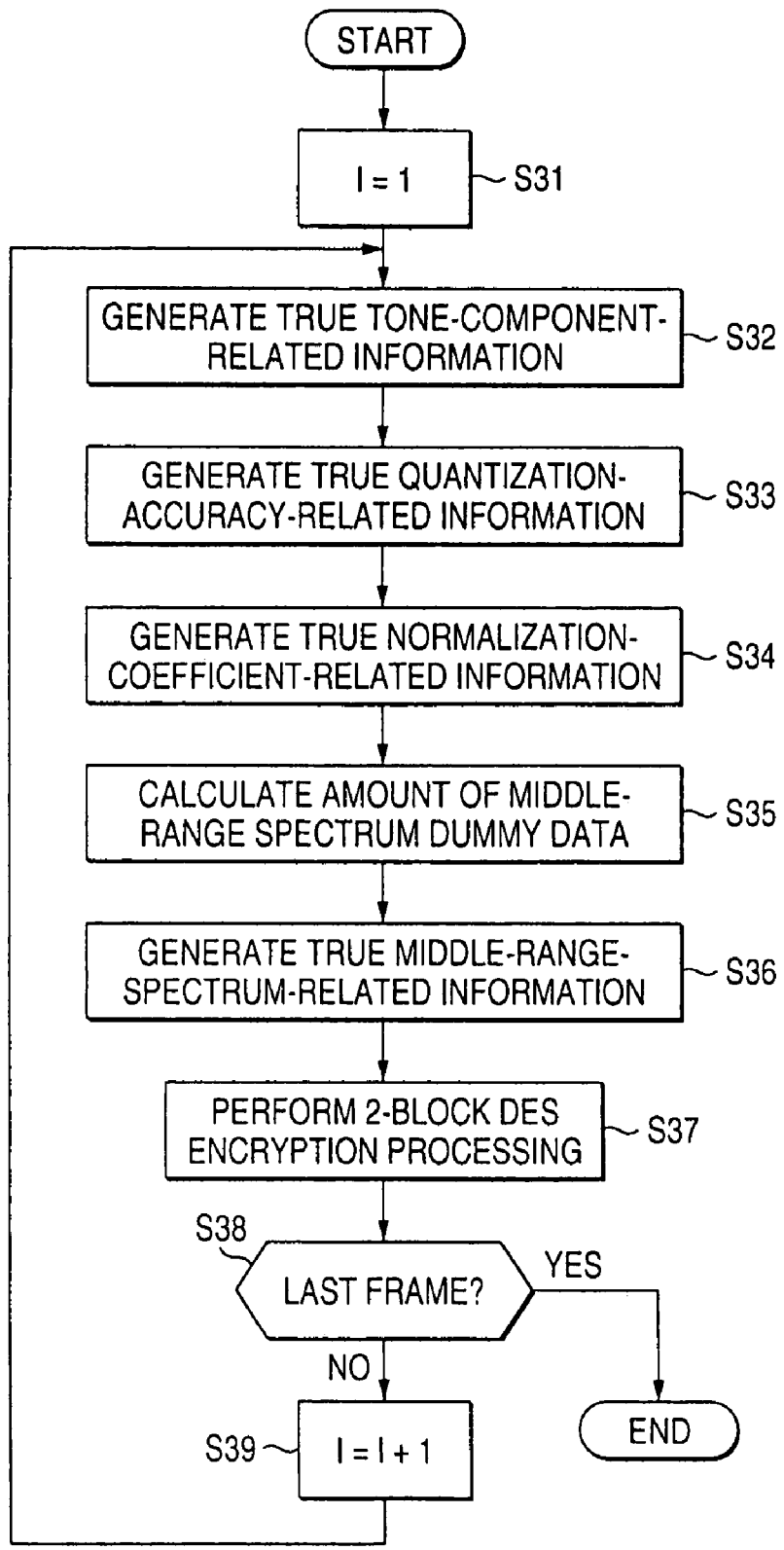
FIG. 24 is a flowchart of a process that is executed by a code sequence generating device according to the first embodiment of the invention.

FIG. 24 is a flowchart of a process for generating true data for high quality restoration for all frames in a code sequence generating device corresponding to the above method. First, at step S31, a control variable I is set to "1." At steps S32, S33, and S34, true tone-component-related information, true quantization-accuracy-related information, and true normalization-coefficient-related information are generated, respectively. At step S35, the amount of middle-range spectrum dummy data is calculated so that the amount of information for high quality restoration for one frame (i.e., the data amount of a second code sequence) becomes constant or an integer multiple of a prescribed data amount. At step S36, true middle-range-spectrum-related information is generated. At step S37, 2-block DES encryption processing is performed. At step S38, it is checked whether the frame concerned is the last frame. If the check result is affirmative, the process is finished. Otherwise, the control variable I is increased by "1" at step S39 and the process returns to step S32 to perform processing for the next frame. In this manner, according to this method, processing for generating true data for high quality restoration can be performed in synchronism with block encryption processing like DES processing.

Figure 25:
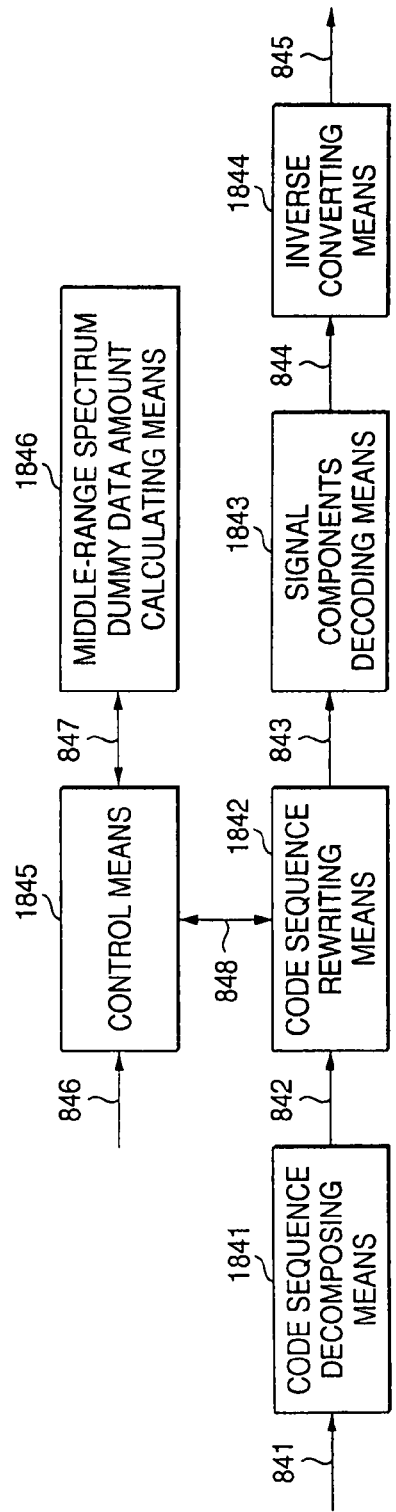
FIG. 25 is a block diagram of an exemplary reproducing device according to the first embodiment of the invention.

FIG. 25 is a block diagram of an exemplary reproducing device according to the first embodiment of the invention, which is an improved version of the reproducing device of FIG. 17. In FIG. 25, a middle-range spectrum dummy data amount calculating means 1846 calculates the amount of middle-range spectrum dummy data for high quality restoration data (second code sequence) 846 that are sent to a control means 1845. In the high quality restoration data, each frame has a fixed length or a length that is integer times greater than a prescribed data amount. Data 847 are exchanged between the control means 1845 and the middle-range spectrum dummy data calculating means 1846. Data 848 to replace the dummy data are supplied from the control means 1845 to a code sequence rewriting means 1842. The other part of the configuration is the same as shown in FIG. 17. Means 1841-1845 and signals 841-846 in FIG. 25 are the same as the means 1801-1805 and the signals 801-806 in FIG. 17, respectively, and hence will not be described.

Figure 26:
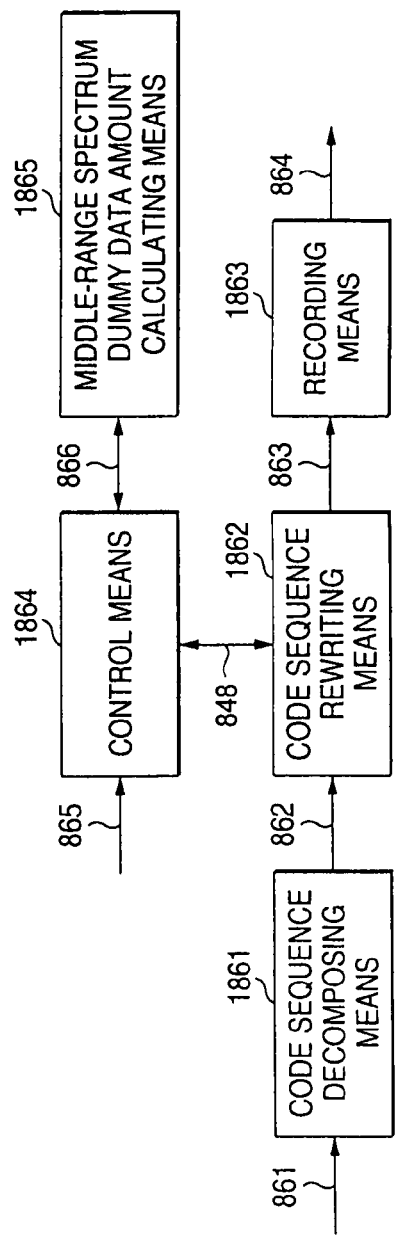
FIG. 26 is a block diagram of an exemplary recording device according to the first embodiment of the invention.

FIG. 26 is a block diagram of an exemplary recording device according to the first embodiment of the invention, which is an improved version of the recording device of FIG. 19. A middle-range spectrum dummy data amount calculating means 1865 calculates the amount of middle-range spectrum dummy data for high quality restoration data 865 that are sent to a control means 1864. In the high quality restoration data, each frame has a fixed length. Means 1861-1864 and signals 861-865 in FIG. 26 are the same as the means 1821-1824 and the signals 821-825 in FIG. 19, respectively, and hence will not be described.

Figure 27:
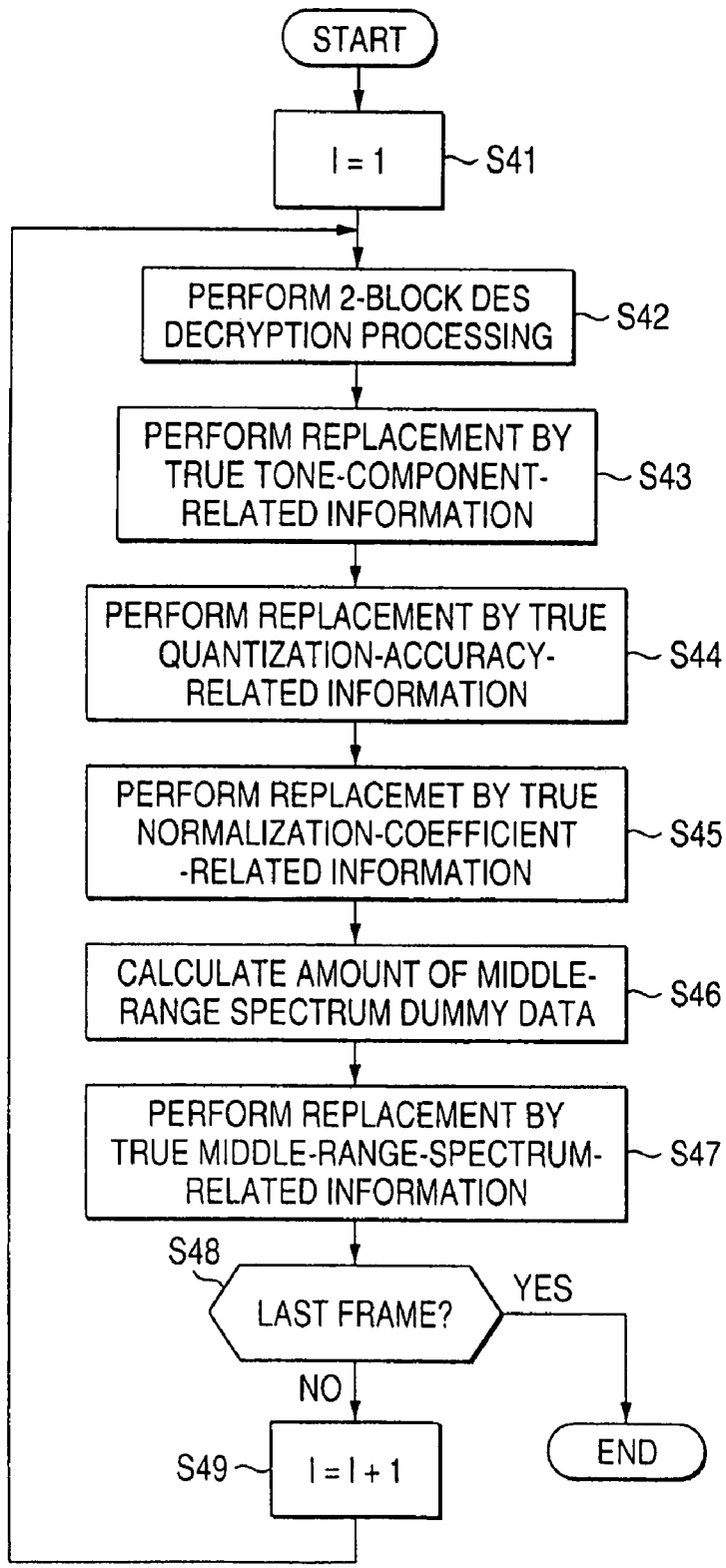
FIG. 27 is a flowchart of a process for replacing dummy data with true data for high quality restoration according to the first embodiment of the invention.

FIG. 27 is a flowchart of a process, according to the first embodiment of the invention, of replacing dummy data with true data for high quality restoration for all frames. First, at step S41, a control variable I is set to "1." At step S42, 2-block DES decryption is performed. At steps S43, S44, and S45, replacements by true tone-component-related information, true quantization-accuracy-related information, and true normalization coefficient-related information are performed, respectively. At step S46, the amount of middle-range spectrum dummy data is calculated so that the amount of information for high quality restoration for one frame becomes constant. At step S47, replacement by true middle-range-spectrum-related information is performed. At step S48, it is checked whether the frame concerned is the last frame. If the check result is affirmative, the process is finished. Otherwise, the control variable I is increased by "1" at step S49 and the process returns to step S42 to perform processing for the next frame. In this manner, according to this method, replacement of dummy data by true data for restoration of high quality can be performed in synchronism with block encryption processing like DES processing.

The above description is directed to the method for allowing a user to do trial listening on trial listening data such as those of music and restore high sound quality by, for example, buying high-sound-quality data if he likes the music. In the above method, one important point is how to make true middle-range spectrum coefficient information difficult to find.

In view of the above, exemplary methods, suitable for the first embodiment, for making true middle-range spectrum coefficient information difficult to find will be described below. The following methods may be used either individually or in combination.

FIRST EXAMPLE

One method would be to replace as much true middle-range spectrum coefficient information as possible with dummy data. However, the security can also be increased by making it difficult to find positions of pieces of middle-range spectrum coefficient information that is actually replaced by dummy data. In this example, this is realized by varying the position of true middle-range spectrum coefficient information frame by frame. Although the following description will be directed to a case of coding spectrum coefficient information using safer variable-length codes, the invention can also be applied to a case that variable-length codes are not necessarily used.

Figure 28:
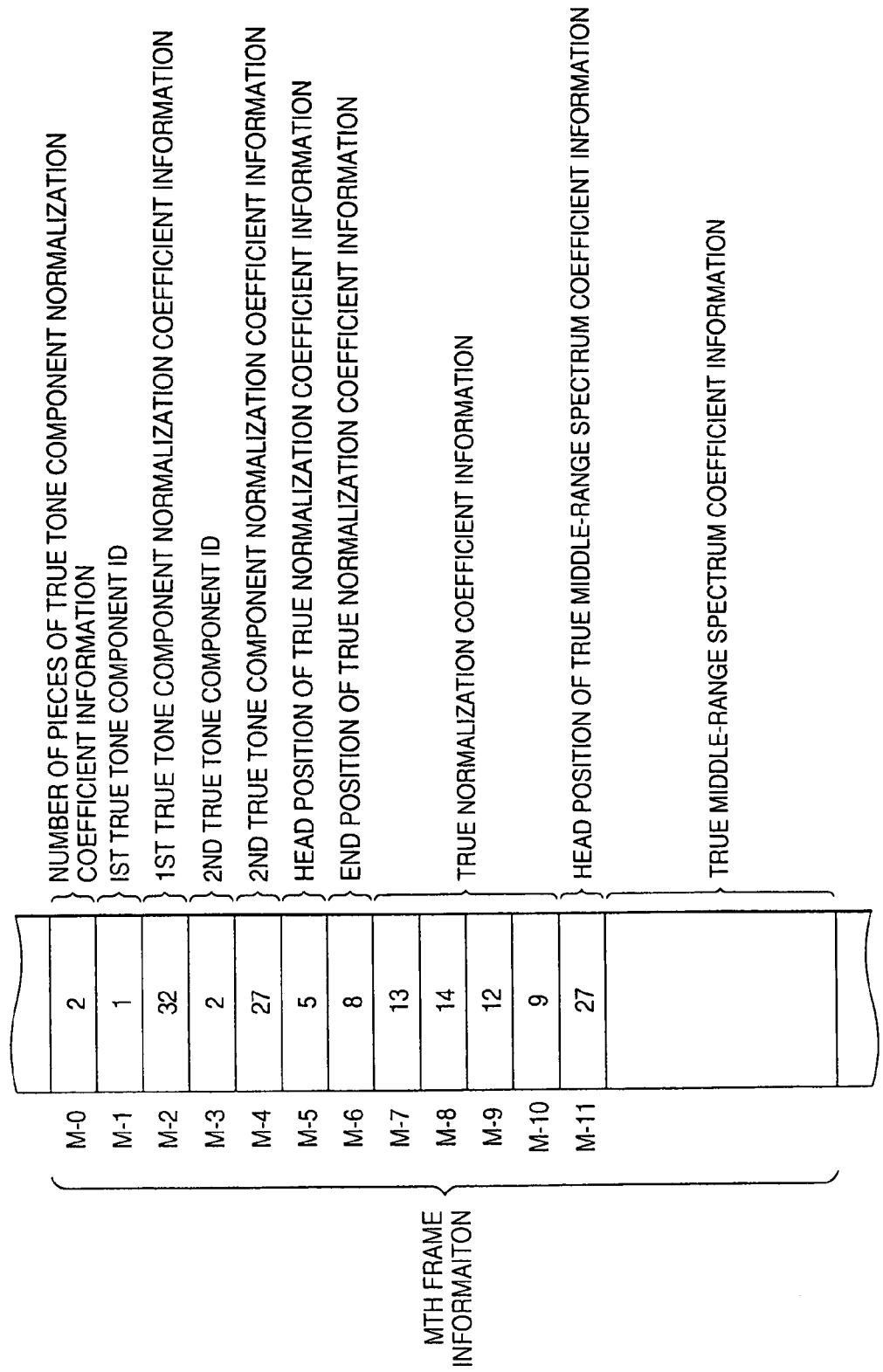
FIG. 28 shows an exemplary format of information containing true information to replace dummy data according to the first embodiment of the invention.
Figure 29:
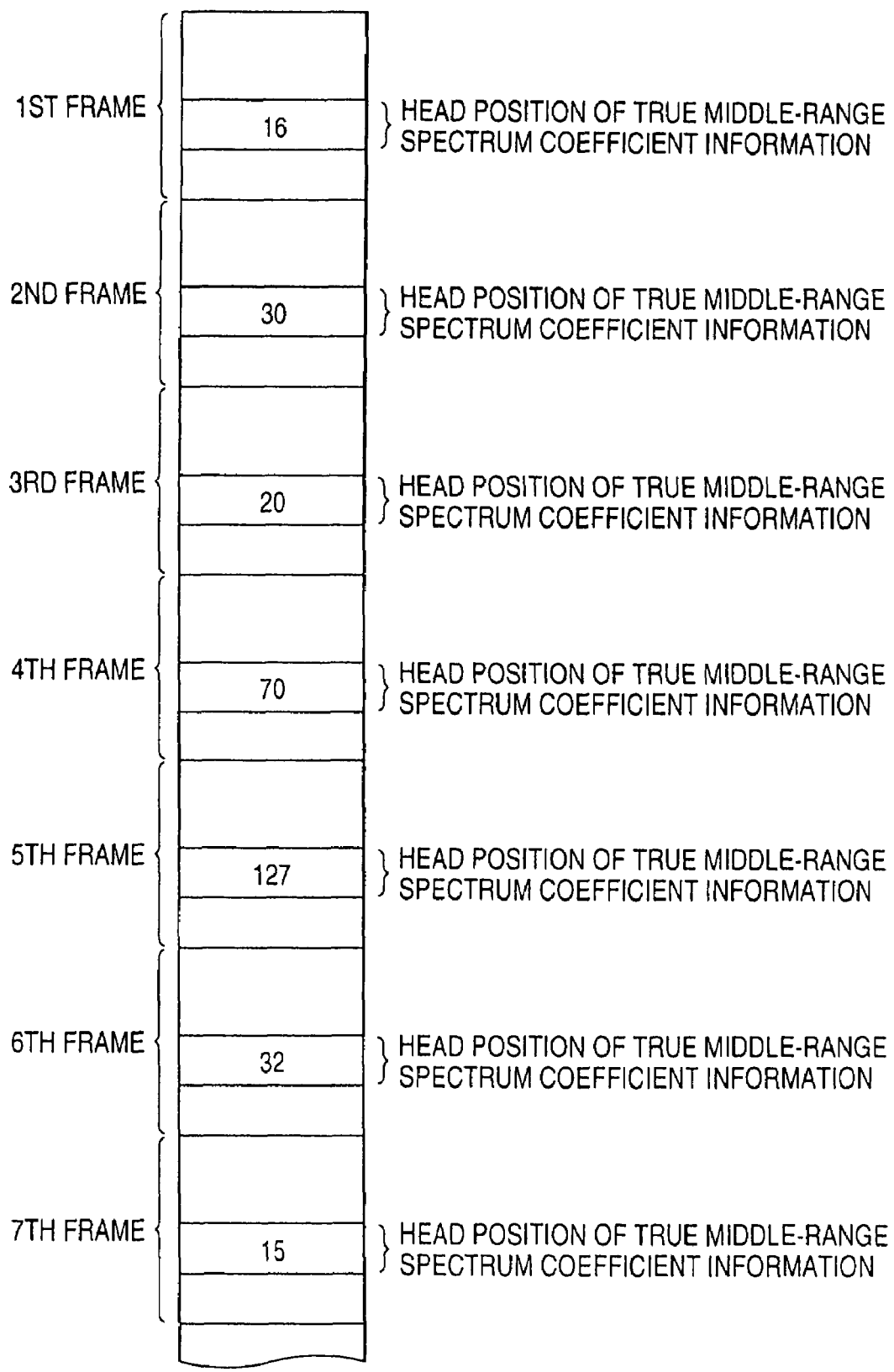
FIG. 29 shows a specific example of the information containing true information to replace dummy data according to the first embodiment of the invention.

FIG. 28 shows an example in which, to realize the above concept, information indicating the head position of true middle-range spectrum coefficient information is contained in a true information code sequence to replace dummy data. FIG. 29 shows how the head position of true middle-range spectrum coefficient information is varied frame by frame.

Figure 30:
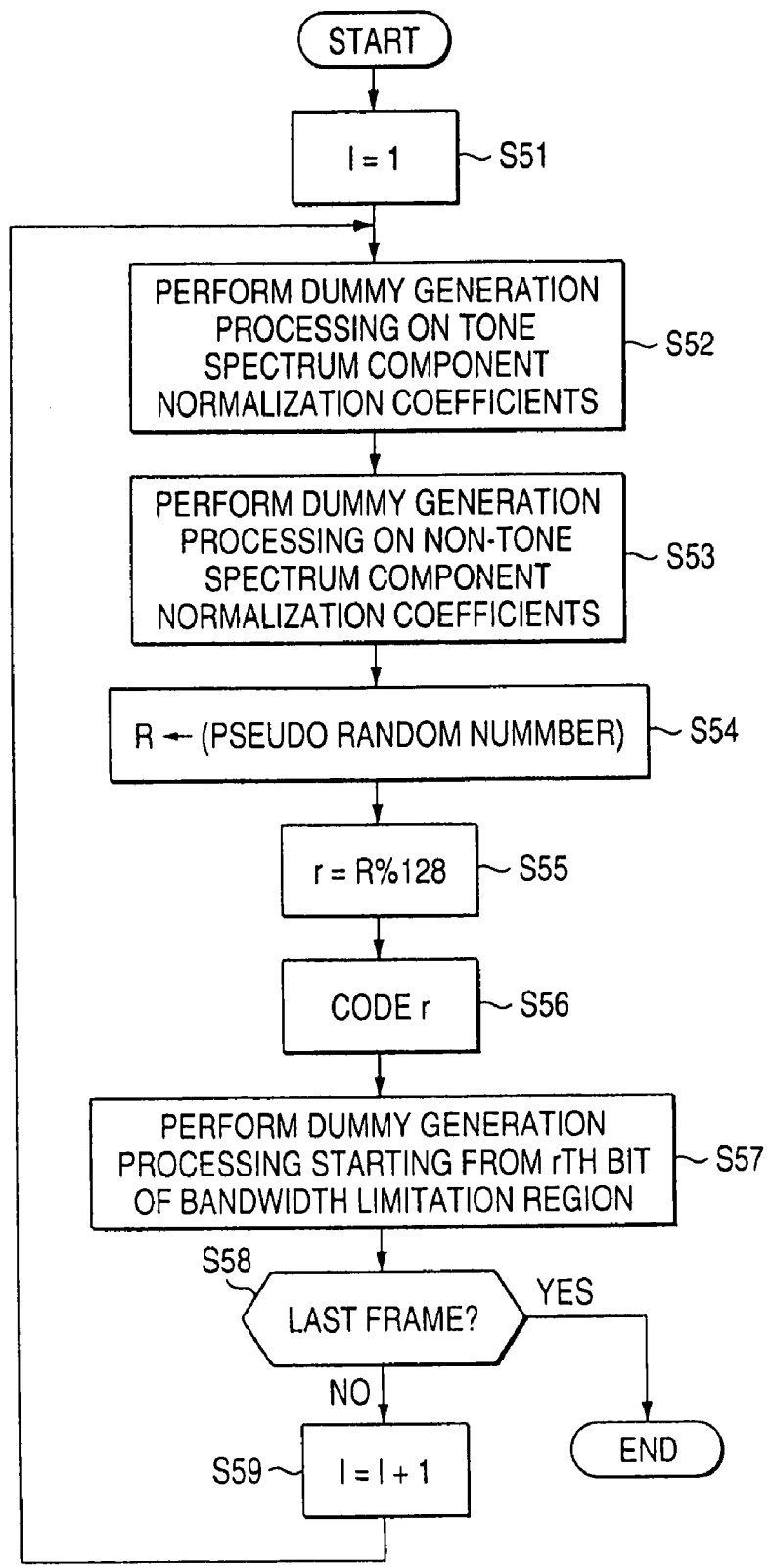
FIG. 30 is a flowchart of a process for generating a trial listening file and a corresponding high quality sound restoration file according to the first embodiment of the invention.

FIG. 30 is a flowchart showing a specific example of a method, relating to the above method, for generating a trial listening file containing dummy data and a high sound quality restoration file containing information to replace the dummy data while varying the head position of true middle-range spectrum coefficient information.

In FIG. 30, first, at step S51, a control variable I is set to "1." At step S52, dummy generation processing is performed on tone spectrum component normalization coefficients. Specifically, part of tone spectrum component normalization coefficients of a trial listening file are made "0" and the corresponding true values are coded and recorded in a high sound quality restoration file. At step S53, dummy generation processing is performed on non-tone spectrum component normalization coefficients. Specifically, part of non-tone spectrum component normalization coefficients of the trial listening file are made "0" and the corresponding true values are coded and recorded in the high sound quality restoration file. At step S54, a pseudo random number is generated as R. For example, pseudo random numbers may be generated in such a manner that first an arbitrary 100-bit number is selected, it is squared, and then a central 100-bit number is taken from the square (the last two steps are repeated thereafter). However, the invention is not limited to such a case.

At step S55, the remainder of R divided by 128 is set as r (r=R % 128). At step S56, r is coded and recorded in the high sound quality restoration file. At step S57, dummy generation processing is performed starting from the rth bit of a bandwidth limitation region. That is, a prescribed number of bits from the rth bit of the trial listening file are replaced by other data and the corresponding true values are recorded in the high sound quality restoration file. It is preferable that the pattern in which to replace the prescribed number of bits from the rth bit of the trial listening file be such that 0s and 1s are mixed with each other properly to make it difficult to infer dummy data positions; a pattern such as an all-0 pattern that allows easy inference of dummy data positions should be avoided. It is preferable to prevent a decoder from decoding a beginning part of the next frame past a code sequence concerned by forming dummy data by values having shorter code lengths than true data do. At step S58, it is checked whether the frame concerned is the last frame. If the check result is affirmative, the process is finished. Otherwise, the control variable I is increased by "1" at step S59 and the process returns to step S52.

Figure 31:
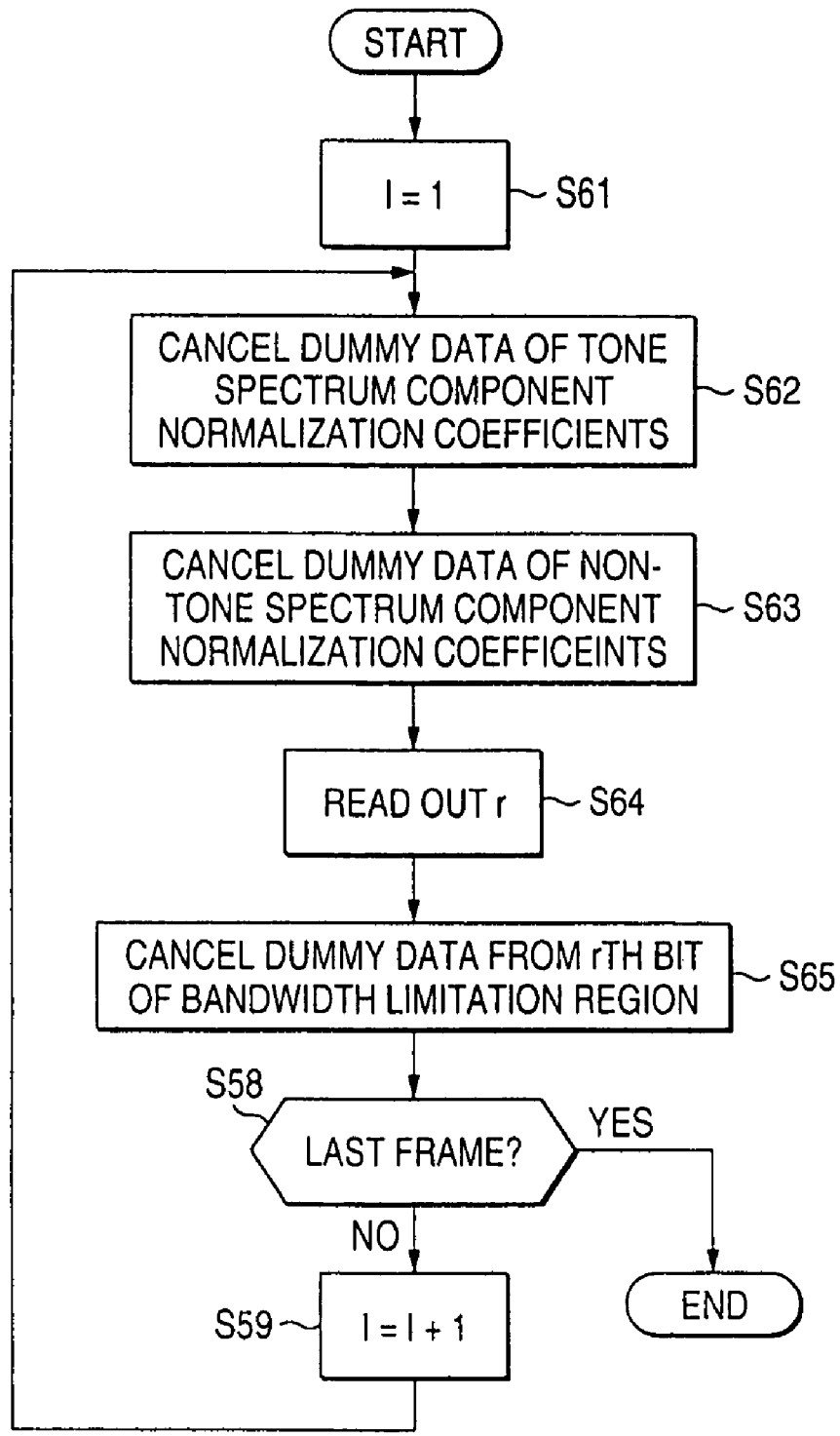
FIG. 31 is a flowchart of a process for generating a high-sound-quality file by combining the trial listening file and the high quality sound restoration file according to the first embodiment of the invention.

FIG. 31 is a flowchart shows an exemplary process for generating a high-sound-quality-reproducible file on the basis of a trial listening file and a high sound quality restoration file (both described above).

At step S61 in FIG. 31, a control variable I is set to "1 and the process goes to step S62." At step S62, dummy data of tone spectrum component normalization coefficients of a trial listening file are cancelled by using the values of true normalization coefficients of a high sound quality restoration file. At step S63, similarly, dummy data of non-tone spectrum component normalization coefficients of the trial listening file are cancelled by using the values of true normalization coefficients of the high sound quality restoration file. At step S64, the value of r is read out. At step S65, dummy data from the rth bit of a bandwidth limitation region of the trial listening file are replaced by true middle-range spectrum coefficient information of the high sound quality restoration file. At step S66, it is checked whether the frame concerned is the last frame. If the check result is affirmative, the process is finished. Otherwise, the control variable I is increased by "1" at step S67 and the process returns to step S62.

Incidentally, the manner of varying, frame by frame, the position of middle-range spectrum coefficient information that is replaced by dummy data and the manner of decoding are not limited to the above specific examples. An alternative method is such that a frame number is added to the value of r, the remainder of the value of the addition result divided by 128 is set as q, and a value obtained by converting the value of q using a random number table is used in place of r. In this case, the value of q may be written to a high sound quality restoration file and the head position of dummy data may be determined by using the same random number table. This makes it more difficult to find the head position of dummy data illegally and hence increases the safety further.

Instead of using the pseudo number, a random number may be generated by, for example, applying a varying voltage to an A/D converter of low accuracy and collecting seven LSBs from A/D-converted data. This also makes it possible to increase the safety further.

Another alternative method is such that the initial value of pseudo random numbers generated at step S54 in FIG. 30 is recorded in a high sound quality restoration file and the same calculations as performed in determining the head position of dummy data of a trial listening file, that is, the calculations at steps S54 and S55 of FIG. 30, are performed on the decoder side in restoring high sound quality. This eliminates the need for recording r values of respective frames in a high sound quality restoration file and hence can reduce the data amount of the high sound quality restoration file.

Although in the first example the head position of dummy data is varied frame by frame, the head position of dummy data may be varied every predetermined number of frames (i.e., at a period of a plurality of frames). The number of frames itself may be varied.

SECOND EXAMPLE

One method for finding true middle-range information would be to try every possible candidate code sequence for a dummy data portion. And one method for judging whether candidate code sequences coincide with true middle-range information would be to check whether the former are longer than the latter. The number of candidates for a true code sequence can be reduced in this manner.

Usually, the empty region (hatched region) of each frame in FIG. 14 is filled with 0s or 1s in a fixed manner according to a standard. If one of all possible candidate code sequences reaches the portion that is considered the empty region, it is excluded from the candidates. The start position of the empty region cannot be determined exactly because the last portion of an actual code sequence may coincide, in value, with 0s or 1s that fill up the empty region. However, for example, if the empty region is filled with 0s and trial listening data have a last portion that is 10 consecutive 0s, a judgment can be made that it is highly probable that the last five 0s, for example, belong to the empty region. Even if code sequences that are longer than such a length are excluded from the candidates for true code sequence, the probability that the exclusion is not correct is low. Therefore, there would occur few cases that the exclusion of such code sequences from the candidates for true code sequence causes a problem; the risk that trial listening data are converted into wide-band data illegally becomes high.

To lower the above risk, in a second example, the pattern in which to fill up the empty region is made such that 0s and 1s are arranged randomly instead of being made an all-0 or all-1 pattern. That is, in the second example, the empty region of trial listening data is filled with a pseudo-code sequence such as a pseudo random number sequence. An exemplary method for writing random data to the empty region is such that a pseudo random number is generated and its lower bits that are the same in the number of bits as the empty region are written to the empty region. An exemplary method for generating pseudo random numbers is such that first an arbitrary 100-bit number is selected, it is squared, and then a central 100-bit number is taken from the square (the last two steps are repeated thereafter). Naturally, the method for writing random data to the empty region is not limited to this method. For example, a random number may be generated by applying a varying voltage to an A/D converter of low accuracy and collecting LSBs from A/D-converted data by the number of bits of the empty region. This makes it possible to increase the safety further.

Figure 32:
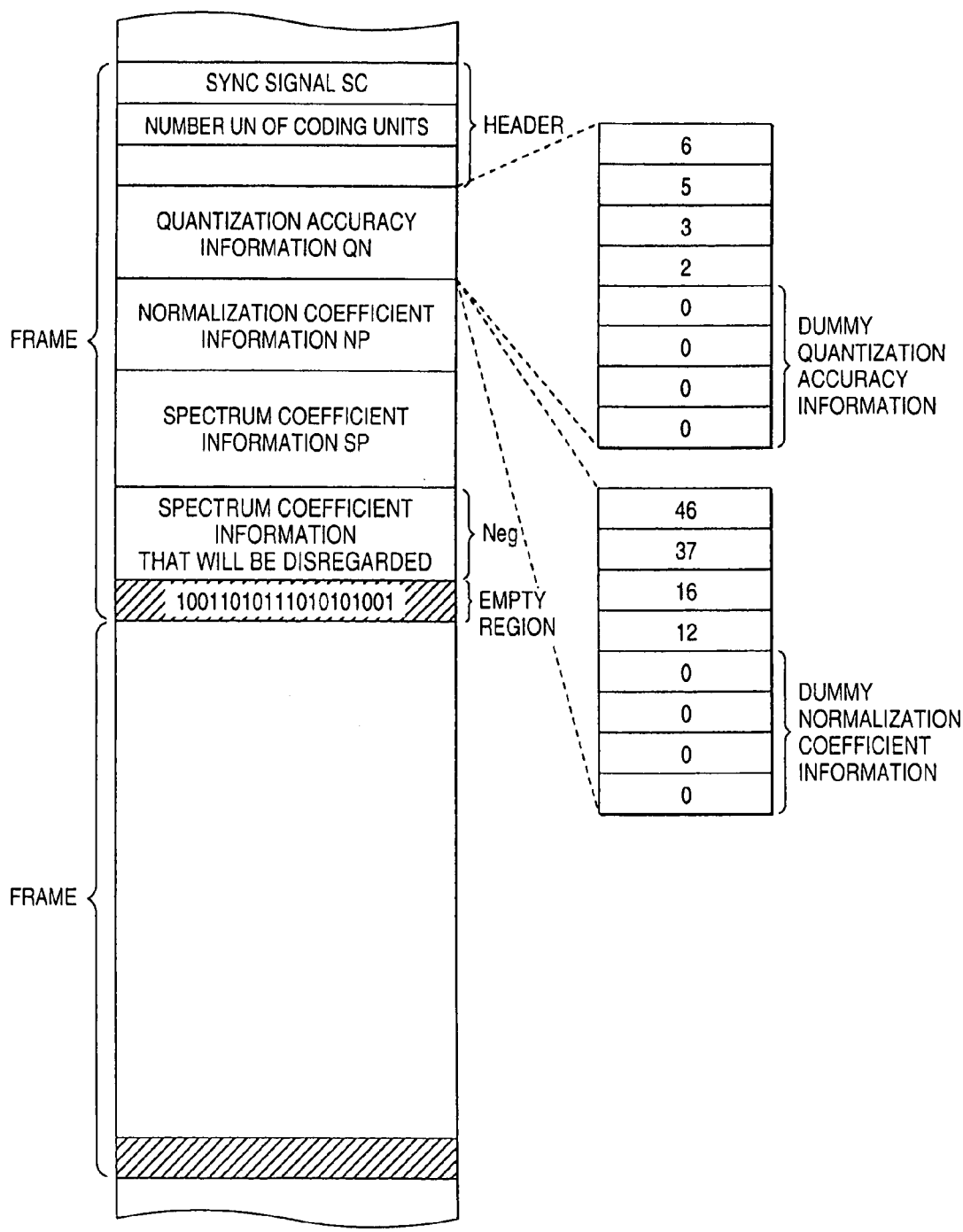
FIG. 32 shows an exemplary code sequence obtained by another code sequence generating method according to the first embodiment of the invention.

FIG. 32 shows an exemplary code sequence in which the empty region is filled with a random arrangement of 0s and 1s as a pseudo-code sequence such as a pseudo random number sequence. In this example, the empty region is filled with a 20-bit random pseudo-code sequence. These bits are disregarded in a decoder for decoding a trial listening file. The other part of FIG. 32 is the same as the corresponding part of FIG. 14 and hence will not be described (the items corresponding to each other are given the same symbol).

Figure 33:
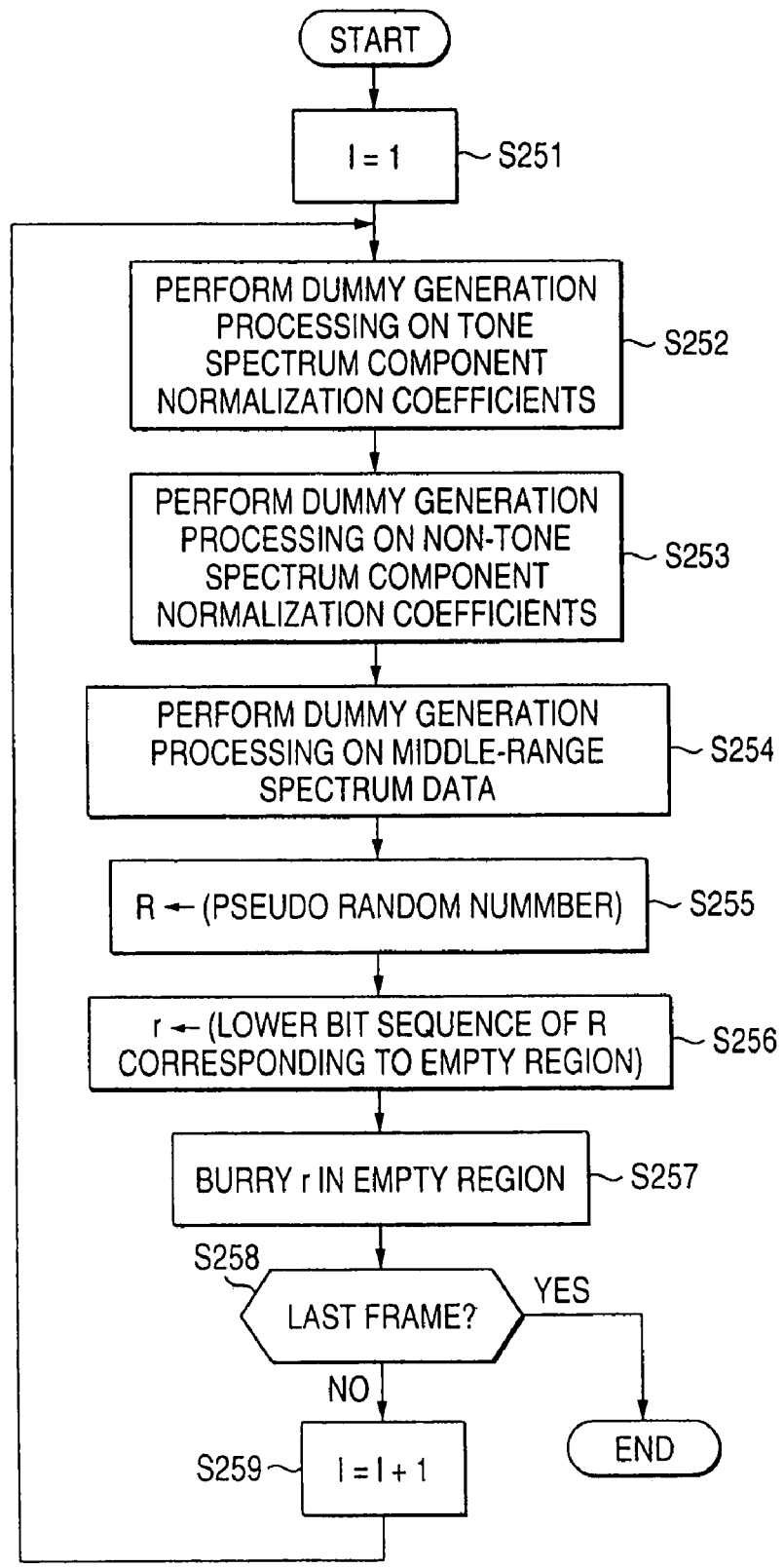
FIG. 33 is a flowchart of another process for generating a trial listening file and a corresponding high quality sound restoration file according to the first embodiment of the invention.

FIG. 33 is a flowchart showing a specific example of a method, relating to the above method, for generating a trial listening file containing dummy data and a high sound quality restoration file containing information to replace the dummy data while burying a pseudo-code sequence such as a pseudo random number sequence in each empty region.

In FIG. 33, first, at step S251, a control variable I is set to "1." At step S252, dummy generation processing is performed on tone spectrum component normalization coefficients. Specifically, part of tone spectrum component normalization coefficients of a trial listening file are made "0" and the corresponding true values are coded and recorded in a high sound quality restoration file. At step S253, dummy generation processing is performed on non-tone spectrum component normalization coefficients. Specifically, part of non-tone spectrum component normalization coefficients of the trial listening file are made "0" and the corresponding true values are coded and recorded in the high sound quality restoration file.

At step S254, dummy generation processing is performed on middle-range spectrum data. At this step, the pattern in which to replace a prescribed number of bits from an rth bit of the trial listening file may be such that 0s and 1s are mixed with each other properly to make it difficult to infer dummy data positions; a pattern such as an all-0 pattern that allows easy inference of dummy data positions should be avoided. It is possible to prevent a decoder from decoding a beginning part of the next frame past a code sequence concerned by forming dummy data by values having shorter code lengths than true data do. That is, at this step, the prescribed number of bits from the rth bit of the trial listening file are replaced by other data and the corresponding true values are recorded in the high sound quality restoration file. At step S255, a pseudo random number is generated as R. For example, pseudo random numbers may be generated in such a manner that first an arbitrary 100-bit number is selected, it is squared, and then a central 100-bit number is taken from the square (the last two steps are repeated thereafter). At step S256, a lower bit sequence of R corresponding to the empty region is set as r. At step S257, r is recorded in the empty region. At step S258, it is checked whether the frame concerned is the last frame. If the check result is affirmative, the process is finished. Otherwise, the control variable I is increased by "1" at step S259 and the process returns to step S252.

In the above-described second example, a pseudo-code sequence such as a pseudo random number sequence is buried in each empty region of trial listening data (i.e., a first code sequence for trial listening). Therefore, when someone attempts to convert trial listening data into wide-band data illegally, it is difficult for him to judge whether the wide-band data are a correct code sequence. As such, converting trial listening data into wide-band data illegally becomes difficult and the safety of the trial listening data is increased accordingly.

In the second example, a pseudo random number as a pseudo-code sequence for making it difficult to identify an empty region of trial listening data is buried in each empty region. However, the invention is not limited such a case. In the invention, other various kinds of pseudo-code sequences can be used as long as they have a pattern that makes it difficult to identify an empty region. For example, a code sequence of meaningless information having a certain degree of randomness and a code sequence containing meaningful information such as an electronic watermark, copyright information, or reproduction control information can be used as a pseudo-code sequence.

In the second example, the empty region after spectrum coefficients is used as shown in FIG. 14 etc. However, the invention is not limited to such a case. In the invention, other various kinds of empty regions can be used as long as they occur in a coded bit stream after coding according to a prescribed coding format is performed. It is preferable that each of those empty regions be such that once it is identified identification of dummy data and inference of dummy-replaced true data can be facilitated. This is because such a configuration can make it difficult to convert trial listening data into high-quality data illegally.

Although the above description is directed to the case of using an audio signal, the invention can also be applied to the case of using an image signal. For example, the same processing as in the case of an audio signal can be performed by using a dummy quantization table in which high-frequency components are removed when an image signal is converted into blocks by two-dimensional DCT and resulting block signals are quantized by using various quantization tables and using a true quantization table containing the high-frequency components when high image quality is restored.

It goes without saying that the methods of the first embodiment can also be applied to systems in which the entire code sequence is encrypted and it is reproduced while being decrypted.

Although the first embodiment is directed to the case of recording a coded bit stream on a recording medium, the invention can also be applied to the case of transmitting a bit stream. For example, this makes it possible to allow only listeners who have acquired true normalization coefficients of a broadcast audio signal over the entire band to perform high-sound-quality reproduction while allowing other listeners to perform reproduction of relatively low sound quality though they can sufficiently recognize its contents.

Second Embodiment

Next, a second embodiment of the invention will be described. Not only will unique features of the second embodiment be described below, but features common to the first embodiment will also be described below if necessary. This will allow a person skilled in the art to practice the aspect of the invention that relates to the second embodiment by reading the following description.

The second embodiment is directed to the case of receiving a digital signal such as an audio PCM signal and performing high-efficiency coding on it through subband coding (SBC), adaptive transform coding (ATC), and adaptive bit allocation. The adaptive transform coding is a coding method that is based on the discrete cosine transform (DCT) or the like and employs adaptive bit allocation. An input signal is coded by converting it into spectrum signals for each time block and then normalizing the spectrum signals together for each prescribed band, that is, dividing each signal component by a normalization coefficient that approximates a maximum signal component and then quantizing each normalized signal component with quantization accuracy that is set each time according to the signal properties.

Figure 34:
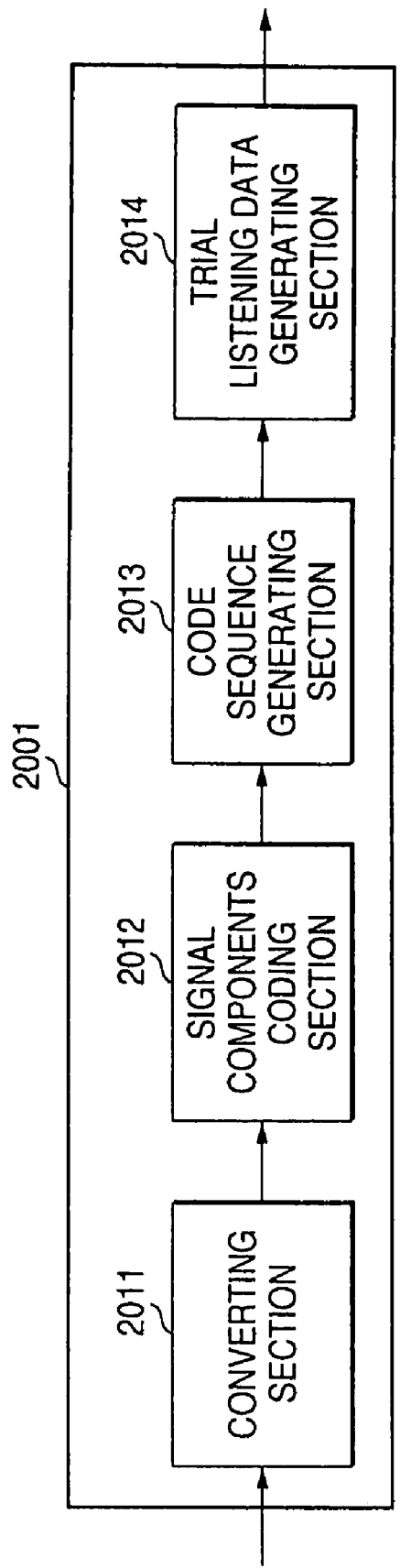
FIG. 34 is a block diagram showing the configuration of a coding device according to a second embodiment of the invention.

FIG. 34 is a block diagram showing the configuration of a coding device 2001 that receives an acoustic waveform signal and generates trial listening data.

A converting section 2011 receives an acoustic waveform signal, converts it into signal frequency components, and outputs those to a signal components coding section 2012. The signal components coding section 2012 codes the received signal frequency components and outputs resulting coded signal frequency components to a code sequence generating section 2013. The code sequence generating section 2013 generates a code sequence on the basis of the received coded signal frequency components and outputs it to a trial listening data generating section 2014. The trial listening data generating section 2014 performs prescribed processing such as rewriting of normalization coefficient information and dummy bit substitution on the received code sequence, and thereby converts high-sound-quality-reproducible audio data (original data) into trial listening data and generates additional data (restoration data) that corresponds to the trial listening data and is to be sold to users who want reproduction of the original data.

Figure 35:
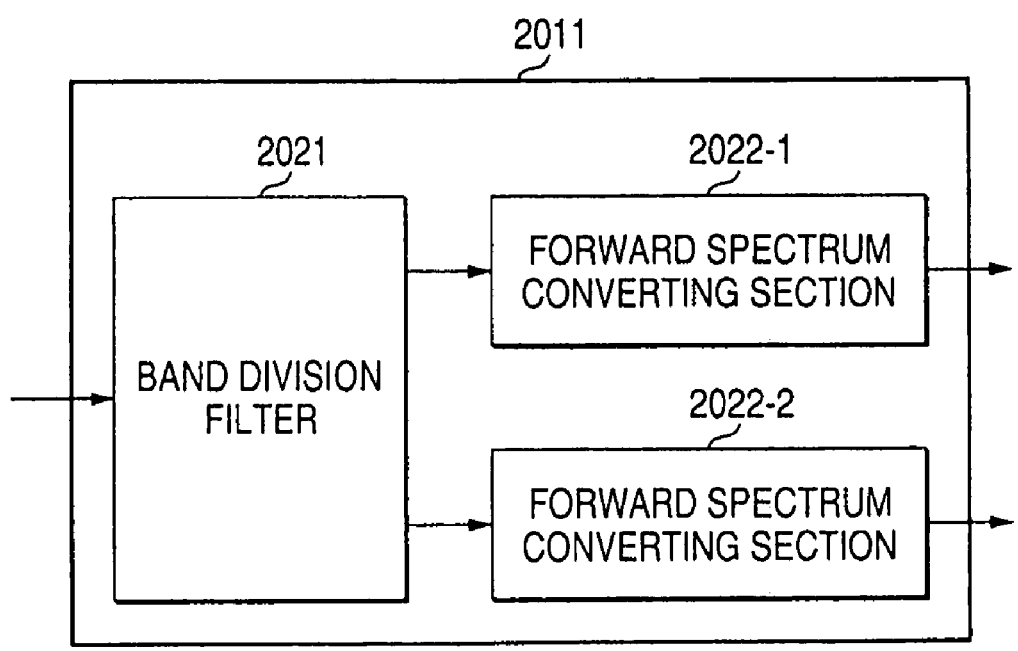
FIG. 35 is a block diagram showing a detailed configuration of a converting section shown in FIG. 34.

FIG. 35 is a block diagram showing a detailed configuration of the converting section 2011.

An acoustic waveform signal that is input to the converting section 2011 is divided into two bands by a band division filter 2021, and respective signals are output to forward spectrum converting sections 2022-1 and 2022-2. Each of the forward spectrum converting sections 2022-1 and 2022-2 converts the received signal into spectrum signal components by MDCT or the like and outputs those to the signal components coding section 2012. The signals that are input to the respective forward spectrum converting sections 2022-1 and 2022-2 is a half, in bandwidth, of the signal that is input to the band division filter 2021, and are input at a half rate.

It was stated above that in the converting section 2011 in FIG. 35 signals in the two bands produced by the band division filter 2021 are converted into spectrum signal components by MDCT. However, various methods are available as the method for converting a received signal into spectrum signal components. For example, a received signal may be converted into spectrum signal components by MDCT without dividing it into bands. Alternatively, each of the forward spectrum converting sections 2022-1 and 2022-2 may convert a received signal into spectrum signals by DCT or DFT.

Although it is possible to divide a received signal into band components using what is called a band division filter, it is preferable to perform spectrum conversion by using MDCT, DCT, or DFC each of which can calculate a lot of frequency components with a relatively small amount of calculation.

Although in FIG. 35 the input acoustic waveform signal is divided into the two bands by the band division filter 2021, it goes without saying that the number of bands need not always be two. Information indicating the number of bands in the band division filter 2021 is supplied to the code sequence generating section 2013 via the signal components coding section 2012.

Figure 36:
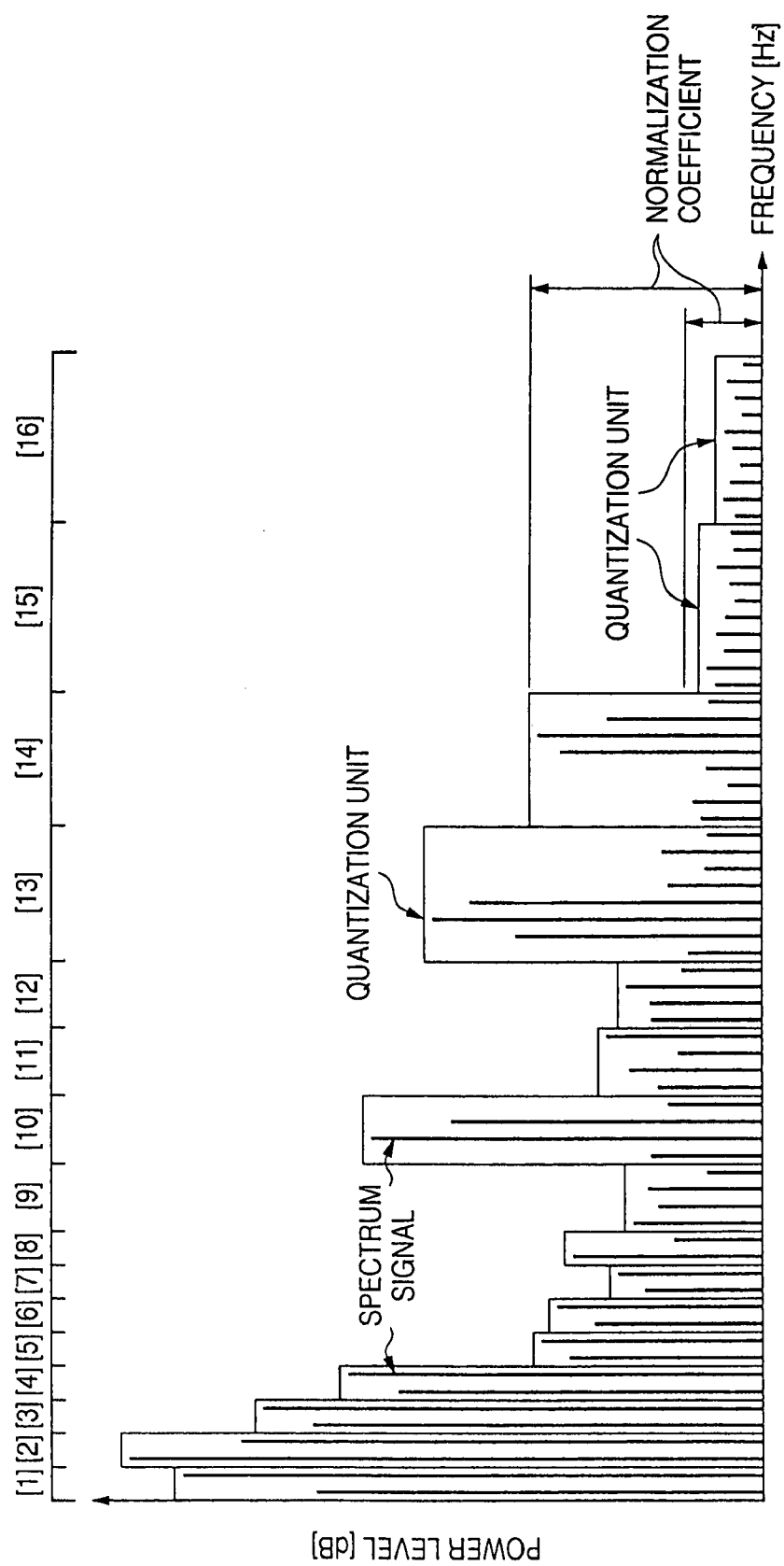
FIG. 36 illustrates spectrum signals and quantization units.

FIG. 36 is a graph in which the absolute values of spectrum signals produced by MDCT in the converting section 2011 are converted into power levels. An acoustic waveform signal that is input to the conversion section 2011 is converted into 64 spectrum signals for each prescribed time block. The spectrum signals are divided into 16 bands, for example, that are indicated by 16 solid-line rectangles [1] to [16] in FIG. 36 by the signal components coding section 2012 by processing to be described later, and are then quantized and normalized for each band. The sets of spectrum signals corresponding to the 16 respective bands, that is, the sets of spectrum signals for which quantization and normalization are performed individually, are quantization units.

Efficient coding capable of minimizing quality deterioration of audible components is enabled by varying the quantization accuracy for each quantization unit in accordance with the manner of distribution of frequency components.

Figure 37:
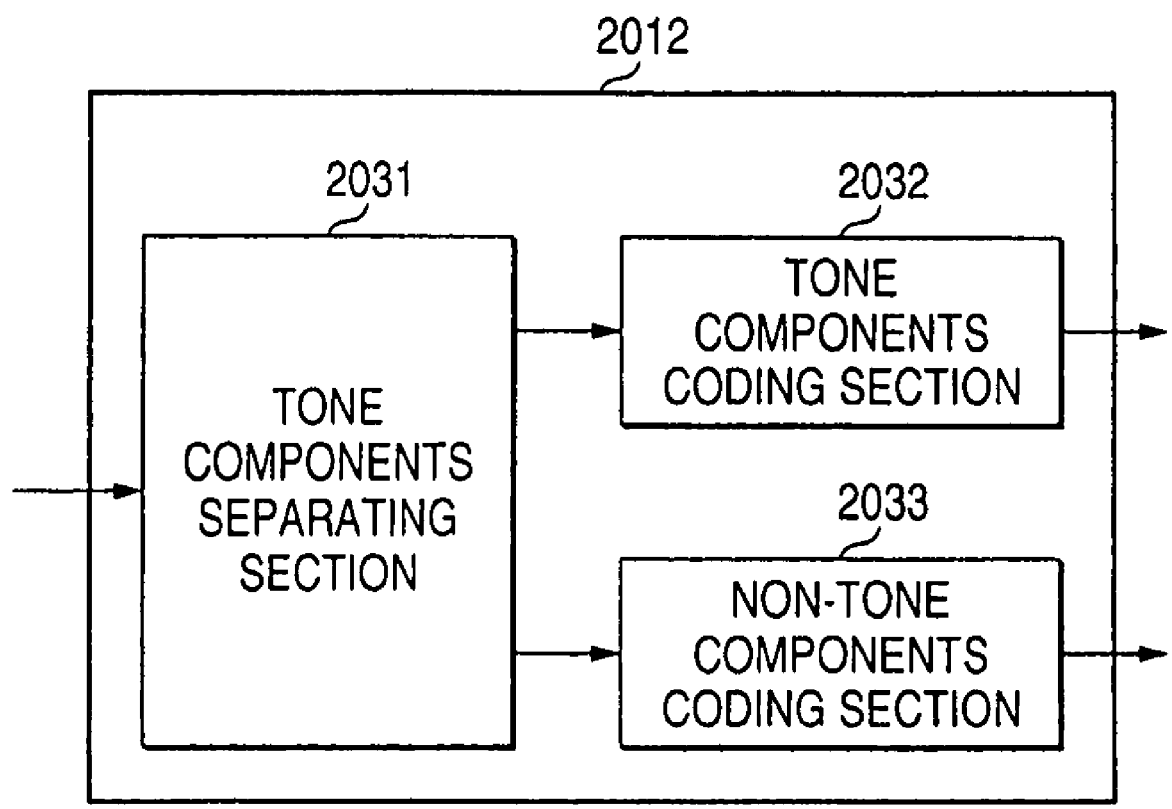
FIG. 37 is a block diagram showing the configuration of a signal components coding section shown in FIG. 34.

FIG. 37 is a block diagram showing a detailed configuration of the signal components coding section 2012. A description will be made of a case that the signal components coding section 2012 separates tone components that are particularly important in terms of the auditory sense, that is, signal components of particular frequencies where energy is concentrated, from received spectrum signals and codes the tone components separately from the other spectrum components.

Spectrum signals that are input from the converting section 2011 are separated into tone components and non-tone components by a tone components separating section 2031. The tone components are output to a tone components coding section 2032 and the non-tone components are output to a non-tone components coding section 2033.

The tone components and the non-tone components will be described with reference to FIG. 38. For example, where the spectrum signals that are input to the tone components separating section 2031 are signals shown in FIG. 38, components having particularly high power levels are separated, as tone components 2041-2043, from non-tone components. Position data P1-P3 indicating the positions of the separated tone components 2041-2043 and their frequency widths are detected and output to the tone components coding section 2032 together with the tone components 2041-2043.

For example, the tone components separation method may be a method that is disclosed in Japanese Patent Application No. 152865/1993 or WO 94/28633 of the present inventors. The tone components and the non-tone components that have been separated from each other by this method are quantized with different numbers of bits by processing (described later) of the tone components coding section 2032 and the non-tone components coding section 2033, respectively.

The tone components coding section 2032 codes received signals with large numbers of quantization bits, that is, with high quantization accuracy. The non-tone components coding section 2033 codes received signals with small numbers of quantization bits, that is, with low quantization accuracy.

Although it is necessary to add, for each tone component, such information as its position information and frequency width, it becomes possible to quantize the spectrum signals of the non-tone components with small numbers of bits. In particular, an acoustic waveform signal that is input to the coding device 2001 is a signal in which energy is concentrated in particular spectrum components, the employment of the above method makes it possible to perform coding effectively at a high compression ratio while causing almost no deterioration for the human auditory sense.

Figure 39:
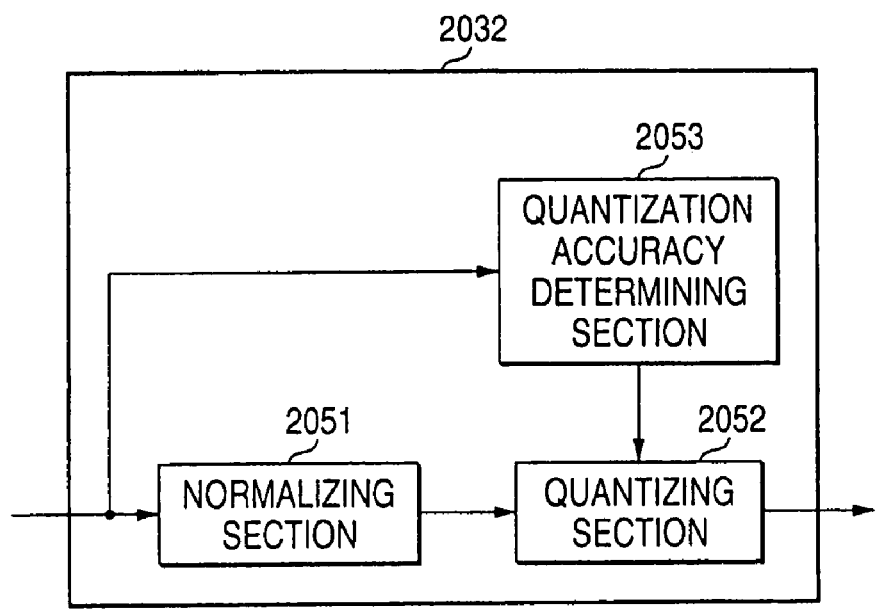
FIG. 39 is a block diagram showing the configuration of a tone components coding section shown in FIG. 37.

FIG. 39 is a block diagram showing a detailed configuration of the tone components coding section 2032 shown in FIG. 37.

A normalizing section 2051 receives tone component spectrum signals for each quantization unit, normalizes those, and outputs normalized spectrum signals to a quantizing section 2052. A quantization accuracy determining section 2053 calculates quantization accuracy by referring to a received quantization unit and outputs a calculation result to the quantizing section 2052. Since the received quantization unit consists of tone components, the quantization accuracy determining section 2053 outputs high quantization accuracy. The quantizing section 2052 generates codes by quantizing the normalized spectrum signals that are received from the normalizing section 2051 with the quantization accuracy that has been determined by the quantization accuracy determining section 2053, and outputs the generated codes and coding-related information such as normalization coefficient information and quantization accuracy information.

The tone components coding section 2032 also codes and outputs, together with the tone components, the tone components position information that is received together with the tone components.

Figure 40:
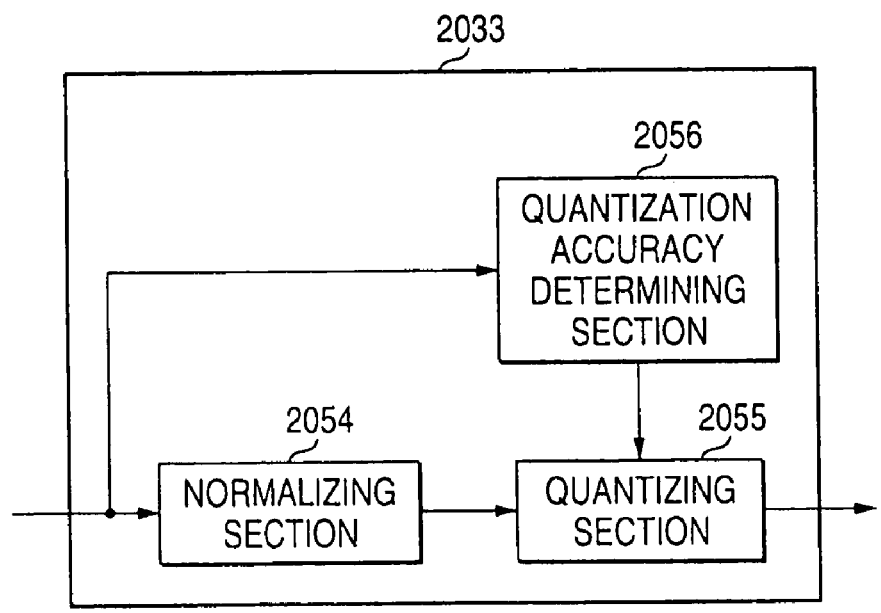
FIG. 40 is a block diagram showing the configuration of a non-tone components coding section shown in FIG. 37.

FIG. 40 is a block diagram showing a detailed configuration of the non-tone components coding section 2033 shown in FIG. 37.

A normalizing section 2054 receives non-tone component spectrum signals for each quantization unit, normalizes those, and outputs normalized spectrum signals to a quantizing section 2055. A quantization accuracy determining section 2056 calculates quantization accuracy by referring to a received quantization unit and outputs a calculation result to the quantizing section 2055. Since the received quantization unit consists of non-tone components, the quantization accuracy determining section 2056 outputs low quantization accuracy. The quantizing section 2055 generates codes by quantizing the normalized spectrum signals that are received from the normalizing section 2054 with the quantization accuracy that has been determined by the quantization accuracy determining section 2056, and outputs the generated codes and coding-related information such as normalization coefficient information and quantization accuracy information.

It is possible to provide higher coding efficiency than provided by the above coding method. For example, the coding efficiency can further be increased by performing variable-length coding in such a manner that relatively short code lengths are allocated to quantized spectrum signals that occur at high frequencies and relatively long code lengths are allocated to quantized spectrum signals that occur at low frequencies.

Figure 41:
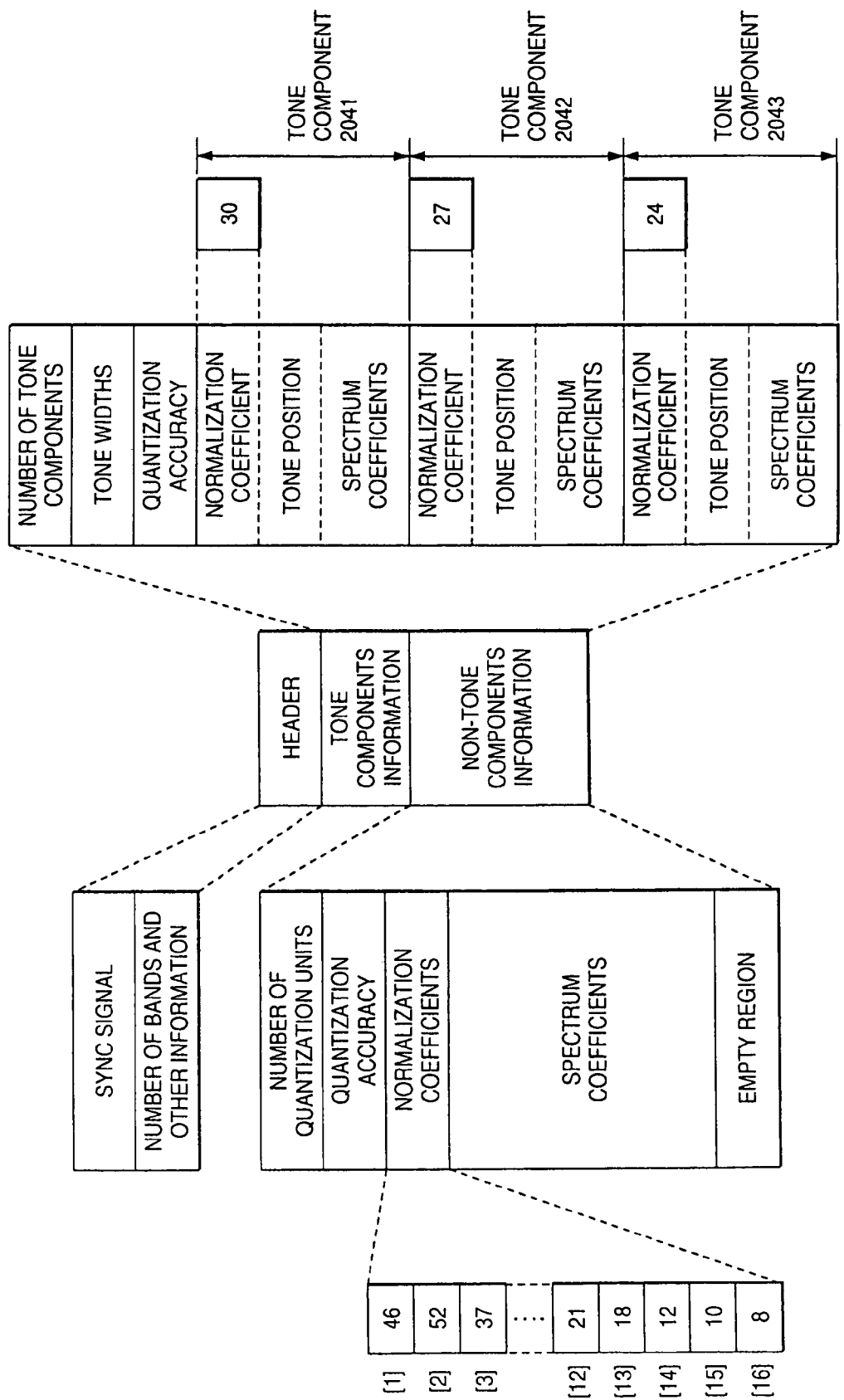
FIG. 41 shows a format of a frame of original data.

The code sequence generating section 2013 in FIG. 34 generates a code sequence that can be recorded on a recording medium or transmitted to another information processing apparatus via a data transmission line, that is, a code sequence consisting of a plurality of frames, on the basis of codes of signal frequency components that are output from the signal components coding section 2012, and outputs those to the trial listening data generating section 2014. The code sequence that is generated by the code sequence generating section 2013 is audio data that can be reproduced by an ordinary decoder with high sound quality. FIG. 41 shows a format of a frame of audio data that are generated by the code sequence generating section 2013 and that can be reproduced with high sound quality.

A fixed-length header containing a sync signal is provided at the head of each frame. The header also contains such information as the number of bands of the band division filter 2021 of the converting section 2011 that was described above with reference to FIG. 35.

Each frame contains tone component information relating to separated tone component that follows the header. The tone component information includes the number of tone component, tone widths, and quantization accuracy information of the quantization that was performed on the tone component by the tone component coding section 2032 that was described above with reference to FIG. 39. A normalization coefficient, tone positions, and spectrum coefficients of each of the tone components 2041-2043 follow the quantization accuracy information. It is assumed that the normalization coefficients of the tone components 2041-2043 are equal to 30, 27, and 24, respectively.

Non-tone component information follows the tone component information. The non-tone components information contains the number of quantization units (in this example, 16), quantization accuracy information of the quantization that was performed on the non-tone components by the non-tone components coding section 2033 that was described above with reference to FIG. 40, pieces of normalization coefficient information of the 16 respective quantization units, and spectrum coefficient information. The normalization coefficient information is values of the respective quantization units, that is, a value "46" of the lowest-frequency quantization unit [1] to a value "8" of the highest-frequency quantization unit [16]. It is assumed that the normalization coefficient information is values that are in proportion to power levels (in dB) of spectrum signals. Where content frames have a fixed length, an empty region may be provided after the spectrum coefficient information.

Figure 42:
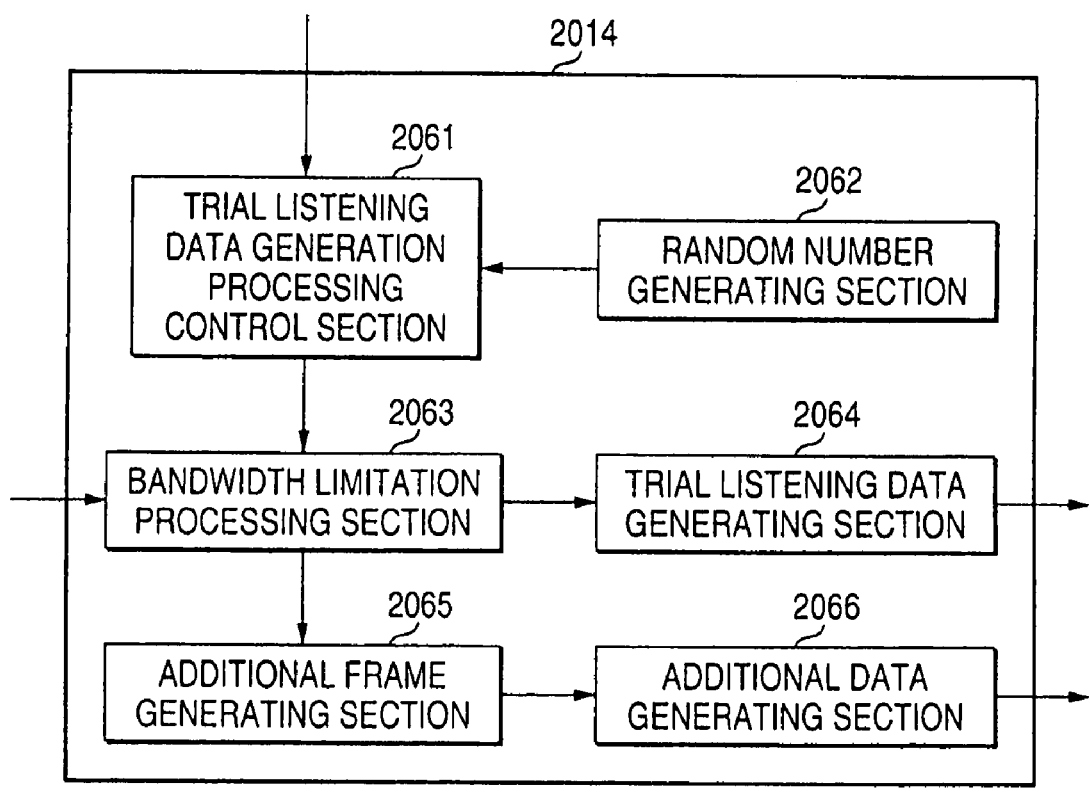
FIG. 42 is a block diagram showing the configuration of a trial listening data generating section shown in FIG. 34.

FIG. 42 is a block diagram showing a detailed configuration of the trial listening data generating section 2014 shown in FIG. 34.

A trial data generation processing control section 2061 causes a bandwidth limitation processing section 2063 to generate trial listening frames by controlling it on the basis of setting data such as a trial listening band of trial listening data that is input from an external manipulation input section (not shown) and random numbers that are input from a random number generating section 2062. The trial listening band is a frequency band for low-quality reproduction only part of the quantization units are designated among the spectrum data of FIG. 38, for example, whereby spectrum data in only a certain range (frequency band) are made reproducible and the quality of reproduction sound is lowered. The trial data generation processing control section 2061 determines, on the basis of a pseudo random-number X that is supplied from the random number generating section 2062, a bit length of dummy data with which the bandwidth limitation processing section 2063 replaces spectrum coefficient information by processing described later.

The random number generating section 2062 generates a different pseudo random number X every time a frame is input to the bandwidth limitation processing section 2063, and supplies it to the trial data generation processing control section 2061. For example, the random number generating section 2062 generates pseudo random numbers X by selecting a 100-bit arbitrary number first, squaring it, and selecting central 100 bits from the square (the last two steps are repeated plural times (an arbitrary number of times)). It goes without saying that the method for generating pseudo random numbers X may be any method.

The bandwidth limitation processing section 2063 generates a trial listening frame by limiting the trial listening band of the received frame on the basis of the signal received from the trial data generation processing control section 2061. The information on the trial listening band is supplied from the trial data generation processing control section 2061.

Figure 43:
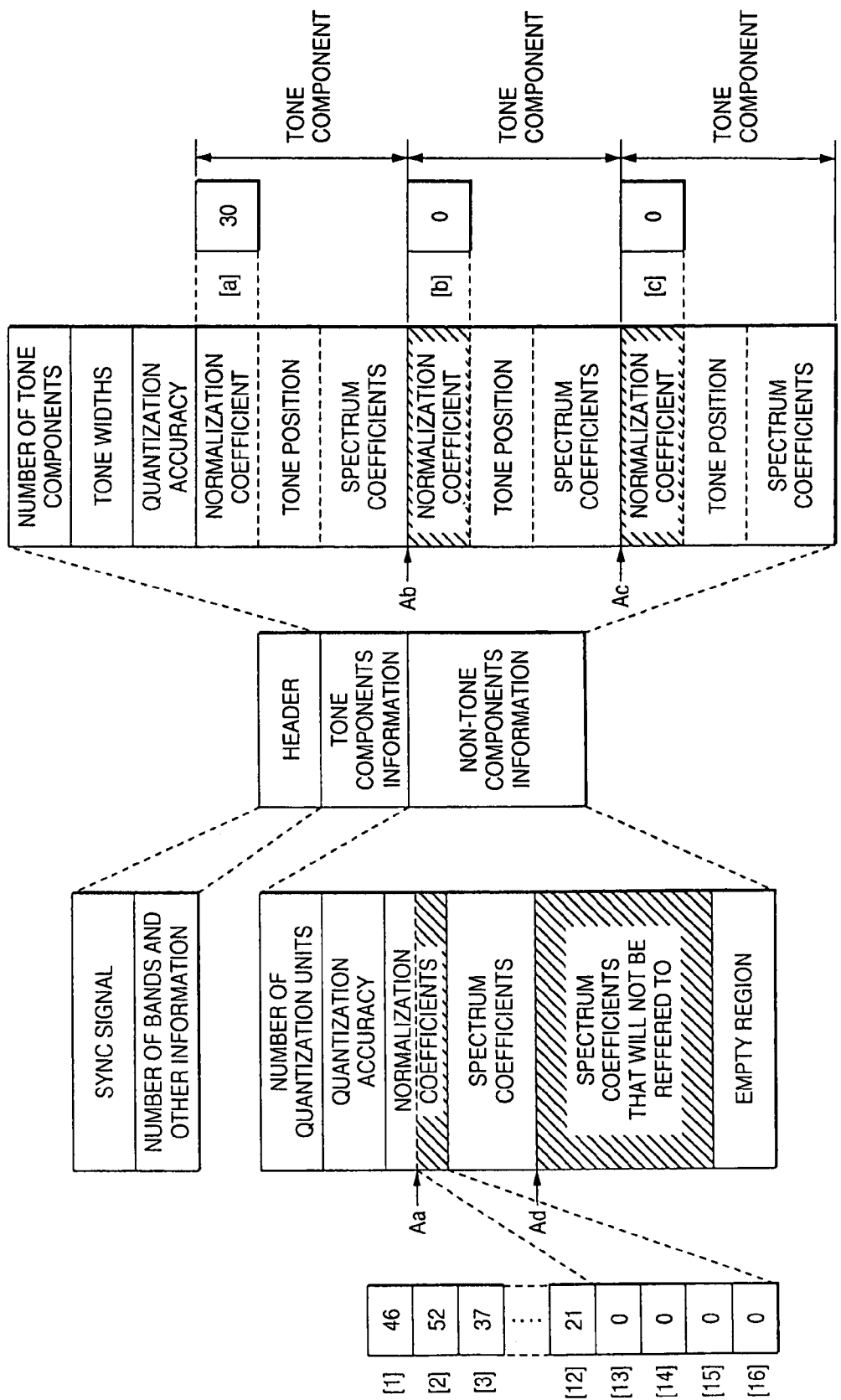
FIG. 43 shows a format of a trial listening frame.

For example, if the quantization units [1] to [12] are designated as a trial listening band of a trial-listening-allowable portion, the bandwidth limitation processing section 2063 minimizes the values of the normalization coefficient information of the quantization units [13] to [16] that are higher in frequency than the trial listening band to "0" for example, as shown in FIG. 43. Therefore, although the portion of the spectrum coefficient information corresponding to the quantization units [13] to [16] has effective values, during reproduction spectrum signals of this portion have values that are substantially equal to "0" in terms of audibility though strictly they are not "0" because the normalization coefficient information is "0". Spectrum coefficient information that is higher, in frequency, than the position indicated by symbol Ad in FIG. 43 will as good as not be referred to.

As in the case of the non-tone components, the values of normalization coefficients out of the trial listening band of the tone components are minimized to "0," for example, whereby during reproduction spectrum signals of those tone components are also minimized (to values substantially equal to "0").

Figure 44:
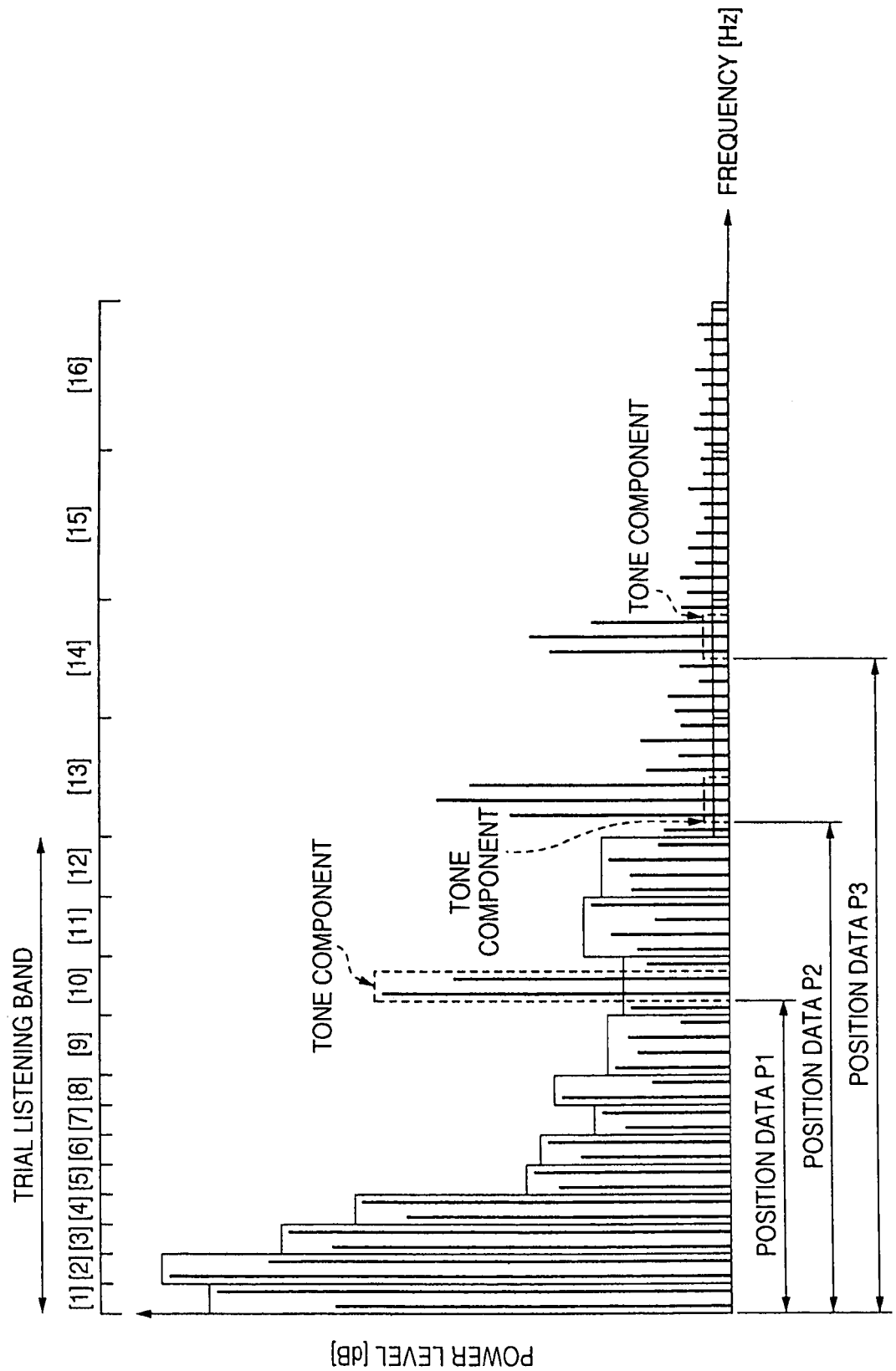
FIG. 44 shows spectrum signals corresponding to the trial listening frame of FIG. 43.

FIG. 44 shows spectrum signals that are obtained when the trial listening data of FIG. 43 are reproduced. Since the normalization coefficient information of the quantization units [13] to [16] is changed to "0," corresponding spectrum signals are minimized. Spectrum signals corresponding to the two tone components that are contained in the quantization units [13] to [16] are also minimized in a similar manner. That is, when the trial listening data are reproduced, only narrow-band spectrum signals are reproduced in a trial-listening-allowable portion.

In this manner, only narrow-band data are reproduced when the trial listening data are reproduced. Therefore, data that are lower in quality than the original data that were described above with reference to FIG. 41 are reproduced.

Figure 45:
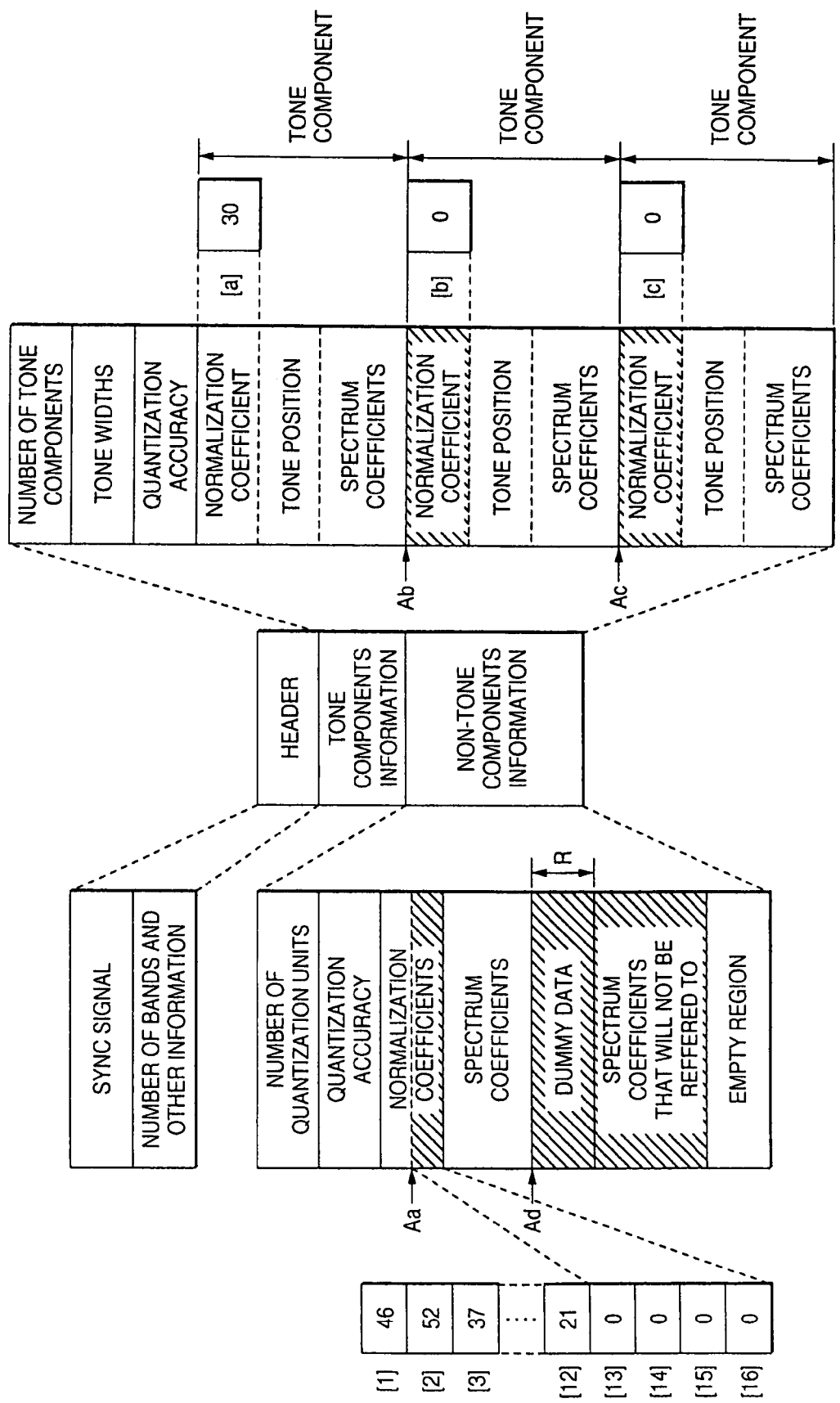
FIG. 45 shows a trial listening frame in which part of spectrum coefficients are replaced by dummy data.

The bandwidth limitation processing section 2063 inserts random dummy data into the region of the spectrum coefficient information that will not be referred to, that is, the region that will be disregarded when the trial listening data are reproduced because of reproduction quality restriction, with a data length that is calculated by the trial listening data generation processing control section 2061 and varies frame by frame (the spectrum coefficients that will not be referred to are replaced by the dummy data). FIG. 45 shows a format of a resulting frame.

In particular, where the spectrum coefficient information are given variable-length codes and the variable-length codes are arranged in the region of the spectrum coefficient information in order from the low-frequency side to the high-frequency side, part of a middle-range variable-length codes are lost by inserting the random dummy data into the region of the spectrum coefficients that will not be referred to with the data length R that varies frame by frame. Therefore, high-frequency-side data including that portion cannot be decoded at all. It is very difficult to restore the spectrum coefficient information relating to original data that is not contained in the trial listening data without using additional data. The safety of the trial listening data is thus increased.

For example, if N bits of the spectrum coefficient information are replaced by dummy data, $2^N$ kinds of inference data will occur in inferring true data for the dummy data of N bits.

As described above, where part of the normalization coefficients or the spectrum coefficients are replaced by "0" or dummy data, inferring true data corresponding to the replacement data is much more difficult than deciphering a relatively short encryption key. Illegally altering the trial listening data may deteriorate the sound quality on the contrary. Therefore, it is very difficult for a user who is not permitted to listen to the original data to infer the original data on the basis of the trial listening data; the rights of an author and a distributor of contents data can be protected strongly.

Should true data corresponding to replacement data of certain trial listening data be inferred successfully, the damage does not expand to other contents. Therefore, the method according to this embodiment is safer than the case of distributing, as trial listening data, contents data that are encrypted according to a particular algorithm.

The original values of the normalization coefficient information and the spectrum coefficient information that were changed by the bandwidth limitation processing section 2063 (i.e., the true normalization coefficient information and the true spectrum coefficient information) and information indicating the start position of the dummy data that replaced part of the spectrum coefficients and the data length of the dummy data are supplied to an additional frame generating section 2065 (described later) and incorporated into an additional frame. The bandwidth limitation processing section 2063 may change part of the quantization accuracy information, the number of quantization units, etc. that were changed by the bandwidth limitation processing section 2063 in addition to part of the normalization coefficient information and part of the spectrum coefficient information. The additional frame generating section 2065 (described later) receives information indicating the part of the quantization accuracy information, the number of quantization units, etc. and incorporates these kinds of information into the additional frame.

Changing part of the normalization coefficient information and changing part of the quantization accuracy information are much different from each other in the difficulty in inferring the original data illegally on the basis of the trial listening data without using additional data, that is, in the safety of the trial listening data. For example, where a bit allocation algorithm is employed in which quantization accuracy information is calculated on the basis of normalization coefficient information in generating original data, if part of only the quantization accuracy information is replaced by dummy data or "0," there is a risk that the true quantization accuracy information is inferred successfully by using the normalization coefficient information.

In contrast, where part of only the normalization coefficient information is changed, it can be said that the safety of the trial listening data is high because it is difficult to infer the true normalization coefficient information on the basis of the quantization accuracy information. Replacing both of part of the normalization coefficient information and part of the quantization accuracy information with dummy data or "0" further lowers the risk that the original data are successfully inferred illegally. It is also possible to selectively replace part of the normalization coefficient information or part of the quantization accuracy information with dummy data or "0" from one content frame of the trial listening data to another.

The additional frame generating section 2065 generates, on the basis of the information relating to the normalization coefficient etc. that have been band-width-limited and modified by the bandwidth limitation processing section 2063, an additional frame to form additional data for original data restoration that a user will buy to listen to a song with high sound quality after checking the trial listening data.

Figure 46:
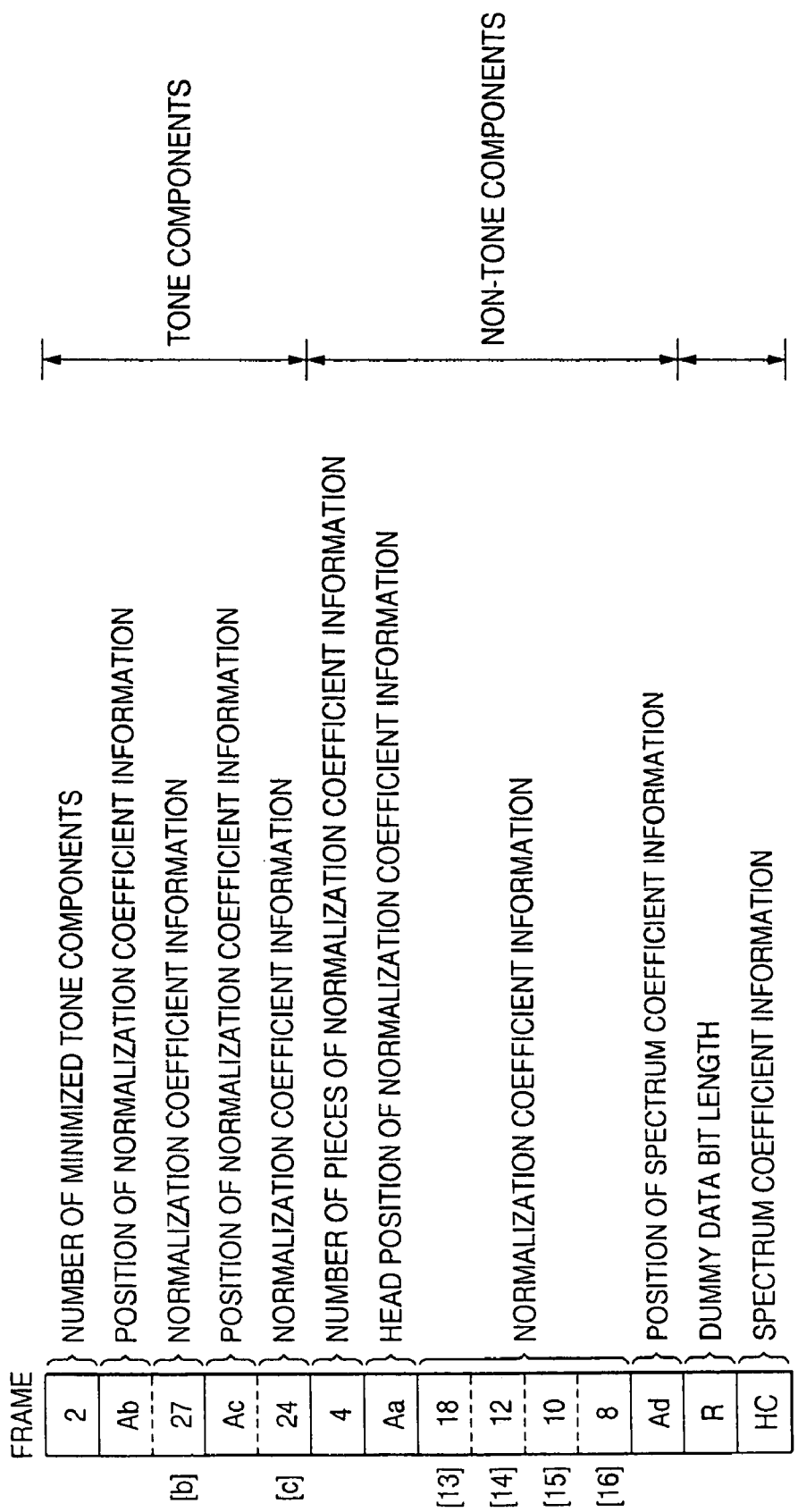
FIG. 46 illustrates an additional frame.

FIG. 46 shows a format of an additional frame that is generated in the above manner. As described above with reference to FIG. 45, in the case where the quantization units [1] to [12] are selected as a trial listening band, in each frame of the trial listening data, the normalization coefficients of the tone components and the non-tone components in the four quantization units [13] to [16] are replaced by "0." Part of the spectrum coefficient information that will not be referred to are replaced by dummy data whose data length varies frame by frame. The additional frame generating section 2065 receives, from the bandwidth limitation processing section 2063, the original values of the changed normalization coefficient information and spectrum coefficient information (i.e., true normalization coefficient information and true spectrum coefficient information) and information indicating the start position of dummy data that replaced the spectrum coefficients and the data length of the dummy data, and generates the additional frame of FIG. 46.

Additional information corresponding to the tone components and additional information corresponding to the non-tone components are incorporated in the additional frame. FIG. 46 shows a case that the quantization units [1] to [12] are selected as a trial listening band. The additional information corresponding to the tone components is the number of minimized tone components (in this example, two), the positions, in the trial listening frame, of the normalization coefficient information of the minimized tone components, and the true normalized coefficient information. The additional information corresponding to the non-tone components is the number of minimized normalization coefficients of the non-tone components (in this example, four), the head positions of those normalization coefficients (e.g., head quantization unit number "13" of the head of the quantization units whose normalization coefficients are changed to "0"), the true normalization coefficients that are replaced, the position of the dummy-data-replaced portion of the true spectrum coefficient information, the dummy data bit length, and the true spectrum coefficient information.

The position information of the dummy-data-replaced portion of the true spectrum coefficient information may not be included in the additional frame, because it can be determined on the basis of the information of the regions of the quantization units whose normalization coefficients are replaced by "0" if the dummy-data-replaced portion of the spectrum coefficients is set, in the trial listening frame, at the head of the spectrum coefficient information that will not be referred to. Where the dummy-data-replaced portion of the spectrum coefficients is not set at the head of the spectrum coefficient information that will not be referred to, it is necessary to incorporate, in the additional frame, the position information of the dummy-data-replaced portion of the true spectrum coefficient information.

If, for example, the bandwidth limitation processing section 2063 has changed quantization accuracy information, the number of quantization units, etc. in addition to part of the normalization coefficient information and part of the spectrum coefficient information, the additional frame generating section 2065 receives information indicating the changed quantization accuracy information, the changed number of quantization units, etc. and incorporates the true values of these pieces of information into the additional frame.

The bandwidth limitation processing section 2063 generates the trial listening frame using such replacement data that the length of decoded data to be obtained by decoding the trial listening data will not exceed the length of decoded data to be obtained by decoding the original data.

A trial data generating section 2064 generates headers of the trial listening data, generates trial listening data by adding the generated headers to a coded frame sequence of received trial listening data, and outputs the trial listening data. For example, the headers of the trial listening data contain a content ID for identification of the content, a content reproduction time, a content title, information relating to a coding method, and other information.

An additional data generating section 2066 generates additional data by adding headers to a coded frame sequence of received additional data, and outputs the generated additional data. The headers of the additional data include such information as a content ID for identification of the content and association with the trial listening data, a content reproduction time, and, if necessary, information relating to a coding method.

The original data can be restored by processing described later by using the trial listening data and the additional data that are generated by the trial listening data generating section 2014 that was described above with reference to FIG. 42.

Next, a trial listening data generating process will be described with reference to a flowchart of FIG. 47.

At step S201, the trial listening data generation processing control section 2061 acquires a setting value of a trial listening band of trial listening data that is input from a manipulation input section (not shown) or the like. The following description will be made with an assumption that the quantization units [1] to [12] are set as a trial listening band as described above with reference to FIGS. 43 and 44. The trial listening data generation processing control section 2061 supplies the setting value of the trial listening band to the bandwidth limitation processing section 2063.

At step S202, the bandwidth limitation processing section 2063 receives a frame that is included in a frame sequence that corresponds to original data.

At step S203, the bandwidth limitation processing section 2063 changes, to "0," for example, the normalization coefficient information of the tone components of the received frame that are out of the band that is specified by the setting value of the trial listening band that is supplied from the trial listening data generation processing control section 2061.

At step S204, the bandwidth limitation processing section 2063 changes, to "0," for example, the normalization coefficient information of the non-tone components that are out of the band that is specified by the setting value of the trial listening band that is supplied from the trial listening data generation processing control section 2061.

At step S2005, the random number generating section 2062 generates a pseudo random number X and outputs it to the trial listening data generation processing control section 2061. For example, pseudo random numbers X are generated by selecting a 100-bit arbitrary number first, squaring it, and selecting central 100 bits from the square (the last two steps are repeated plural times (an arbitrary number of times)).

At step 206, the trial listening data generation processing control section 2061 determines a dummy data bit length R using the pseudo random number X and supplies it to the bandwidth limitation processing section 2063. For example, the trial listening data generation processing control section 2061 employs, as R, a remainder of the pseudo random number X divided by $2^n$, where n is the number of bits of spectrum coefficient information to be replaced by dummy data. Naturally, other methods of determining a dummy data bit length R may be used as long as they can generate a different numerical value each time in a range that is suitable for the number of bits of spectrum coefficient information to be replaced by dummy data.

At step S207, the bandwidth limitation processing section 2063 generates a trial listening frame as described above with reference to FIG. 45 changes, by replacing those with random dummy data, spectrum coefficient information of R bits from a start position Ad among spectrum coefficient information that corresponds to the normalization coefficient information of the non-tone components that was changed at step S204 and will not be referred to, on the basis of the dummy data bit length R that was determined at step S206 and is input from the trial listening data generation processing control section 2061. The bandwidth limitation processing section 2063 outputs the generated trial listening frame to the trial listening data generating section 2064, and outputs the contents of the changes that were made at steps S203 to S207 to the additional frame generating section 65.

The dummy data having the bit length R to replace spectrum coefficient information may have a value "0" in their entirety. Alternatively, 0s and 1s may be mixed with each other properly to make it difficult to identify the dummy data. Where the spectrum coefficient information is variable-length codes, an event that the frame length of the code sequence of the original data will be exceeded in decoding processing (described later) can be prevented by making a bit length that will be obtained when the dummy data are decoded smaller than a bit length that will be obtained when the true spectrum coefficient information is decoded.

At step S208, on the basis of the signals that are input from the bandwidth limitation processing section 2063, the additional frame generating section 2065 generates data for an additional frame to constitute additional data that a user who will want to listen to a song with high sound quality will buy after checking trial listening data (described above with reference to FIG. 46) and outputs the generated data to the additional data generating section 2066.

At step S209, the trial listening data generation processing control section 2061 judges whether the frame just processed is the last frame. If it is judged at step S209 that the frame just processed is not the last frame, the process returns to step S202 and step S202 and the subsequent steps are executed again.

If it is judged at step S209 that the frame just processed is the last frame, the process goes to step S210, where the trial listening data generating section 2064 generates headers for trial listening data, generates trial listening data by adding the headers to the trial listening frame sequence, and outputs the generated trial listening data.

At step S211, the additional data generating section 2066 generates headers for additional data by using the input information, generates additional data by adding the headers to the additional frame sequence, and outputs the generated additional data. The process is then finished.

Figure 47:
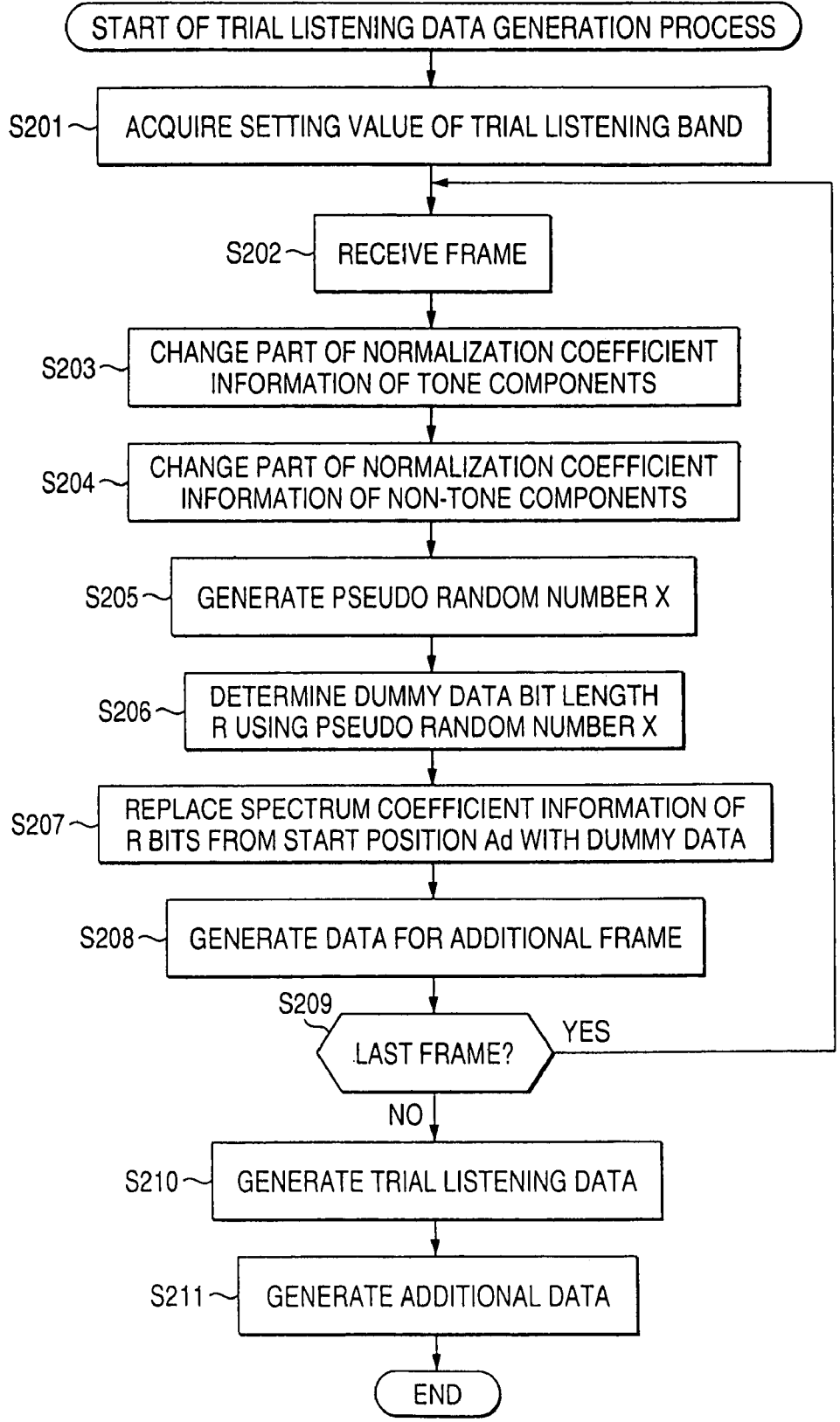
FIG. 47 is a flowchart of a trial listening data generating process.

The trial listening data to be reproduced with low quality and the additional data to be used for restoring the original data from the trial listening data are generated as a result of the execution of the process that is shown by the flowchart of FIG. 47.

As described above, the reproducible band of the trial listening data may be restricted over the entire original data. Alternatively, to motivate users who have received the trial listening data to buy the content more effectively, a prescribed portion of the trial listening data may be made reproducible with high sound quality like the original data. In this case, the portion is reproducible with high sound quality like the original data may be generated by copying corresponding frames of the original data into trial listening data as they are without performing bandwidth limitation. It goes without saying that the additional data do not include frames corresponding to the above portion.

It is also possible to make only a prescribed portion of the trial listening data bandwidth-limited data that are reproducible with low quality and to make the other portions unreproducible. In this case, it is appropriate to replace, with dummy data, all the normalization coefficient information of frames corresponding to the unreproducible portion and to incorporate all the true normalization coefficient information into additional frames.

In the above description, in coding an input signal, the signal components coding section 2012 of the coding device 2001 separates tone components and non-tone component from each other and codes the tone components and the non-tone component separately. Alternatively, an input signal may be coded without being divided into tone components and non-tone components by employing the non-tone component coding section 2033 shown in FIG. 40 instead of the signal component coding section 2012.

Figure 48:
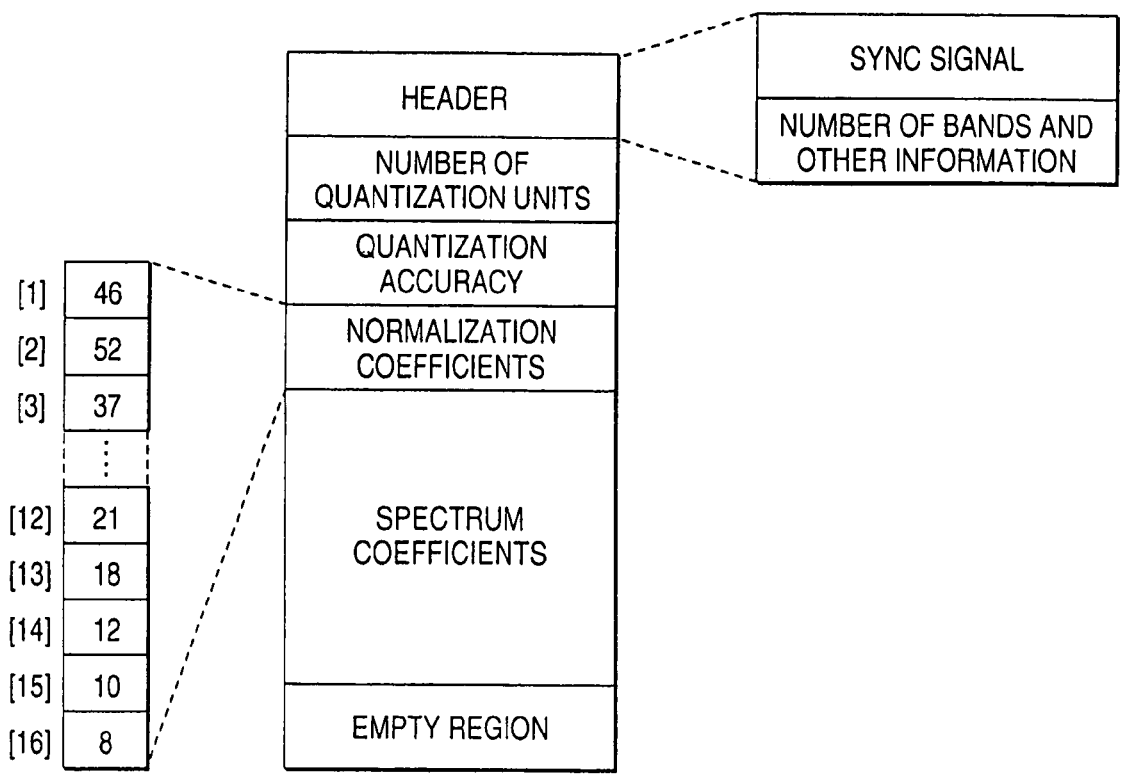
FIG. 48 illustrates an original data frame that is generated in the case where tone components are not separated.

FIG. 48 shows a format of an original data frame having high sound quality that is generated by the code sequence generating section 2013 in the case where an input signal is not divided into tone components and non-tone components. As in the case of the format of FIG. 41, a fixed-length header containing a sync signal is provided at the head of the original data frame. The number of bands of the band division filter 2021 of the converting section 2011 that was described above with reference to FIG. 35 and other information are also incorporated in the header. The number of quantization units (in this example, 16), quantization accuracy information of quantization that has been performed by the non-tone component coding section 2033, pieces of normalization coefficient information of the 16 respective quantization units, and spectrum coefficient information are arranged following the header. A value "46" of the lowest-frequency quantization unit [1] to a value "8" of the highest-frequency quantization unit [16] are arranged as the normalization coefficient information for the respective quantization units. Where the content frame length is fixed, an empty region may be provided after the spectrum coefficient information.

Figure 49:
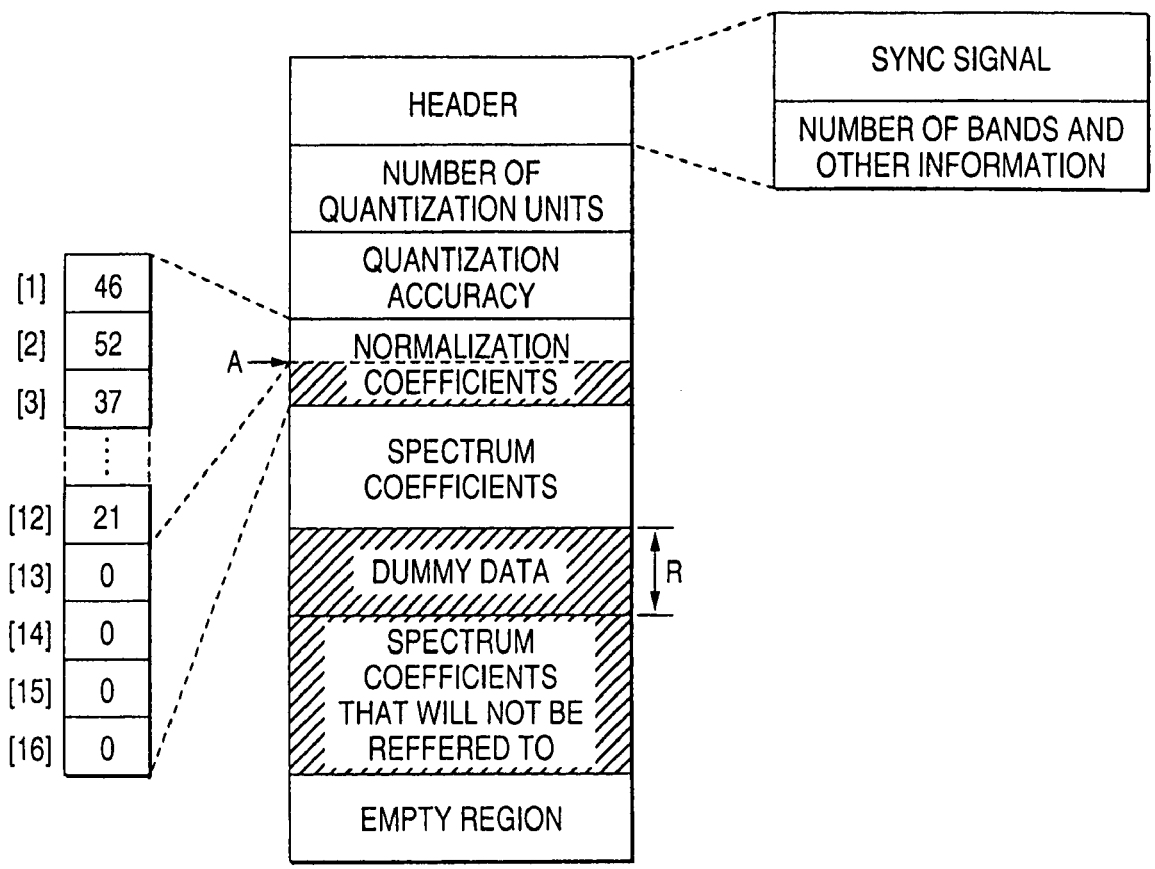
FIG. 49 illustrates trial listening data that are generated in the case where tone components are not separated.

FIG. 49 shows a format of trial listening data that are generated by the trial listening data generating section 2014 in response to the original data frame of FIG. 48. If quantization units [1] to [12], for example, are specified as a trial listening band, the values of the normalization coefficient information of the quantization units [13] to [16] that are higher, in frequency, than the trial listening band are made "0" similarly in the case of the description with reference to FIG. 43. Dummy data whose data length varies frame by frame are incorporated as spectrum coefficient information of the quantization units [13] to [16]. Therefore, it is very difficult to infer the original data from the trial listening data.

Figure 50:
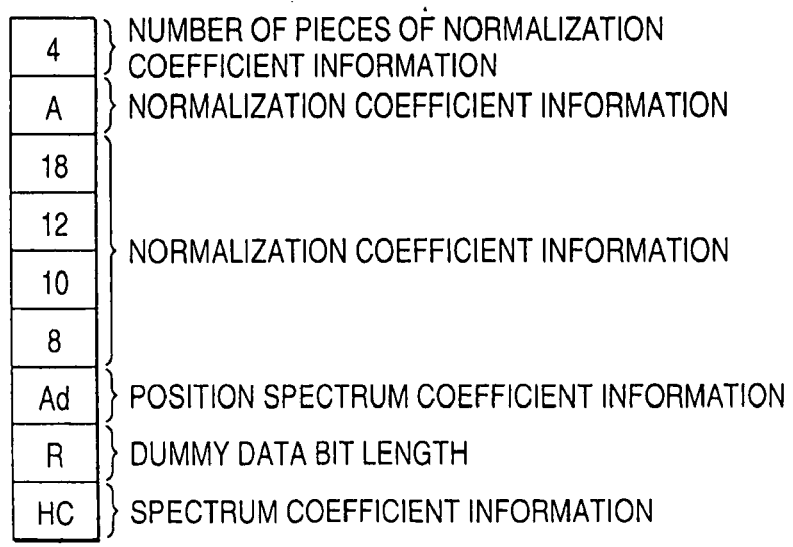
FIG. 50 illustrates an additional frame that is generated in the case where tone components are not separated.

FIG. 50 shows an additional frame that is generated by the additional frame generating section 2065 of the trial listening data generating section 2014 in response to the original data frame of FIG. 48. The additional frame incorporates the number of minimized normalization coefficients (in this example, four), the head position of those normalization coefficients, the true normalization coefficients that are replaced, the position of the dummy-data-replaced portion of the true spectrum coefficient information, the dummy data bit length that varies frame by frame, and the dummy-data-replaced portion of the true spectrum coefficient information.

As described above with reference to FIGS. 48-50, low-quality trial listening data and additional data to be used for restoring the original data on the basis of the trial listening data are generated also in the case where tone components are not separated from an input signal by the process that is similar to the process of the case that tone components are not separated from an input signal.

The trial listening data thus generated are delivered to users over Internet or distributed in such a manner as to be recorded on various recording media held by users by means of MMKs that are installed in stored etc. If a user who has reproduced the trial listening data likes the contents, he can acquire the additional data by paying a prescribed charge to a content data delivery company. The user can restore the original data using the trial listening data and the additional data, decode the original data, and reproduce or record on a recording medium the decoded original data.

Next, a description will be made of a process of decoding and outputting or reproducing trial listening data or decoding and outputting or reproducing original data on the basis of trial listening data and additional data.

Figure 51:
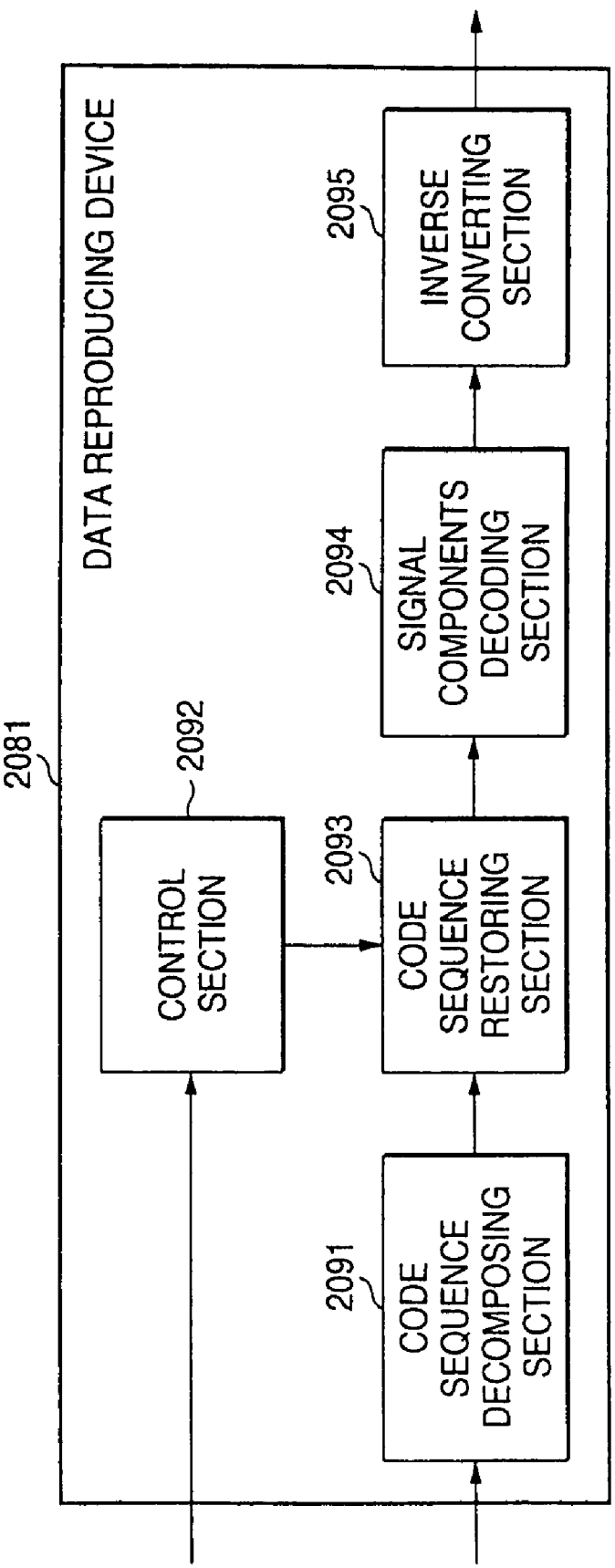
FIG. 51 is a block diagram showing the configuration of a data reproducing device according to the second embodiment of the invention.

FIG. 51 is a block diagram showing the configuration of a data reproducing device 2081.

A code sequence decomposing section 2091 receives coded trial listening data, decomposes the code sequence, extracts codes of respective signal components, and output those to a code sequence restoring section 2093.

A control section 2092 receives manipulation input information, that is, information indicating whether to reproduce input data with high sound quality, of a user via a manipulation input section (not shown) and also receives additional data, and controls the processing of the code sequence restoring section 2093. When necessary, the control section 2092 supplies the code sequence restoring section 2093 with such information as true normalization coefficient information, true spectrum coefficient information, a position of spectrum coefficient information, and a dummy data bit length.

Controlled by the control section 2092, the code sequence restoring section 2093 outputs the received coded frames to the signal component decoding section 2094 as they are if the input trial listening data are to be listened to, that is, reproduced as they are. If original data are to be restored from the input trial listening data and to be reproduced, the code sequence restoring section 2093 performs processing of restoring coded frames of original data from the coded frames of the trial listening data on the basis of the various kinds of information such as the true normalization coefficient information, the true spectrum coefficient information, the position of spectrum coefficient information, and the dummy data bit length that are supplied from the control section 2092 and outputs the restored coded frames of the original data to the signal component decoding section 2094.

Figure 52:
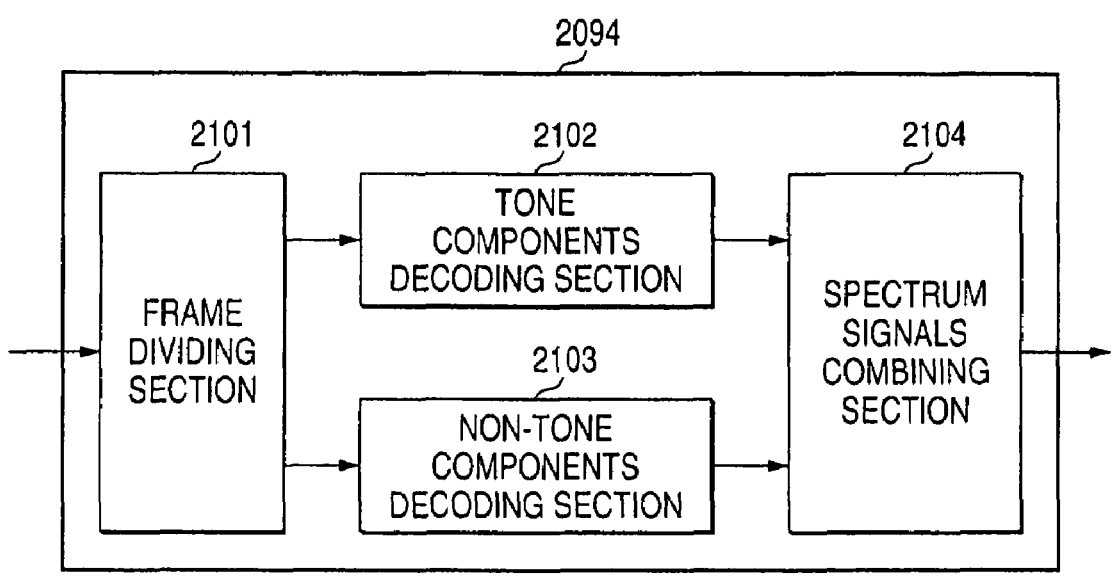
FIG. 52 is a block diagram showing the configuration of a signal components decoding section shown in FIG. 51.

The signal components decoding section 2094 decodes the received trial listening data or the coded frames of the original data. FIG. 52 is a block diagram showing a detailed configuration of the signal component decoding section 2094 for decoding received coded frames that were produced after division into tone components and non-tone components.

A frame dividing section 2101 receives a coded frame as shown in FIG. 45, for example, divides it into tone components and non-tone components, and outputs the tone components and the non-tone components to a tone components decoding section 2102 and a non-tone components decoding section 2103, respectively.

Figure 53:
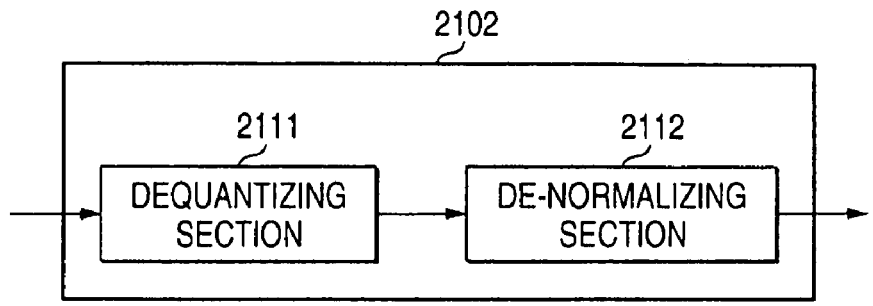
FIG. 53 is a block diagram showing the configuration of a tone components decoding section shown in FIG. 52.

FIG. 53 is a block diagram showing a detailed configuration of the tone components decoding section 2102. A dequantizing section 2111 dequantizes received coded data and outputs dequantized coded data to a de-normalizing section 2112. The de-normalizing section 2112 de-normalizes the received data. That is, the dequantizing section 2111 and the de-normalizing section 2112 perform decoding processing and thereby produce spectrum signals of the tone components.

Figure 54:
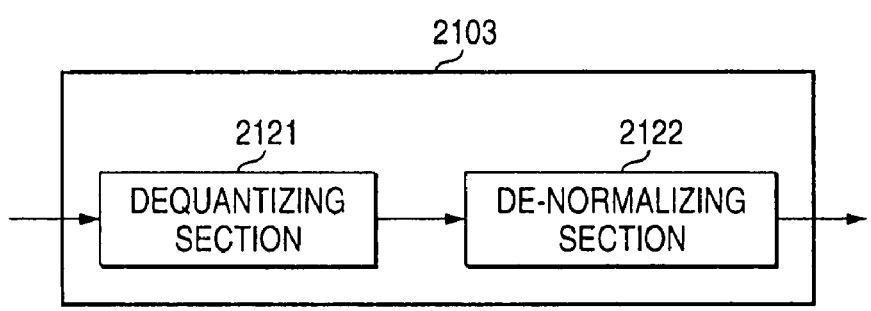
FIG. 54 is a block diagram showing the configuration of a non-tone components decoding section shown in FIG. 52.

FIG. 54 is a block diagram showing a detailed configuration of the non-tone components decoding section 2103. A dequantizing section 2121 dequantizes received coded data and outputs dequantized coded data to a de-normalizing section 2122. The de-normalizing section 2122 de-normalizes the received data. That is, the dequantizing section 2121 and the de-normalizing section 2122 perform decoding processing and thereby produce spectrum signals of the non-tone components.

Figure 38:
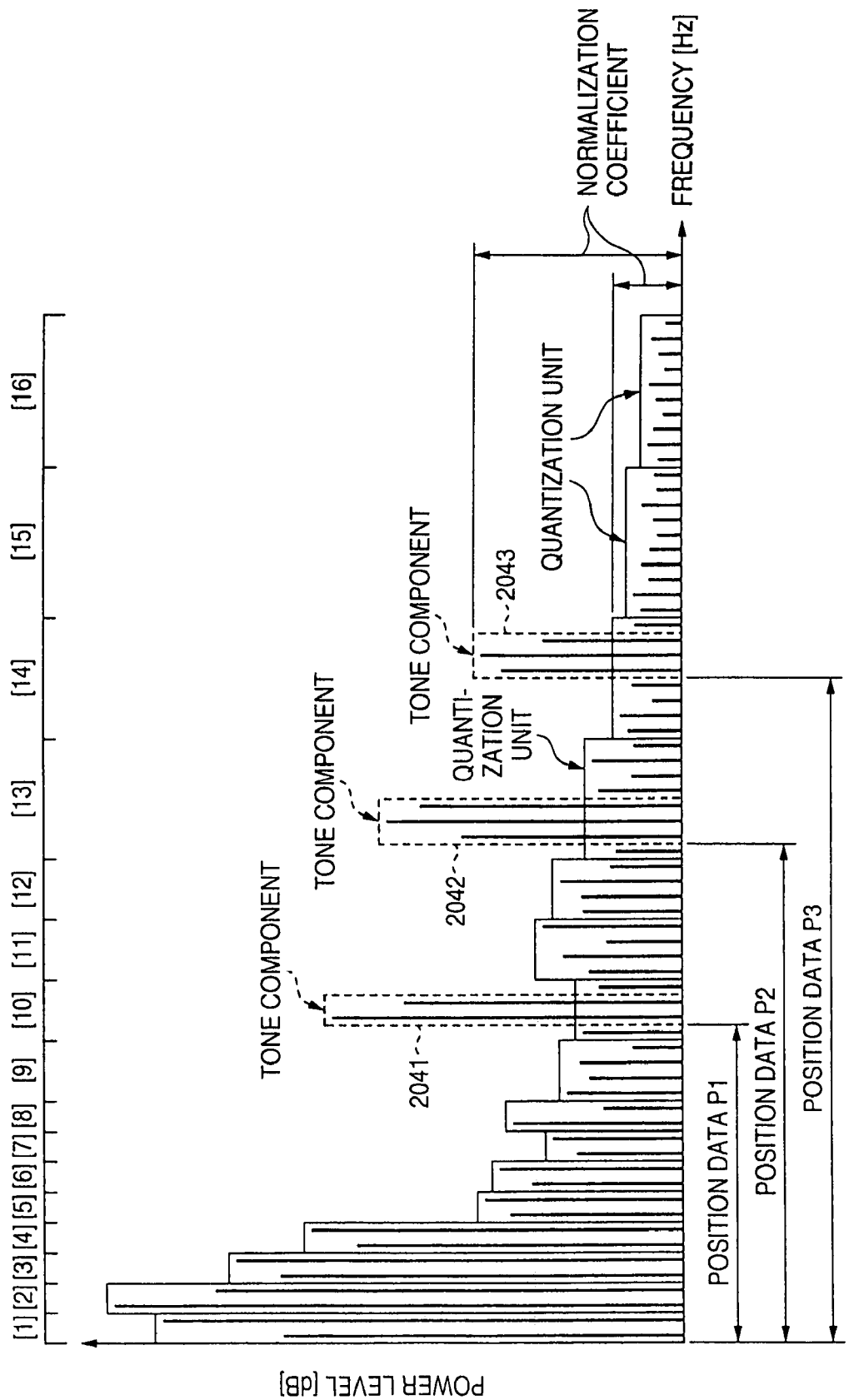
FIG. 38 is a graph showing tone components and non-tone components.

A spectrum signals combining section 2104 receives the spectrum signals from the tone components decoding section 2102 and the non-tone components decoding section 2103, combines those spectrum signals, generates spectrum signals as shown in FIG. 38 (original data) or FIG. 44 (trial listening data), and outputs the generated spectrum signals to the inverse converting section 2095.

Where coded data were produced without division into tone components and non-tone components, decoding processing may be performed by omitting the frame dividing section 2101 and using only one of the tone components decoding section 2102 and the non-tone components decoding section 2103.

Figure 55:
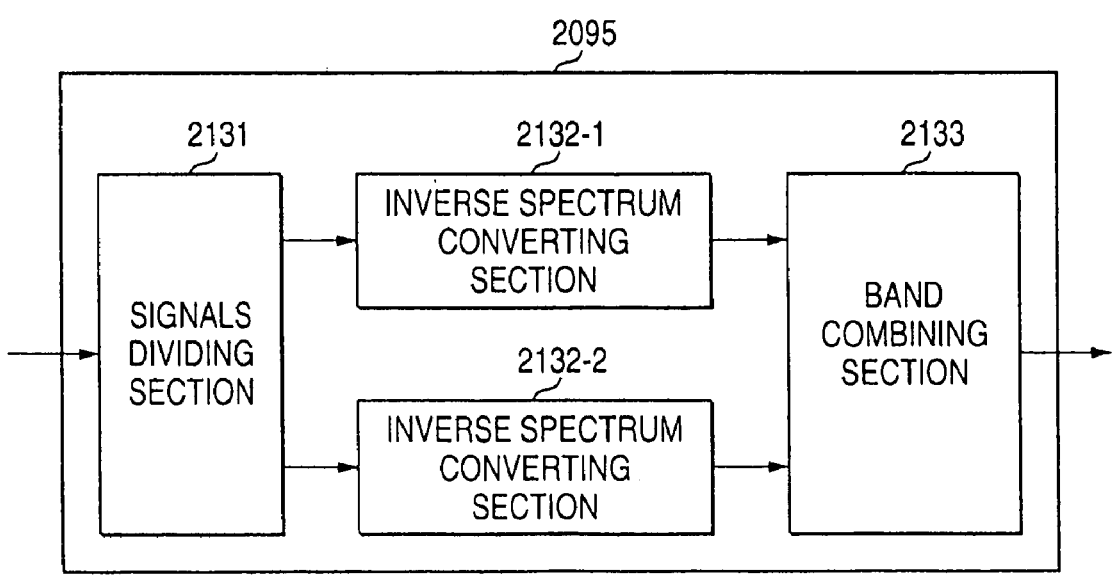
FIG. 55 is a block diagram showing the configuration of an inverse converting section shown in FIG. 51.

FIG. 55 is a block diagram showing a detailed configuration of the inverse converting section 2095.

A signals dividing section 2131 divides the received signal on the basis of the number of bands (in this example, two) that is specified in the header of the received frame. The signals dividing section 2131 divides the received spectrum signals into two parts, which are supplied to inverse spectrum converting sections 2132-1 and 2132-2, respectively.

The inverse spectrum converting sections 2132-1 and 2132-2 perform inverse spectrum conversion on the received spectrum signals and output resulting signals in the respective bands to a band combining filter 2133. The band combining filter 2133 combines the received signals in the respective bands and outputs a resulting signal.

The signal (e.g., an audio PCM signal) that is output from the band combining filter 2133 is converted by a D/A converter (not shown), for example, into an analog signal, which is reproduced as sound by speakers (not shown). The signal that is output from the band combining filter 2133 may be output to another apparatus over a network, for example.

Next, a data reproducing process that is executed by the data reproducing device 2081 of FIG. 51 will be described with reference to a flowchart of FIG. 56.

The code sequence decomposing section 2091 receives a coded frame of trial listening data at step S31, and decomposes the received code sequence and outputs a decomposed code sequence to the code sequence restoring section 2093 at step S32.

At step S33, the code sequence restoring section 2093 judges, on the basis of a signal that is input from the control section 2092, whether high-sound-quality reproduction, that is, processing of restoring and reproducing original data, should be performed.

If it is judged at step S33 that high-sound-quality reproduction should be performed, the process goes to step S34, where a code sequence restoring process (described later with reference to a flowchart of FIG. 57) is executed.

If it is judged at step S33 that high-sound-quality reproduction should not be performed or if step S34 is executed, the process goes to step S35, where the signal components decoding section 2094 divides a received code sequence into tone components and non-tone components, and decodes the tone components and the non-tone components individually by dequantizing and de-normalizing those, combines resulting spectrum signals, and outputs combined spectrum signals to the inverse converting section 2095.

At step S36, the inverse converting section 2095 divides the received spectrum signals into bands if necessary, performs inverse spectrum conversion in the respective bands, performs band combining, and finally performs inverse conversion into a time-series signal.

At step S37, the control section 2092 judges whether the frame that has been inverse-converted by the inverse converting section 2095 at step S36 is the last frame of the trial listening data.

If it is judged at step S37 that the frame concerned is not the last frame, the process returns to step S31 and step S31 and the subsequent steps are executed again. If it is judged at step S37 that the frame concerned is the last frame, the process is finished.

The time-series signal generated by the inverse converting section 2095 by the inverse conversion may be converted into an analog signal by a D/A converting section (not shown) and then reproduced by speakers (not shown) or output to another apparatus or the like over a network (not shown).

Although above description is directed to the case of decoding trial listening data that were coded after division into tone components and non-tone components or original data that have been restored from such trial listening data, restoring processing and reproduction processing can be performed in a similar manner also in the case where trial listening data were coded without division into tone components and non-tone components.

Next, the code sequence restoring process that is executed at step S34 in FIG. 56 will be described with reference to a flowchart of FIG. 57.

At step S51, to restore a code sequence, the code sequence restoring section 2093 acquires, from the control section 2092, additional data such as true normalization coefficient information, true spectrum coefficient information, a position of spectrum coefficient information, and a dummy data bit length.

At step S52, the code sequence restoring section 2093 receives a frame that has been decomposed by the code sequence decomposing section 2091.

At step S53, the code sequence restoring section 2093 replaces 0-value normalization coefficient information of tone components in the trial listening frame of the trial listening data with the true normalization coefficient information of the tone components that is contained in the additional frame (see FIG. 46).

At step S54, the code sequence restoring section 2093 replaces 0-value normalization coefficient information of non-tone components in the trial listening frame of the trial listening data with the true normalization coefficient information of the non-tone components that is contained in the additional frame (see FIG. 46).

At step S55, the code sequence restoring section 2093 reads the dummy data bit length R and the start position Ad from the additional frame (see FIG. 46).

At step S56, the code sequence restoring section 2093 replaces dummy-data spectrum coefficient information of the non-tone components that starts from the position Ad in the trial listening frame of the trial listening data and has the bit length R with the true spectrum coefficient information of the non-tone components that is contained in the additional frame (see FIG. 46). Then, a return is made to step S35 in FIG. 56.

Original data are restored on the basis of the trial listening data and the additional data by the process that has been described above with reference to the flowchart of FIG. 57.

The trial listening data decoded or the original data restored and decoded by the process that has been described above with reference to FIGS. 51-57 may be reproduced by speakers (not shown) or the like or output to another apparatus over a network or the like.

Next, a description will be made of a process of recording trial listening data on a recording medium, or restoring original data from trial listening data and additional data and recording the original data on a recording medium.

Figure 58:
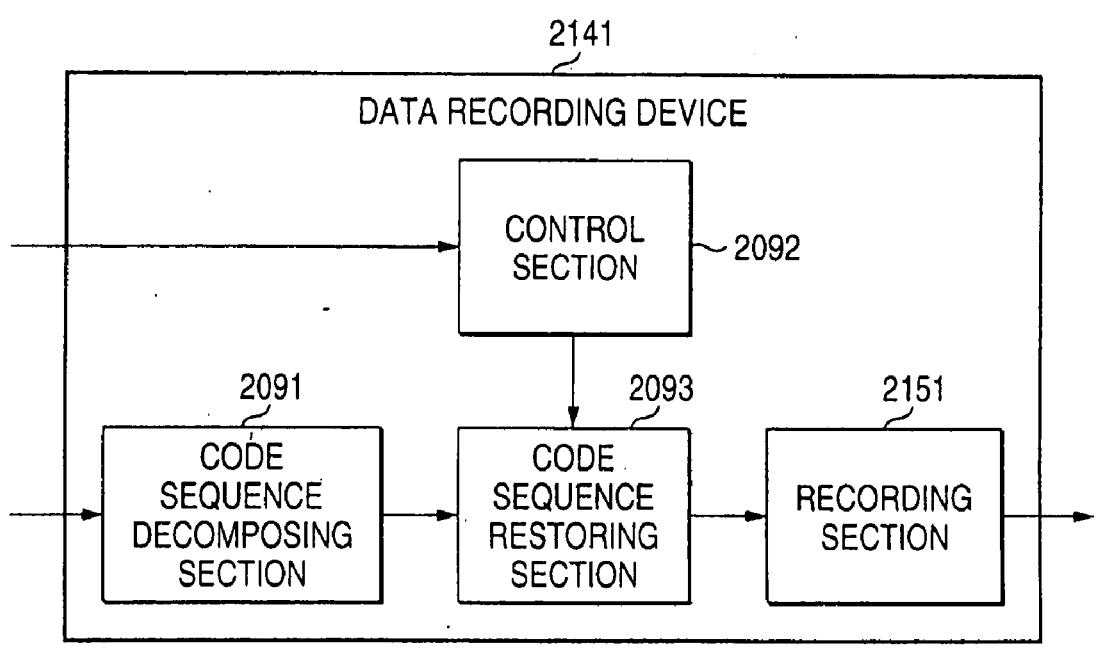
FIG. 58 is a block diagram showing the configuration of a data recording device according to the second embodiment of the invention.

FIG. 58 is a block diagram showing the configuration of a data recording device 2141.

The sections in FIG. 58 having the corresponding sections of the data reproducing device 2081 in FIG. 51 are given the same reference numerals as the latter and will not be described if appropriate.

A code sequence decomposing section 2091 receives coded trial listening data and extracts codes of respective signal components by decomposing the code sequence. A control section 2092 receives, from a user, via a manipulation input section (not shown), manipulation input information, that is, information indicating whether to record the received data with high sound quality (i.e., whether to perform processing of restoring and recording original data). The control section 2092 also receives additional data and controls the processing of a code sequence restoring section 2093.

Controlled by the control section 2092, the code sequence restoring section 2093 outputs the received coded frames to the recording section 2151 as they are if the input trial listening data are to be recorded as they are. If original data are to be restored and recorded, the code sequence restoring section 2093 performs processing of restoring coded frames of original data from the received trial listening data on the basis of various kinds of information such as true normalization coefficient information, true spectrum coefficient information, a position of spectrum coefficient information, and a dummy data bit length that are supplied from the control section 2092 and outputs the restored coded frames of the original data to the recording section 2151.

The recording section 2151 records data on a recording medium such as a magnetic disk, an optical disc, a magneto-optical disc, a semiconductor memory, or a magnetic tape by a prescribed method. The recording section 2151 may be such as to record information inside the device, such as a memory provided on a circuit board or a hard disk drive. For example, where the recording section 2151 is such as to be able to record data on an optical disc, the recording section 2151 is composed of an encoder for converting data into a format that is suitable for recording on the optical disc, an optical unit consisting of a laser light source such as a laser diode, various lenses, a polarizing beam splitter, etc., a spindle motor for rotating the optical disc, a driving section for driving the optical unit so as to move it to a prescribed track position, a control section for controlling the above components, etc.

The recording medium to be mounted in the recording section 2151 may be the same recording medium as trial listening data to be input to the code sequence decomposing section 2091 or additional data to be input to the control section 2092 are recorded on.

Figure 59:
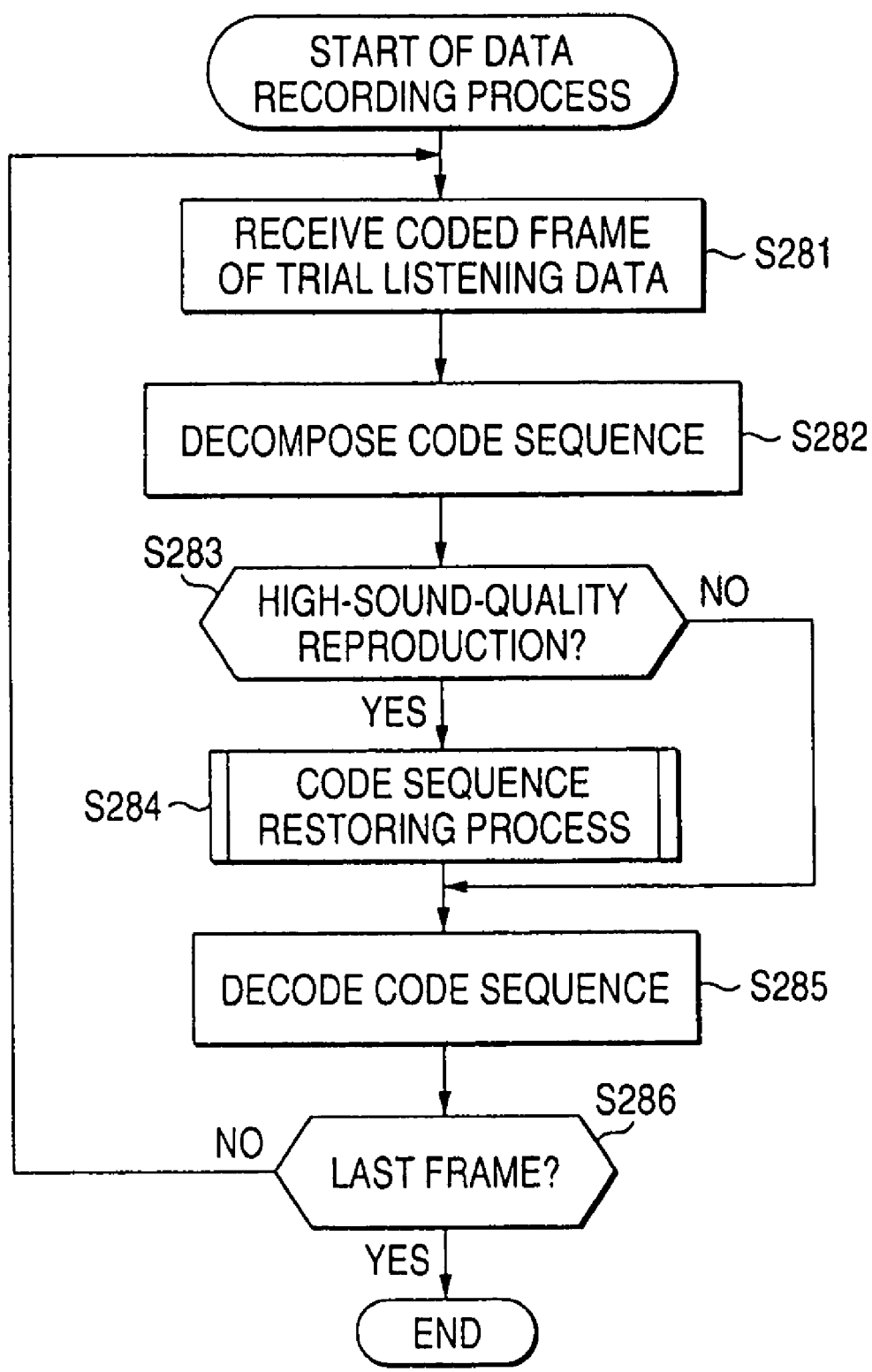
FIG. 59 is a flowchart of a data recording process.

Next, a data recording process that is executed by the data recording device 2141 will be described with reference to a flowchart of FIG. 59.

Figure 56:
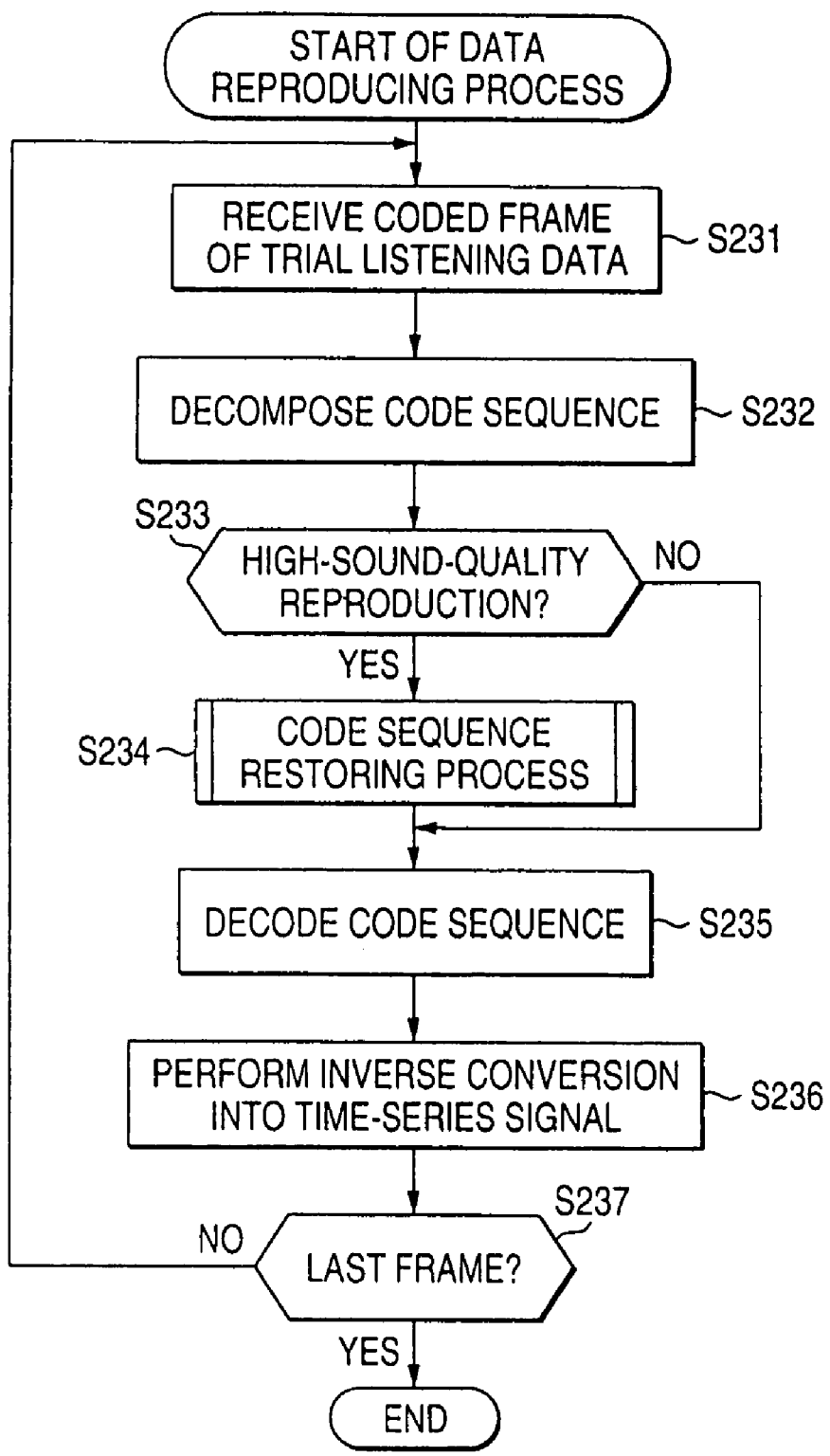
FIG. 56 is a flowchart of a data reproducing process.
Figure 57:
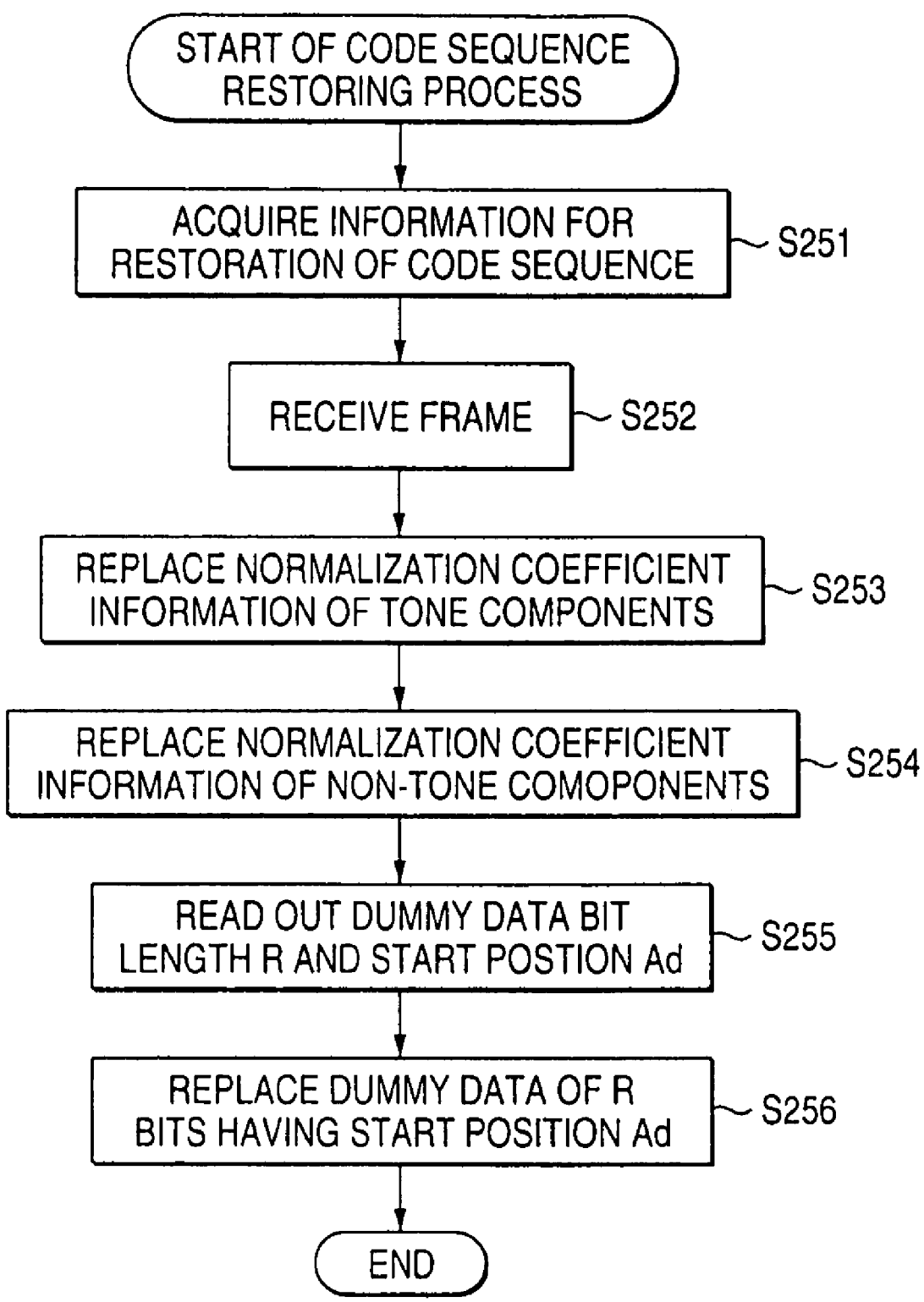
FIG. 57 is a flowchart of a code sequence restoring process.

Steps S81 to S84 are the same as steps S31 to S34 in FIG. 56, respectively.

The code sequence decomposing section 2091 receives a coded frame of trial listening data at step S81, and decomposes the received code sequence and outputs a decomposed code sequence to the code sequence restoring section 2093 at step S82.

At step S83, the code sequence restoring section 2093 judges, on the basis of a signal that is input from the control section 2092, whether high-sound-quality reproduction should be performed. If it is judged at step S83 that high-sound-quality reproduction should be performed, the process goes to step S84, where the code sequence restoring process (described above with reference to the flowchart of FIG. 57) is executed.

If it is judged at step S83 that high-sound-quality reproduction should not be performed or if step S84 is executed, the process goes to step S85, where the recording section 2151 records a frame of received original data or a code sequence corresponding to the trial listening data on, for example, a recording medium mounted therein.

At step S86, the control section 2092 judges what was recorded on the recording medium by the recording section 2151 at step S85 is the last frame of the original data or the code sequence corresponding to the trial listening data.

If it is judged at step S86 that the frame concerned is not the last frame, the process returns to step S81 and step S81 and the subsequent steps are executed again. If it is judged at step S86 that the frame concerned is the last frame, the process is finished.

According to the second embodiment of the invention, trial listening data can be generated by changing the values of or replacing with dummy data normalization coefficient information and variable-length-coded spectrum coefficient information. Information in regions that do not affect reproduction sound during reproduction of trial listening data is replaced by dummy data. An example of the regions that do not affect reproduction sound during reproduction of trial listening data is a region where spectrum coefficient information exists that corresponds to a region where normalization coefficient information is replaced by "0." The bit length of dummy data to replace spectrum coefficient information is varied frame by frame.

It is very difficult to infer original data from such trial listening data. Where spectrum coefficient information is variable-length codes, inferring original data from trial listening data is even more difficult. Illegally altering trial listening data may deteriorate the sound quality on the contrary. Therefore, the rights of an author and a marketer of contents can be protected.

Additional data are generated that consist of additional frame containing true values of data that are changed or replaced by dummy data in generating trial listening data (e.g., true normalization coefficient information, true spectrum coefficient information, true quantization accuracy information, and the number of quantization units) and dummy data bit lengths of respective frames. Therefore, original data can be restored from the trial listening data by using the additional data.

The second embodiment of the invention makes it possible to reproduce restored original data, to record restored original data on a recording medium, and to output restored original data to another apparatus over a network or the like.

The above description is directed to the process of generating trial listening data of audio signal contents data and corresponding additional data, or restoring original data on the basis of trial listening data and additional data and reproducing or recording the restored original data. However, the invention can also be applied to contents data that consist of an image signal or an image signal and an audio signal.

For example, where image signal contents data are converted by two-dimensional DCT and quantized by using various quantization tables, trial listening data are generated by designating a dummy quantization table in which high-frequency components are removed and incorporating dummy data whose data length varies frame by frame into a region of a high-frequency portion of spectrum coefficient information. The high-frequency components that are removed from the quantization table and the dummy-data-replaced portion of the spectrum coefficient information are incorporated in additional data.

In restoring original data, a true quantization table having the high-frequency components and true spectrum coefficient information are restored by using the additional data. The original data can thus be restored and reproduced.

The second embodiment of the invention can be applied to the case that it is intended to prevent a third person from restoring original data easily by changing part of variable-length codes of not only contents data and framed data but also other various data. That is, data that are lower in quality than original data can be generated by replacing plural portions of variable-length codes with dummy data and varying the dummy data length dummy data by dummy data. Original data cannot be restored easily from the low-quality data irrespective of the type of original data.

The above-described first and second embodiments may be practiced not only solely but also in proper combination. That is, the invention can be practiced by properly combining the methods or configurations described in this specification and other methods or configurations in accordance with an intended form of practice. Such implementations are construed as being covered by the technical scope of the invention as defined by the claims and equivalents thereof.

The above-described processes according to the first and second embodiments can be executed either hardware or software. To this end, each of the coding device 2001, the data reproducing device 2081, and the data recording device 2141, for example, takes the form of a personal computer 2161 shown in FIG. 60.

Figure 60:
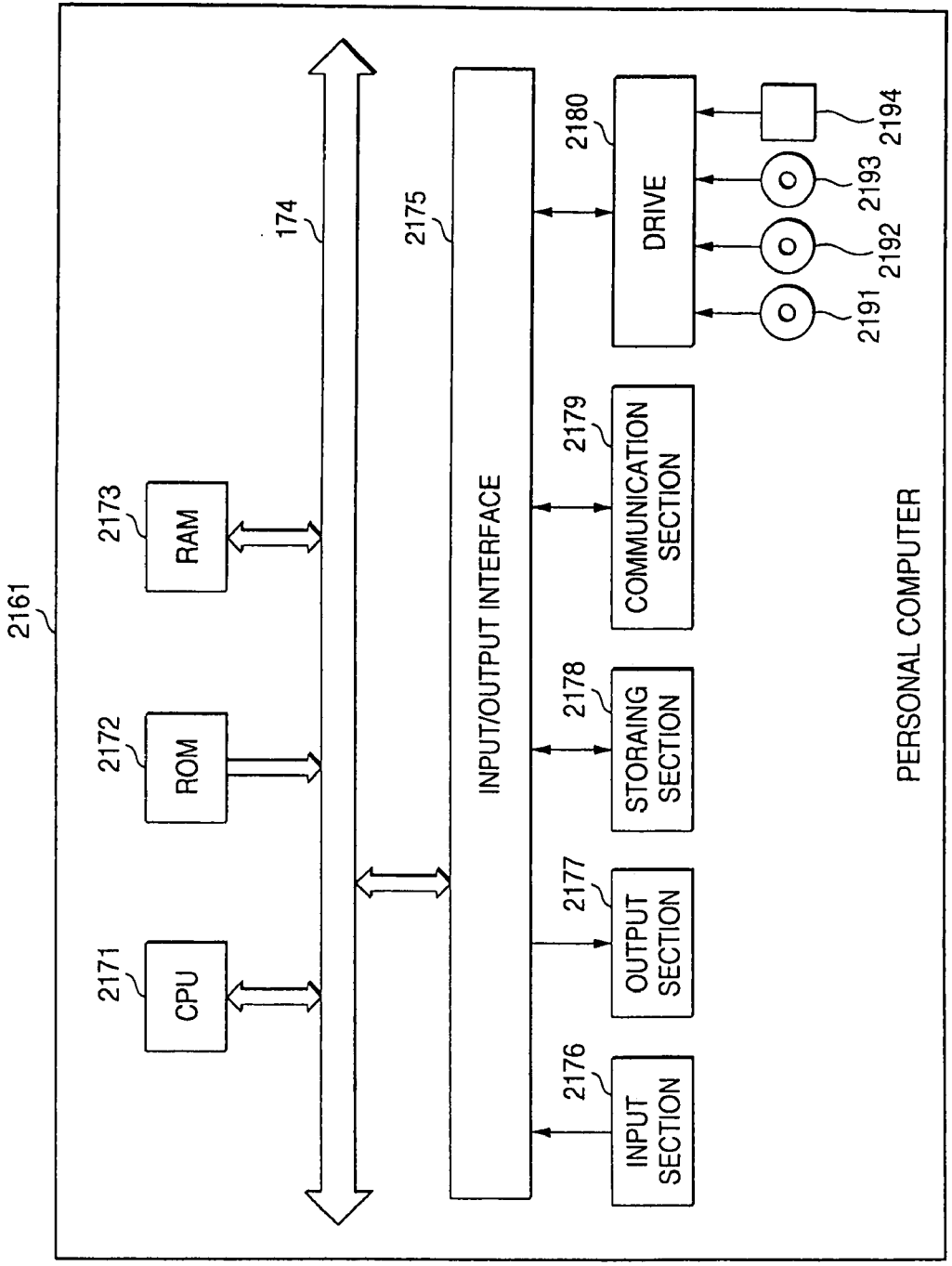
FIG. 60 is a block diagram showing the configuration of a personal computer.

In FIG. 60, a CPU 2171 performs various kinds of processing according to a program that is stored in a ROM 2172 or has been loaded into a RAM 2173 from the storing section 2178. Data necessary for the CPU 2171 to perform various kinds of processing are also stored in the RAM 2173 as appropriate.

The CPU 2171, the ROM 2172, and the RAM 2173 are connected to each other via a bus 2174. An input/output interface 2175 is also connected to the bus 2174.

An input section 2176 such as a key board and a mouse, an output section 2177 such as a display, a storing section 2178 such as a hard disk drive, and a communication section 2179 such as a modem or a terminal adapter are connected to the input/output interface 2175. The communication section 2179 performs communication processing via a network such as the Internet.

A drive 2180 is connected to the input/output interface 2175 if necessary, and a magnetic disk 2191, an optical disc 2192, a magneto-optical disc 2193, a semiconductor memory 2194, or the like is mounted in the drive 2180 as desired. A computer program read from such a disc, memory, or the like is installed in the storing section 2178 if necessary.

Where the above-described processes are executed by software, programs constituting the software are installed, via a network or a recording medium, in a computer that is incorporated in dedicated hardware or a general-purpose personal computer, for example, capable of performing various functions when various programs are installed therein.

As shown in FIG. 60, this recording medium may be either a programs-stored package medium that is separate from the apparatus main body and is distributed to a user to supply programs to him such as the magnetic disk 2191 (including a floppy disk), optical disc 2192 (including a CD-ROM (compact disc-read only memory and a DVD (digital versatile disc)), magneto-optical disc 2193 (including an MD (mini-disc; trademark)), or semiconductor memory 2194, or a recording medium that is supplied to a user in a state that it is incorporated in the apparatus main body such as the ROM 2172 in which programs are stored or a hard disk drive that is incorporated in the storing section 2178.

In this specification, the steps of a program that is recorded in a recording medium may naturally be executed in time-series order, i.e., in written order. However, they may not necessarily be executed in time-series order; they may be executed in parallel or individually.

In the signal reproducing method and device and the signal recording device and method according to the invention, to reproduce or record a code sequence obtained by coding a signal in units of a frame, a dummy-data-replaced portion of a first code sequence is replaced by true data by using a second code sequence containing information that is necessary for dummy data replacement (and a resulting code sequence is decoded). In the first code sequence, the position of the dummy data varies. Therefore, inferring trial viewing data containing the first code sequence is made very difficult while the size of high quality restoration data is relatively small, whereby the safety of the trial viewing data is increased.

According to the invention, a first code sequence obtained by replacing part of a code sequence with dummy data is used as trial viewing data and, if a second code sequence containing information necessary for dummy data replacement is input, at least part of the dummy data portion of the first code sequence is replaced by using the second code sequence. An empty region of the first code sequence is filled with a random pseudo-code sequence. When someone attempts to illegally increase the quality (e.g., bandwidth) of the first code sequence (trial viewing data), it is difficult for him to judge whether a resulting code sequence is a correct one. As a result, illegal high quality restoration can be prevented and the safety of trial viewing data (first code sequence) can be increased.

In the code sequence generating method and device according to the invention, to generate a code sequence obtained by coding a signal in prescribed units, a first code sequence is generated in which part of the above code sequence is replaced by dummy data and a second code sequence is also generated that contains information necessary for replacement of at least part of the dummy data. An empty region of the first code sequence is filled with a random pseudo-code sequence. When someone attempts to illegally increase the quality (e.g., bandwidth) of the first code sequence that is supplied as trial viewing data, it is difficult for him to judge whether a resulting code sequence is a correct one. As a result, illegal high quality restoration can be prevented and the safety of trial viewing data can be increased.

Further, the invention makes it possible to convert a data sequence.

According to the invention, an original data sequence, for example, can be converted into a data sequence such as trial listening data from which the original data sequence is hard to infer and another data sequence such as additional data that is necessary for restoring the original data sequence from the data sequence obtained by the above conversion can be generated. Varying, frame by frame, the data length of dummy data to be replaced by true data makes it more difficult to infer the original data sequence from the data sequence obtained by the above conversion.

Further, the invention makes it possible to restore a data sequence.

According to the invention, an original data sequence can be restored from a data sequence such as trial listening data by separately acquiring another data sequence such as additional data to be used for restoring the former data sequence.

The invention makes it possible to distribute very safe trial listening data to users.

Still further, the invention makes it possible to restore original data from trial listening data.

What is claimed is:

1. A signal reproducing method for reproducing a code sequence obtained by coding a signal in prescribed units, comprising:
   receiving a first code sequence obtained by replacing part of the code sequence with dummy data;
   if a second code sequence containing information necessary for dummy data replacement is received, replacing at least part of the dummy data of the first code sequence with true data by using the second code sequence; and
   decoding the first code sequence or a code sequence obtained by the replacing step,
   wherein in the first code sequence, the dummy data are located at a position that varies among at least some frames of data.

2. The signal reproducing method according to claim 1, wherein the dummy data are provided in the first code sequence in the prescribed units.

3. The signal reproducing method according to claim 1, wherein a head position of the dummy data in the first code sequence varies in the prescribed units.

4. The signal reproducing method according to claim 1, wherein the code sequence contains variable-length codes, and wherein at least part of the dummy data corresponds to variable-length codes.

5. The signal reproducing method according to claim 1, wherein the code sequence is generated by coding the signal in such a manner that the signal is spectrum-converted and divided into bands, and a code sequence having a prescribed format is generated that contains quantization accuracy information, normalization coefficient information, and spectrum coefficient information in each band, and wherein the dummy data include dummy data that correspond to at least part of the spectrum coefficient information.

6. The signal reproducing method according to claim 5, wherein the spectrum coefficient information is variable-length codes, and wherein after converted into variable-length codes the dummy data of the first code sequence are not longer than coded data of original data.

7. A signal reproducing device for reproducing a code sequence obtained by coding a signal in prescribed units, comprising:
   first code sequence receiving means for receiving a first code sequence obtained by replacing part of the code sequence with dummy data;
   replacing means for replacing, if a second code sequence containing information necessary for dummy data replacement is received, at least part of the dummy data of the first code sequence with true data by using the second code sequence; and
   decoding means for decoding the first code sequence or a code sequence obtained by the replacing means,
   wherein in the first code sequence the dummy data are located at a position that varies among at least some frames of data.

8. The signal reproducing device according to claim 7, wherein the dummy data are provided in the first code sequence in the prescribed units.

9. The signal reproducing device according to claim 7, wherein a head position of the dummy data in the first code sequence varies in the prescribed units.

10. The signal reproducing device according to claim 7, wherein the code sequence is generated by coding the signal in such a manner that the signal is spectrum-converted and divided into bands, and a code sequence having a prescribed format is generated that contains quantization accuracy information, normalization coefficient information, and spectrum coefficient information in each band, and wherein the dummy data include dummy data that correspond to at least part of the spectrum coefficient information.

11. The signal reproducing device according to claim 10, wherein the spectrum coefficient information is variable-length codes, and wherein after converted into variable-length codes the dummy data of the first code sequence are not longer than coded data of original data.

12. A signal recording method for recording, on a recording medium, a code sequence obtained by coding a signal in prescribed units, comprising:
   receiving a first code sequence obtained by replacing part of the code sequence with dummy data; and
   if a second code sequence containing information necessary for dummy data replacement is received, replacing at least part of the dummy data of the first code sequence with true data by using the second code sequence,
   wherein in the first code sequence the dummy data are located at a position varies among at least some frames of data.

13. The signal recording method according to claim 12, wherein the dummy data are provided in the first code sequence in the prescribed units.

14. The signal recording method according to claim 12, wherein a head position of the dummy data in the first code sequence varies in the prescribed units.

15. The signal recording method according to claim 12, wherein the code sequence is generated by coding the signal in such a manner that the signal is spectrum-converted and divided into bands, and a code sequence having a prescribed format is generated that contains quantization accuracy information, normalization coefficient information, and spectrum coefficient information in each band, and wherein the dummy data include dummy data that correspond to at least part of the spectrum coefficient information.

16. The signal recording method according to claim 15, wherein the spectrum coefficient information is variable-length codes, and wherein after converted into variable-length codes the dummy data of the first code sequence are not longer than coded data of original data.

17. A signal recording device for recording, on a recording medium, a code sequence obtained by coding a signal in prescribed units, comprising:
    first code sequence receiving means for receiving a first code sequence obtained by replacing part of the code sequence with dummy data; and
    replacing means for replacing, if a second code sequence containing information necessary for dummy data replacement is received, at least part of the dummy data of the first code sequence with true data by using the second code sequence,
    wherein in the first code sequence, the dummy data are located at a position that varies among at least some frames of data.

18. The signal recording device according to claim 17, wherein the dummy data are provided in the first code sequence in the prescribed units.

19. The signal recording device according to claim 17, wherein a head position of the dummy data in the first code sequence varies in the prescribed units.

20. The signal recording device according to claim 17, wherein the code sequence is generated by coding the signal in such a manner that the signal is spectrum-converted and divided into bands, and a code sequence having a prescribed format is generated that contains quantization accuracy information, normalization coefficient information, and spectrum coefficient information in each band, and wherein the dummy data include dummy data that correspond to at least part of the spectrum coefficient information.

21. The signal recording device according to claim 20, wherein the spectrum coefficient information is variable-length codes, and wherein after converted into variable-length codes the dummy data of the first code sequence are not longer than coded data of original data.

22. A code sequence generating method comprising:
    generating a code sequence of a prescribed format by coding an input signal;
    generating a first code sequence by replacing part of the code sequence of the prescribed format with dummy data; and
    generating a second code sequence by extracting the part of code sequence of the prescribed format corresponding to the dummy data,
    wherein in the first code sequence the dummy data are located at a position that varies among at least some frames of data.

23. The code sequence generating method according to claim 22, wherein the dummy data are provided in the first code sequence in the prescribed units.

24. The code sequence generating method according to claim 22, wherein a head position of the dummy data in the first code sequence varies in the prescribed units.

25. The code sequence generating method according to claim 22, wherein the code sequence contains variable-length codes, and wherein at least part of the dummy data correspond to variable-length codes.

26. The code sequence generating method according to claim 22, wherein the coding step spectrum-converts and divides into bands the input signal, and generates a code sequence having the prescribed format that contains quantization accuracy information, normalization coefficient information, and spectrum coefficient information in each band, and wherein the dummy data include dummy data that correspond to at least part of the spectrum coefficient information.

27. The code sequence generating method according to claim 26, wherein the spectrum coefficient information is variable-length codes, and wherein after converted into variable-length codes the dummy data of the first code sequence are not longer than coded data of original data.

28. A code sequence generating device comprising:
    coding means for generating a code sequence of a prescribed format by coding an input signal;
    first code sequence generating means for generating a first code sequence by replacing part of the code sequence of the prescribed format with dummy data; and
    second code sequence generating means for generating a second code sequence by extracting the part of code sequence of the prescribed format corresponding to the dummy data,
    wherein in the first code sequence the dummy data are located at a position that varies among at least some frames of data.

29. The code sequence generating device according to claim 28, wherein the dummy data are provided in the first code sequence in the prescribed units.

30. The code sequence generating device according to claim 28, wherein a head position of the dummy data in the first code sequence varies in the prescribed units.

31. The code sequence generating device according to claim 28, wherein the code sequence contains variable-length codes, and wherein at least part of the dummy data corresponds to variable-length codes.

32. The code sequence generating device according to claim 28, wherein the coding means spectrum-converts and divides into bands the input signal, and generates a code sequence having the prescribed format that contains quantization accuracy information, normalization coefficient information, and spectrum coefficient information in each band, and wherein the dummy data include dummy data that correspond to at least part of the spectrum coefficient information.

33. The code sequence generating device according to claim 32, wherein the spectrum coefficient information is variable-length codes, and wherein after converted into variable-length codes the dummy data of the first code sequence are not longer than coded data of original data.

* * * * *